United States Patent [19]
Silverbrook

[11] Patent Number: 5,984,446
[45] Date of Patent: Nov. 16, 1999

[54] COLOR OFFICE PRINTER WITH A HIGH CAPACITY DIGITAL PAGE IMAGE STORE

[75] Inventor: Kia Silverbrook, Leichhardt, Australia

[73] Assignee: Eastman Kodak Company, Rochester, N.Y.

[21] Appl. No.: 08/750,643

[22] PCT Filed: Apr. 10, 1996

[86] PCT No.: PCT/US96/04817

§ 371 Date: Dec. 5, 1996

§ 102(e) Date: Dec. 5, 1996

[87] PCT Pub. No.: WO96/32725

PCT Pub. Date: Oct. 17, 1996

[30] Foreign Application Priority Data

Apr. 12, 1995 [AU] Australia ............... PN2329
Apr. 12, 1995 [AU] Australia ............... PN2330

[51] Int. Cl.⁶ ............... B41J 3/00; B41J 2/135
[52] U.S. Cl. ............... 347/3; 347/9; 347/44; 347/47; 395/115; 395/116
[58] Field of Search ............... 347/2, 3, 43, 44, 347/48, 47, 9, 5; 395/115, 116, 114

[56] References Cited

U.S. PATENT DOCUMENTS

| | | | |
|---|---|---|---|
| 1,941,001 | 12/1933 | Hansell | 178/96 |
| 3,373,437 | 3/1968 | Sweet et al. | 347/74 |
| 3,416,153 | 12/1968 | Hertz et al. | 347/73 |
| 3,790,703 | 2/1974 | Carley | 358/296 |
| 3,946,398 | 3/1976 | Kyser et al. | 347/70 |
| 4,164,745 | 8/1979 | Cielo et al. | 347/61 |
| 4,166,277 | 8/1979 | Cielo et al. | 347/55 |
| 4,275,290 | 6/1981 | Cielo et al. | 347/61 |
| 4,293,865 | 10/1981 | Jinnai et al. | 528/190 |
| 4,312,009 | 1/1982 | Lange | 347/51 |
| 4,314,263 | 2/1982 | Carley | 347/48 |
| 4,490,728 | 12/1984 | Vaught et al. | 347/60 |
| 4,580,158 | 4/1986 | Macheboeuf | 348/587 |
| 4,635,078 | 1/1987 | Sakurada et al. | 347/15 |
| 4,672,432 | 6/1987 | Sakurada et al. | 358/534 |
| 4,710,780 | 12/1987 | Saito et al. | 347/55 |
| 4,737,803 | 4/1988 | Fujimura et al. | 347/67 |
| 4,748,458 | 5/1988 | Inoue et al. | 347/67 |
| 4,751,532 | 6/1988 | Fujimura et al. | 347/55 |
| 4,751,533 | 6/1988 | Saito et al. | 347/67 |
| 4,752,783 | 6/1988 | Saito et al. | 347/55 |
| 5,150,454 | 9/1992 | Wood et al. | 395/114 |
| 5,363,175 | 11/1994 | Matysek | 399/77 |
| 5,371,527 | 12/1994 | Miller et al. | 347/46 |
| 5,594,860 | 1/1997 | Gauthier | 345/501 |
| 5,815,178 | 9/1998 | Silverbrook | 347/55 |

FOREIGN PATENT DOCUMENTS

| | | | |
|---|---|---|---|
| 498292 | 1/1992 | European Pat. Off. | 347/48 |
| 0 578 256 A1 | 1/1994 | European Pat. Off. | |
| 0 600 712 A2 | 6/1994 | European Pat. Off. | |
| 0 628 415 A2 | 12/1994 | European Pat. Off. | |
| 0 628 415 A3 | 12/1994 | European Pat. Off. | |
| 29 49 808 | 7/1980 | Germany | |
| 2 007 162 | 5/1979 | United Kingdom | B41J 3/04 |
| WO 88/10477 | 12/1988 | WIPO | |
| WO 90/14233 | 11/1990 | WIPO | |

*Primary Examiner*—N. Le
*Assistant Examiner*—Craig A. Hallacher
*Attorney, Agent, or Firm*—Milton S. Sales

[57] ABSTRACT

A high speed color printer for use in an office environment, typically as a networked printer. The printer provides high speed (approximately 74 pages per minute: 37 double sided sheets per minute), high printing resolution (800 dpi) full color printer which incorporates electronic collation and local storage of 1,000 or more rasterized pages. The invention utilizes advances in high resolution pagewidth drop on demand print heads. Also incorporated is a new image compression and real-time expansion system for electronic collation and local document storage. The image resolution and compression quality is specified to achieve an image quality comparable with current magazine and brochure printing using color offset presses. A high speed color commercial printing system uses continuous roll media with a print speed of approximately 148 A4 pages per minute, electronic collation and local storage of 10,000 or more pages.

3 Claims, 27 Drawing Sheets

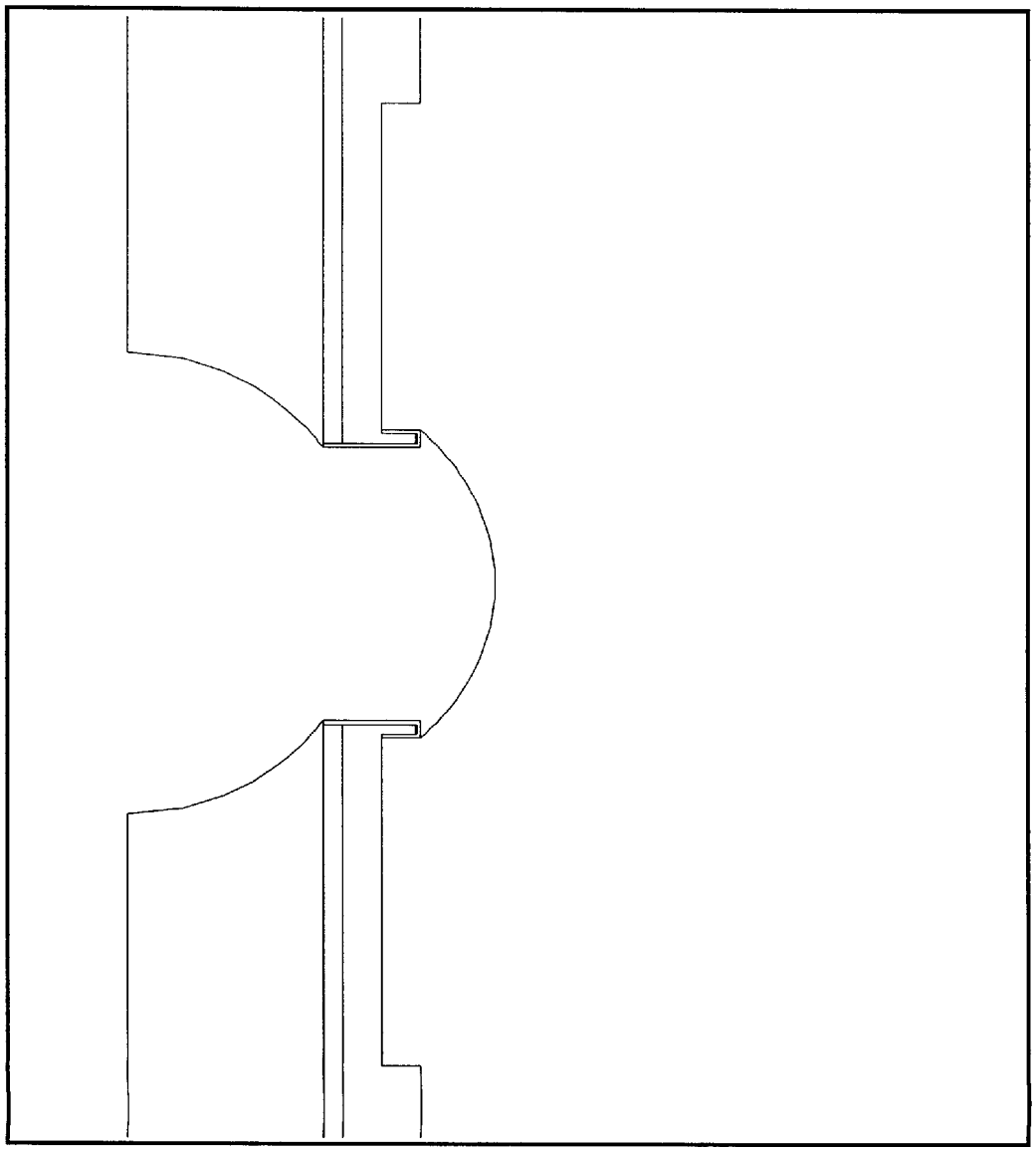

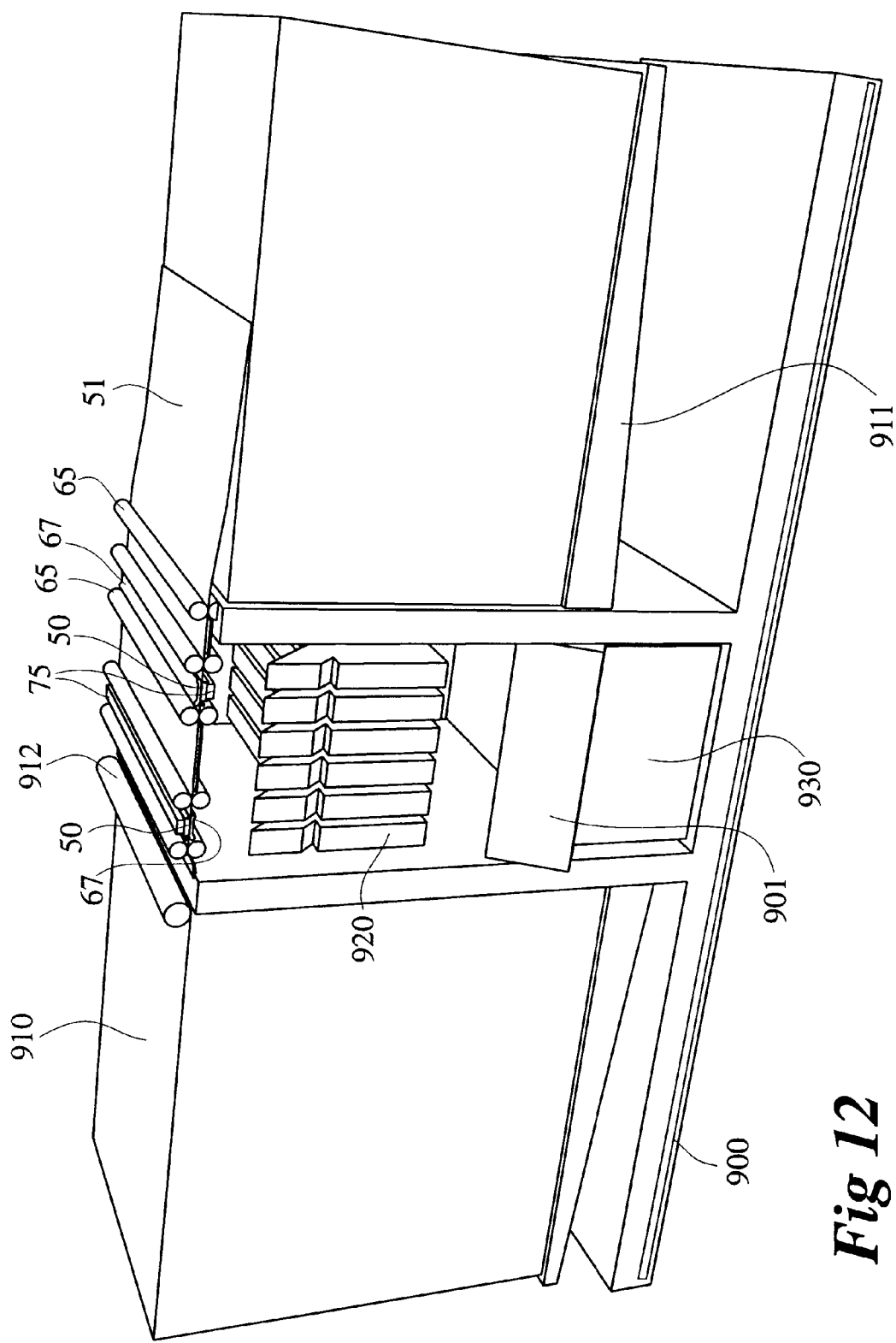

COLOR OFFICE PRINTER WITH A HIGH CAPACITY DIGITAL PAGE IMAGE STORE

CROSS REFERENCE TO RELATED APPLICATIONS

Reference is made to my commonly assigned, U.S. patent applications: Ser. No. 08/701,021 entitled CMOS PROCESS COMPATIBLE FABRICATION OF PRINT HEADS filed Aug. 21, 1996; Ser. No. 08/733,711 entitled CONSTRUCTION AND MANUFACTURING PROCESS FOR DROP ON DEMAND PRINT HEADS WITH NOZZLE HEATERS filed Oct. 17, 1996; Ser. No. 08/734,822 entitled A MODULAR PRINT HEAD ASSEMBLY filed Oct. 22, 1996; Ser. No. 08/736,537 entitled PRINT HEAD CONSTRUCTIONS FOR REDUCED ELECTROSTATIC INTERACTION BETWEEN PRINTED DROPLETS filed Oct. 24, 1996; Ser. No. 08/750,320 entitled NOZZLE DUPLICATION FOR FAULT TOLERANCE IN INTEGRATED PRINTING HEADS and Ser. No. 08/750,312 entitled HIGH CAPACITY COMPRESSED DOCUMENT IMAGE STORAGE FOR DIGITAL COLOR PRINTERS both filed Nov. 26, 1996; Ser. No. 08/753,718 entitled NOZZLE PLACEMENT IN MONOLITHIC DROP-ON-DEMAND PRINT HEADS and Ser. No. 08/750,606 entitled A COLOR VIDEO PRINTER AND A PHOTO CD SYSTEM WITH INTEGRATED PRINTER both filed on Nov. 27, 1996; Ser. No. 08/750,438 entitled A LIQUID INK PRINTING APPARATUS AND SYSTEM, Ser. No. 08/750,599 entitled COINCIDENT DROP SELECTION, DROP SEPARATION PRINTING METHOD AND SYSTEM, Ser. No. 08/750,435 entitled MONOLITHIC PRINT HEAD STRUCTURE AND A MANUFACTURING PROCESS THEREFOR USING ANISTROPIC WET ETCHING, Ser. No. 08/750,436 entitled POWER SUPPLY CONNECTION FOR MONOLITHIC PRINT HEADS, Ser. No. 08/750,437 entitled MODULAR DIGITAL PRINTING, Ser. No. 08/750,439 entitled A HIGH SPEED DIGITAL FABRIC PRINTER, Ser. No. 08/750,763 entitled A COLOR PHOTOCOPIER USING A DROP ON DEMAND INK JET PRINTING SYSTEM, Ser. No. 08/765,756 entitled PHOTOGRAPH PROCESSING AND COPYING SYSTEMS, Ser. No. 08/750,646 entitled FAX MACHINE WITH CONCURRENT DROP SELECTION AND DROP SEPARATION INK JET PRINTING, Ser. No. 08/759,774 entitled FAULT TOLERANCE IN HIGH VOLUME PRINTING PRESSES, Ser. No. 08/750,429 entitled INTEGRATED DRIVE CIRCUITRY IN DROP ON DEMAND PRINT HEADS, Ser. No. 08/750,433 entitled HEATER POWER COMPENSATION FOR TEMPERATURE IN THERMAL PRINTING SYSTEMS, Ser. No. 08/750,640 entitled HEATER POWER COMPENSATION FOR THERMAL LAG IN THERMAL PRINTING SYSTEMS, Ser. No. 08/750,650 entitled DATA DISTRIBUTION IN MONOLITHIC PRINT HEADS, and Ser. No. 08/750,642 entitled PRESSURIZABLE LIQUID INK CARTRIDGE FOR COINCIDENT FORCES PRINTERS all filed Dec. 3, 1996; Ser. No. 08/750,647 entitled MONOLITHIC PRINTING HEADS AND MANUFACTURING PROCESSES THEREFOR, Ser. No. 08/750,604 entitled INTEGRATED FOUR COLOR PRINT HEADS, Ser. No. 08/750,605 entitled A SELF-ALIGNED CONSTRUCTION AND MANUFACTURING PROCESS FOR MONOLITHIC PRINT HEADS, Ser. No. 08/682,603 entitled A COLOR PLOTTER USING CONCURRENT DROP SELECTION AND DROP SEPARATION INK JET PRINTING TECHNOLOGY, Ser. No. 08/750,603 entitled A NOTEBOOK COMPUTER WITH INTEGRATED CONCURRENT DROP SELECTION AND DROP SEPARATION COLOR PRINTING SYSTEM, Ser. No. 08/765,130 entitled INTEGRATED FAULT TOLERANCE IN PRINTING MECHANISMS; Ser. No. 08/750,431 entitled BLOCK FAULT TOLERANCE IN INTEGRATED PRINTING HEADS, Ser. No. 08/750,607 entitled FOUR LEVEL INK SET FOR BI-LEVEL COLOR PRINTING, Ser. No. 08/750,430 entitled A NOZZLE CLEARING PROCEDURE FOR LIQUID INK PRINTING, Ser. No. 08/750,600 entitled METHOD AND APPARATUS FOR ACCURATE CONTROL OF TEMPERATURE PULSES IN PRINTING HEADS, Ser. No. 08/750,608 entitled A PORTABLE PRINTER USING A CONCURRENT DROP SELECTION AND DROP SEPARATION PRINTING SYSTEM, and Ser. No. 08/750,602 entitled IMPROVEMENTS IN IMAGE HALFTONING all filed Dec. 4, 1996; Ser. No. 08/765,127 entitled PRINTING METHOD AND APPARATUS EMPLOYING ELECTROSTATIC DROP SEPARATION, and Ser. No. 08/765,035 entitled HEATER POWER COMPENSATION FOR PRINTING LOAD IN THERMAL PRINTING SYSTEMS all filed Dec. 5, 1996; Ser. No. 08/765,036 entitled APPARATUS FOR PRINTING MULTIPLE DROP SIZES AND FABRICATION THEREOF, Ser. No. 08/765,017 entitled HEATER STRUCTURE AND FABRICATION PROCESS FOR MONOLITHIC PRINT HEADS, Ser. No. 08/750,772 entitled DETECTION OF FAULTY ACTUATORS IN PRINTING HEADS, Ser. No. 08/765,037 entitled PAGE IMAGE AND FAULT TOLERANCE CONTROL APPARATUS FOR PRINTING SYSTEMS all filed Dec. 9, 1996; and Ser. No. 08/765,038 entitled CONSTRUCTIONS AND MANUFACTURING PROCESSES FOR THERMALLY ACTIVATED PRINT HEADS filed Dec. 10, 1996.

FIELD OF THE INVENTION

The present invention is in the field of computer controlled printing devices. In particular, the field is color office printers using drop on demand printing systems.

BACKGROUND OF THE INVENTION

Many different types of digitally controlled printing systems have been invented, and many types are currently in production. These printing systems use a variety of actuation mechanisms, a variety of marking materials, and a variety of recording media. Examples of digital printing systems in current use include: laser electrophotographic printers; LED electrophotographic printers; dot matrix impact printers; thermal paper printers; film recorders; thermal wax printers; dye diffusion thermal transfer printers; and ink jet printers. However, at present, such electronic printing systems have not significantly replaced mechanical printing presses, even though this conventional method requires very expensive setup and is seldom commercially viable unless a few thousand copies of a particular page are to be printed. Thus, there is a need for improved digitally controlled printing systems, for example, being able to produce high quality color images at a high-speed and low cost, using standard paper.

Inkjet printing has become recognized as a prominent contender in the digitally controlled, electronic printing arena because, e.g., of its non-impact, low-noise characteristics, its use of plain paper and its avoidance of toner transfers and fixing.

Many types of ink jet printing mechanisms have been invented. These can be categorized as either continuous ink jet (CIJ) or drop on demand (DOD) ink jet. Continuous ink jet printing dates back to at least 1929: Hansell, U.S. Pat. No. 1,941,001.

Sweet et al U.S. Pat. No. 3,373,437, 1967, discloses an array of continuous ink jet nozzles where ink drops to be printed are selectively charged and deflected towards the recording medium. This technique is known as binary deflection CIT, and is used by several manufacturers, including Elmjet and Scitex.

Hertz et al U.S. Pat. No. 3,416,153, 1966, discloses a method of achieving variable optical density of printed spots in CIJ printing using the electrostatic dispersion of a charged drop stream to modulate the number of droplets which pass through a small aperture. This technique is used in ink jet printers manufactured by Iris Graphics.

Kyser et al U.S. Pat. No. 3,946,398, 1970, discloses a DOD ink jet printer which applies a high voltage to a piezoelectric crystal, causing the crystal to bend, applying pressure on an ink reservoir and jetting drops on demand. Many types of piezoelectric drop on demand printers have subsequently been invented, which utilize piezoelectric crystals in bend mode, push mode, shear mode, and squeeze mode. Piezoelectric DOD printers have achieved commercial success using hot melt inks (for example, Tektronix and Dataproducts printers), and at image resolutions up to 720 dpi for home and office printers (Seiko Epson). Piezoelectric DOD printers have an advantage in being able to use a wide range of inks. However, piezoelectric printing mechanisms usually require complex high voltage drive circuitry and bulky piezoelectric crystal arrays, which are disadvantageous in regard to manufacturability and performance.

Endo et al GB Pat. No. 2,007,162, 1979, discloses an electrothermal DOD ink jet printer which applies a power pulse to an electrothermal transducer (heater) which is in thermal contact with ink in a nozzle. The heater rapidly heats water based ink to a high temperature, whereupon a small quantity of ink rapidly evaporates, forming a bubble. The formation of these bubbles results in a pressure wave which cause drops of ink to be ejected from small apertures along the edge of the heater substrate. This technology is known as Bubblejet™ (trademark of Canon K.K. of Japan), and is used in a wide range of printing systems from Canon, Xerox, and other manufacturers.

Vaught et al U.S. Pat. No. 4,490,728, 1982, discloses an electrothermal drop ejection system which also operates by bubble formation. In this system, drops are ejected in a direction normal to the plane of the heater substrate, through nozzles formed in an aperture plate positioned above the heater. This system is known as Thermal Ink Jet, and is manufactured by Hewlett-Packard. In this document, the term Thermal Ink Jet is used to refer to both the Hewlett-Packard system and systems commonly known as Bubblejet™.

Thermal Ink Jet printing typically requires approximately 20 µJ over a period of approximately 2 µs to eject each drop. The 10 Watt active power consumption of each heater is disadvantageous in itself and also necessitates special inks, complicates the driver electronics and precipitates deterioration of heater elements.

Other ink jet printing systems have also been described in technical literature, but are not currently used on a commercial basis. For example, U.S. Pat. No. 4,275,290 discloses a system wherein the coincident address of predetermined print head nozzles with heat pulses and hydrostatic pressure, allows ink to flow freely to spacer-separated paper, passing beneath the print head. U.S. Pat. Nos. 4,737,803; 4,737,803 and 4,748,458 disclose ink jet recording systems wherein the coincident address of ink in print head nozzles with heat pulses and an electrostatically attractive field cause ejection of ink drops to a print sheet.

Each of the above-described inkjet printing systems has advantages and disadvantages. However, there remains a widely recognized need for an improved ink jet printing approach, providing advantages for example, as to cost, speed, quality, reliability, power usage, simplicity of construction and operation, durability and consumables.

SUMMARY OF THE INVENTION

My concurrently filed applications, Ser. No. 08/750,438 entitled A LIQUID INK PRINTING APPARATUS AND SYSTEM and Ser. No. 08/750,599 entitled COINCIDENT DROP SELECTION, DROP SEPARATION PRINTING METHOD AND SYSTEM, both filed Dec. 3, 1996, describe new methods and apparatus that afford significant improvements toward overcoming the prior art problems discussed above. Those inventions offer important advantages, e.g., in regard to drop size and placement accuracy, as to printing speeds attainable, as to power usage, as to durability and operative thermal stresses encountered and as to other printer performance characteristics, as well as in regard to manufacturability and the characteristics of useful inks. One important purpose of the present invention is to further enhance the structures and methods described in those applications and thereby contribute to the advancement of printing technology.

One object of the present invention is to provide liquid ink printing systems which afford significant advantages toward attaining the above-noted advantages. The invention provides a printing apparatus using cut sheet or continuous roll recording media which incorporates a high capacity compressed document image storage apparatus including:

1) an image creation system which can operate on a band-by-band basis;
2) an input memory which stores at least one band of the uncompressed page image, but less than 50% of the uncompressed page image;
3) a page image compression system which can operate on a band-by-band basis;
4) a mass storage device able to store a plurality of compressed page images;
5) a page image expansion system which expands compressed page image data to form an expanded page image at a rate which is within 20% of the page printing rate when measured over the duration of the page printing time;
6) an output memory which stores at least one band of the expanded page image, but less than 50% of the expanded page image; and
7) an apparatus which provides page image data from the output memory to a printing device wherein the time taken to provide a band of image data to the printing device does not vary by more than ±50% of the mean time to provide a band of image data to the printing device.

A preferred form of the invention is that the printing mechanism of the printing apparatus operates on a drop selection and separation printing principle.

A further preferred form of the invention is that the color model used in the printing apparatus is CC'MM'YK.

The invention also provides a printing apparatus using cut sheet recording media which incorporates electronic collation wherein the printing mechanism of the printing apparatus operates on the drop selection and separation printing principle.

The invention also provides a printing apparatus using cut sheet recording media which incorporates compressed digital document storage wherein the printing mechanism of the printing apparatus operates on the drop selection and separation printing principle.

BRIEF DESCRIPTION OF THE DRAWINGS

FIGS. 2(a) to 2(f) show fluid dynamic simulations of drop selection.

FIG. 12 is a perspective diagram of a high speed color office printer which incorporates a drop selection and separation printing mechanism, electronic collation and local page storage.

DETAILED DESCRIPTION OF PREFERRED EMBODIMENTS

Figure 1A:
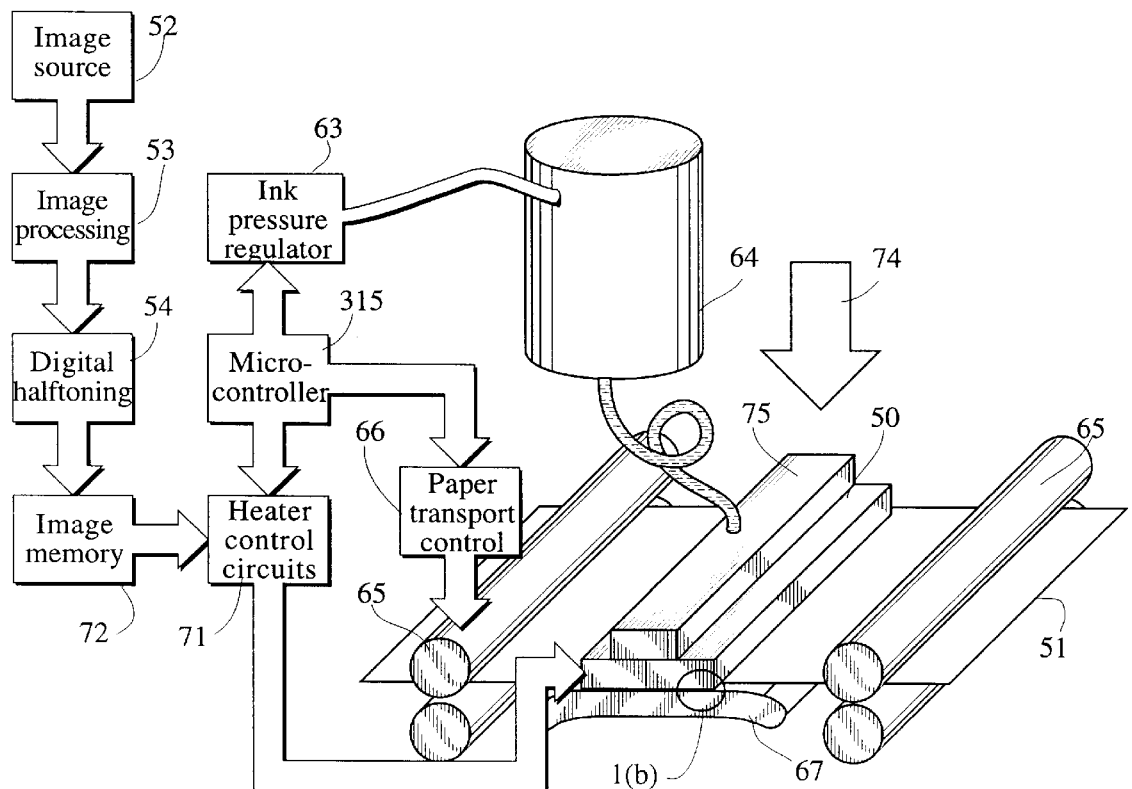
FIG. 1(a) shows a simplified block schematic diagram of one exemplary printing apparatus according to the present invention.

One aspect of the current invention constitutes a high speed color printer for use in an office environment, typically as a networked printer. Currently available high speed office printers are typically based on laser electrophotographic technology. The maximum print speed commonly available in color office printers is approximately 4 pages per minute for color laser printers, and 2 minutes per page for color ink jet printers. Currently, office printers typically do not provide electronic collation or local storage of pre-rasterized documents. This means that documents must be rasterized every time they are printed, and that manual collation is often required.

The current invention provides a high speed (approximately 74 pages per minute: 37 double sided sheets per minute), high printing resolution (800 dpi) full color printer which incorporates electronic collation and local storage of 1,000 or more rasterized pages. The invention utilizes advances in high resolution pagewidth drop on demand print heads. Also incorporated is a new image compression and real-time expansion system for electronic collation and local document storage. The image resolution and compression quality is specified to achieve an image quality comparable with current magazine and brochure printing using color offset presses.

Another aspect of the current invention constitutes a high speed color commercial printing system using continuous roll print media. At present, most high volume full color roll printing is performed by web fed and sheet fed offset color presses. These machines print color pages using four etched printing plates, one for each of the four color components used in process printing; cyan, magenta, yellow, and black (CMYK). While these machines are highly efficient in printing large volumes of color pages, it is difficult, time consuming, and expensive to change the image being printed. If the print run is greater than 10,000 copies, the set-up costs of the press can be effectively amortized over the volume printed. However, the cost and time required to set up a color press mean that only rarely is fewer than 1,000 copies of a page printed. If fewer than one hundred copies of a page are to be printed, then color copiers are generally used.

There is increasing recognition in the industry of the need for digital color printing presses, which are capable of printing high quality color pages directly from computer data, without requiring photographic and platemaking processes. These are considered to be most cost effective for print runs of between 100 copies and 10,000 copies. Two short run direct digital color presses were commercially released in 1993. These are the DCP-1 from Xeikon of Belgium, and the E-Print 1000 from Indigo of Israel. The Xeikon DCP-1 is a dry Xerographic system with a print speed of 33 A4 pages per minute for four color process work. The system is web-fed. The Indigo E-Print 1000 is a sheetfed digital offset press that can print up to six colors on a standard sheet size of A3. It runs at a rate up to 67 single color A3 impressions per minute. It operates using some of the same principles as traditional offset printing, using plates, blankets, and impression cylinders with liquid ink. A laser beam is scanned across a photoconductor image cylinder, which attracts liquid ink, which is then transferred to the blanket cylinder and then is 'offset' to the paper held on the impression cylinder. The image resolution is 800 dpi. The E-Print 1000 includes an optional collating and binding system, and has internal duplexing for printing on both sides of the paper.

While these two machines are viable for short run printing, they are not suitable as replacements for offset presses for medium or large run printing. The throughput is substantially lower, and cost per page substantially higher, than offset printing for print runs in excess of a few thousand copies. Although these machines can be used in parallel to increase the overall printing throughput, the cost of these systems is quite high (in excess of $ US 200,000 for color systems). The capital cost combined with the high cost per page makes parallel systems not cost competitive with traditional offset printing for medium or large print runs.

Problems also exist in using currently available machines for short run color, especially where the print run is less than 10 copies. In this case, the total print time is usually dominated by the time required to rasterize Postscript™ pages, and the full print speed of the print engines cannot be utilized.

According to this aspect of the current invention, a high speed (approximately 148 A4 pages per minute), high printing resolution (800 dpi) full color printer which incorporates electronic collation and local storage of 10,000 or more rasterized pages. The invention utilizes advances in high resolution pagewidth drop on demand print heads. Also incorporated is a new image compression and real-time expansion system for electronic collation and local document storage, which can print stored pages in any sequence at the full printing speed of the print engine. The image resolution and compression quality is specified to achieve an image quality comparable with current magazine and brochure printing using color offset presses.

Capital cost is normally not a critical factor in commercial printing equipment. Cost per page and throughput are, however, important considerations. The system disclosed herein has potential for low cost per page, as the only consumables are ink, paper, and a small amount of electricity. Throughput of a single machine is high, though still considerably lower than high speed color offset presses. The digital printing systems disclosed herein can readily be operated in parallel, as the capital cost and floor space are a small fraction of color offset press requirements. Thus systems with throughput equivalent to, or exceeding, that of color offset presses can readily be assembled.

In one general aspect, the invention constitutes a drop-on-demand printing mechanism wherein the means of selecting drops to be printed produces a difference in position between selected drops and drops which are not selected, but which is insufficient to cause the ink drops to overcome the ink surface tension and separate from the body of ink, and wherein an alternative means is provided to cause separation of the selected drops from the body of ink. The separation of drop selection means from drop separation means significantly reduces the energy required to select which ink drops are to be printed. Only the drop selection means must be driven by individual signals to each nozzle. The drop separation means can be a field or condition applied simultaneously to all nozzles.

The drop selection means may be chosen from, but is not limited to, the following list:
1) Electrothermal reduction of surface tension of pressurized ink
2) Electrothermal bubble generation, with insufficient bubble volume to cause drop ejection
3) Piezoelectric, with insufficient volume change to cause drop ejection
4) Electrostatic attraction with one electrode per nozzle The drop separation means may be chosen from, but is not limited to, the following list:
1) Proximity (recording medium in close proximity to print head)
2) Proximity with oscillating ink pressure
3) Electrostatic attraction
4) Magnetic attraction The table "DOD printing technology targets" shows some desirable characteristics of drop on demand printing technology. The table also lists some methods by which some embodiments described herein, or in other of my related applications, provide improvements over the prior art.

| DOD printing technology targets | |
| --- | --- |
| Target | Method of achieving improvement over prior art |
| High speed operation | Practical, low cost, pagewidth printing heads with more than 10,000 nozzles. Monolithic A4 pagewidth print heads can be manufactured using standard 300 mm (12") silicon wafers |
| High image quality | High resolution (800 dpi is sufficient for most applications), six color process to reduce image noise |
| Full color operation | Halftoned process color at 800 dpi using stochastic screening |
| Ink flexibility | Low operating ink temperature and no requirement for bubble formation |
| Low power requirements | Low power operation results from drop selection means not being required to fully eject drop |
| Low cost | Monolithic print head without aperture plate, high manufacturing yield, small number of electrical connections, use of modified existing CMOS manufacturing facilities |
| High manufacturing yield | Integrated fault tolerance in printing head |
| High reliability | Integrated fault tolerance in printing head. Elimination of cavitation and kogation. Reduction of thermal shock. |
| Small number of electrical connections | Shift registers, control logic, and drive circuitry can be integrated on a monolithic print head using standard CMOS processes |
| Use of existing VLSI manufacturing facilities | CMOS compatibility. This can be achieved because the heater drive power is less is than 1% of Thermal Ink Jet heater drive power |
| Electronic collation | A new page compression system which can achieve 100:1 compression with insignificant image degradation, resulting in a compressed data rate low enough to allow real-time printing of any combination of thousands of pages stored on a low cost magnetic disk drive. |

In thermal ink jet (TIJ) and piezoelectric ink jet systems, a drop velocity of approximately 10 meters per second is preferred to ensure that the selected ink drops overcome ink surface tension, separate from the body of the ink, and strike the recording medium. These systems have a very low efficiency of conversion of electrical energy into drop kinetic energy. The efficiency of TIJ systems is approximately 0.02%). This means that the drive circuits for TIJ print heads must switch high currents. The drive circuits for piezoelectric ink jet heads must either switch high voltages, or drive highly capacitive loads. The total power consumption of pagewidth TIJ printheads is also very high. An 800 dpi A4 full color pagewidth TIJ print head printing a four color black image in one second would consume approximately 6 kW of electrical power, most of which is converted to waste heat. The difficulties of removal of this amount of heat precludes the production of low cost, high speed, high resolution compact pagewidth TIJ systems.

One important feature of embodiments of the invention is a means of significantly reducing the energy required to select which ink drops are to be printed. This is achieved by separating the means for selecting ink drops from the means for ensuring that selected drops separate from the body of ink and form dots on the recording medium. Only the drop selection means must be driven by individual signals to each nozzle. The drop separation means can be a field or condition applied simultaneously to all nozzles.

The table "Drop selection means" shows some of the possible means for selecting drops in accordance with the invention. The drop selection means is only required to create sufficient change in the position of selected drops that the drop separation means can discriminate between selected and unselected drops.

Drop selection means

| | Method | Advantage | Limitation |
|---|---|---|---|
| 1. | Electrothermal reduction of surface tension of pressurized ink | Low temperature increase and low drop selection energy. Can be used with many ink types. Simple fabrication. CMOS drive circuits can be fabricated on same substrate | Requires ink pressure regulating mechanism. Ink surface tension must reduce substantially as temperature increases |
| 2. | Electrothermal reduction of ink viscosity, combined with oscillating ink pressure | Medium drop selection energy, suitable for hot melt and oil based inks. Simple fabrication. CMOS drive circuits can be fabricated on same substrate | Requires ink pressure oscillation mechanism. Ink must have a large decrease in viscosity as temperature increases |
| 3. | Electrothermal bubble generation, with insufficient bubble volume to cause drop ejection | Well known technology, simple fabrication, bipolar drive circuits can be fabricated on same substrate | High drop selection energy, requires water based ink, problems with kogation, cavitation, thermal stress |
| 4. | Piezoelectric, with insufficient volume change to cause drop ejection | Many types of ink base can be used | High manufacturing cost, incompatible with integrated circuit processes, high drive voltage, mechanical complexity, bulky |
| 5. | Electrostatic attraction with one electrode per nozzle | Simple electrode fabrication | Nozzle pitch must be relatively large. Crosstalk between adjacent electric fields. Requires high voltage drive circuits |

Other drop selection means may also be used.

The preferred drop selection means for water based inks is method 1: "Electrothermal reduction of surface tension of pressurized ink". This drop selection means provides many advantages over other systems, including; low power operation (approximately 1% of TIJ), compatibility with CMOS VLSI chip fabrication, low voltage operation (approx. 10 V), high nozzle density, low temperature operation, and wide range of suitable ink formulations. The ink must exhibit a reduction in surface tension with increasing temperature.

The preferred drop selection means for hot melt or oil based inks is method 2: "Electrothermal reduction of ink viscosity, combined with oscillating ink pressure". This drop selection means is particularly suited for use with inks which exhibit a large reduction of viscosity with increasing temperature, but only a small reduction in surface tension. This occurs particularly with non-polar ink carriers with relatively high molecular weight. This is especially applicable to hot melt and oil based inks.

The table "Drop separation means" shows some of the possible methods for separating selected drops from the body of ink, and ensuring that the selected drops form dots on the printing medium. The drop separation means discriminates between selected drops and unselected drops to ensure that unselected drops do not form dots on the printing medium.

| | Drop separation means | |
|---|---|---|
| Means | Advantage | Limitation |
| 1. Electrostatic attraction | Can print on rough surfaces, simple implementation | Requires high voltage power supply |
| 2. AC electric field | Higher field strength is possible than electrostatic, operating margins can be increased, ink pressure reduced, and dust accumulation is reduced | Requires high voltage AC power supply synchronized to drop ejection phase. Multiple drop phase operation is difficult |
| 3. Proximity (print head in close proximity to, but not touching, recording medium) | Very small spot sizes can be achieved. Very low power dissipation. High drop position accuracy | Requires print medium to be very close to print head surface, not suitable for rough print media, usually requires transfer roller or belt |
| 4. Transfer Proximity (print head is in close proximity to a transfer roller or belt | Very small spot sizes can be achieved, very low power dissipation, high accuracy, can print on rough paper | Not compact due to size of transfer roller or transfer belt. |
| 5. Proximity with oscillating ink pressure | Useful for hot melt inks using viscosity reduction drop selection method, reduces possibility of nozzle clogging, can use pigments instead of dyes | Requires print medium to be very close to print head surface, not suitable for rough print media. Requires ink pressure oscillation apparatus |
| 6. Magnetic attraction | Can print on rough surfaces. Low power if permanent magnets are used | Requires uniform high magnetic field strength, requires magnetic ink |

Other drop separation means may also be used.

The preferred drop separation means depends upon the intended use. For most applications, method 1: "Electrostatic attraction", or method 2: "AC electric field" are most appropriate. For applications where smooth coated paper or film is used, and very high speed is not essential, method 3: "Proximity" may be appropriate. For high speed, high quality systems, method 4: "Transfer proximity" can be used. Method 6: "Magnetic attraction" is appropriate for portable printing systems where the print medium is too rough for proximity printing, and the high voltages required for electrostatic drop separation are undesirable. There is no clear 'best' drop separation means which is applicable to all circumstances.

A simplified schematic diagram of one preferred printing system according to the invention appears in FIG. 1(a).

Figure 1B:
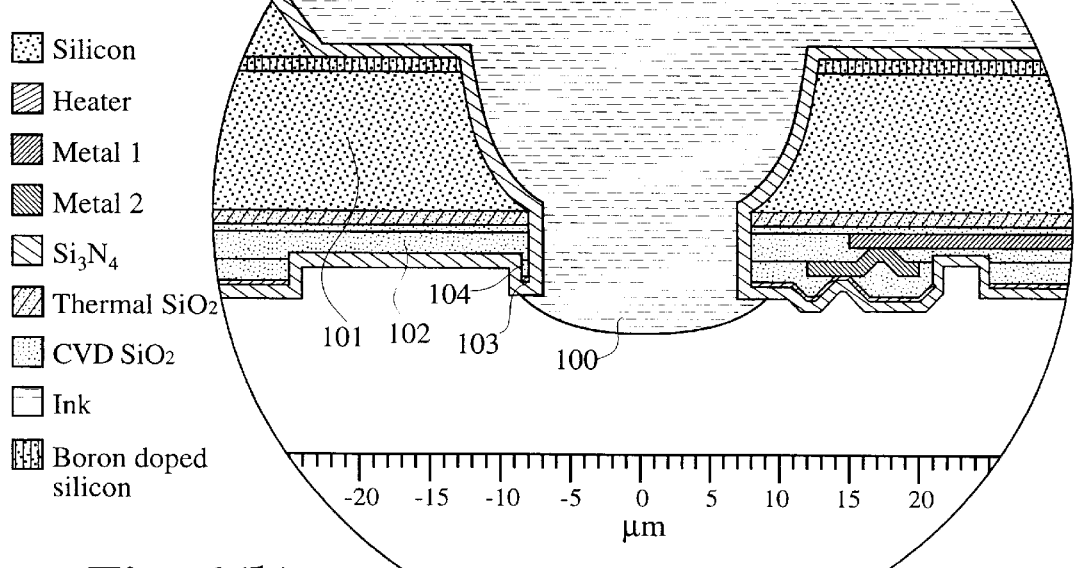
FIG. 1(b) shows a cross section of one variety of nozzle tip in accordance with the invention.
Figure 2B:
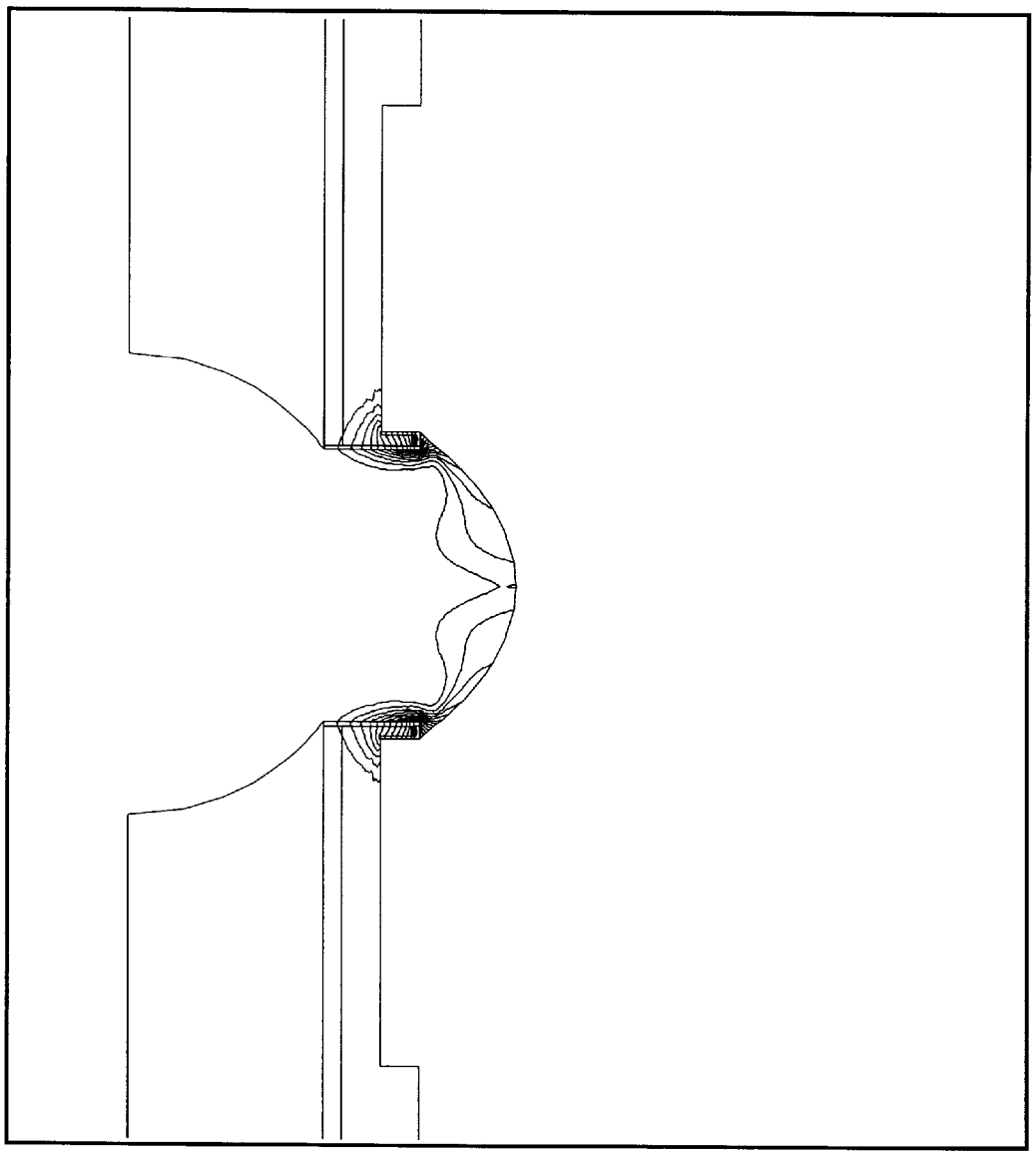
Figure 2C:
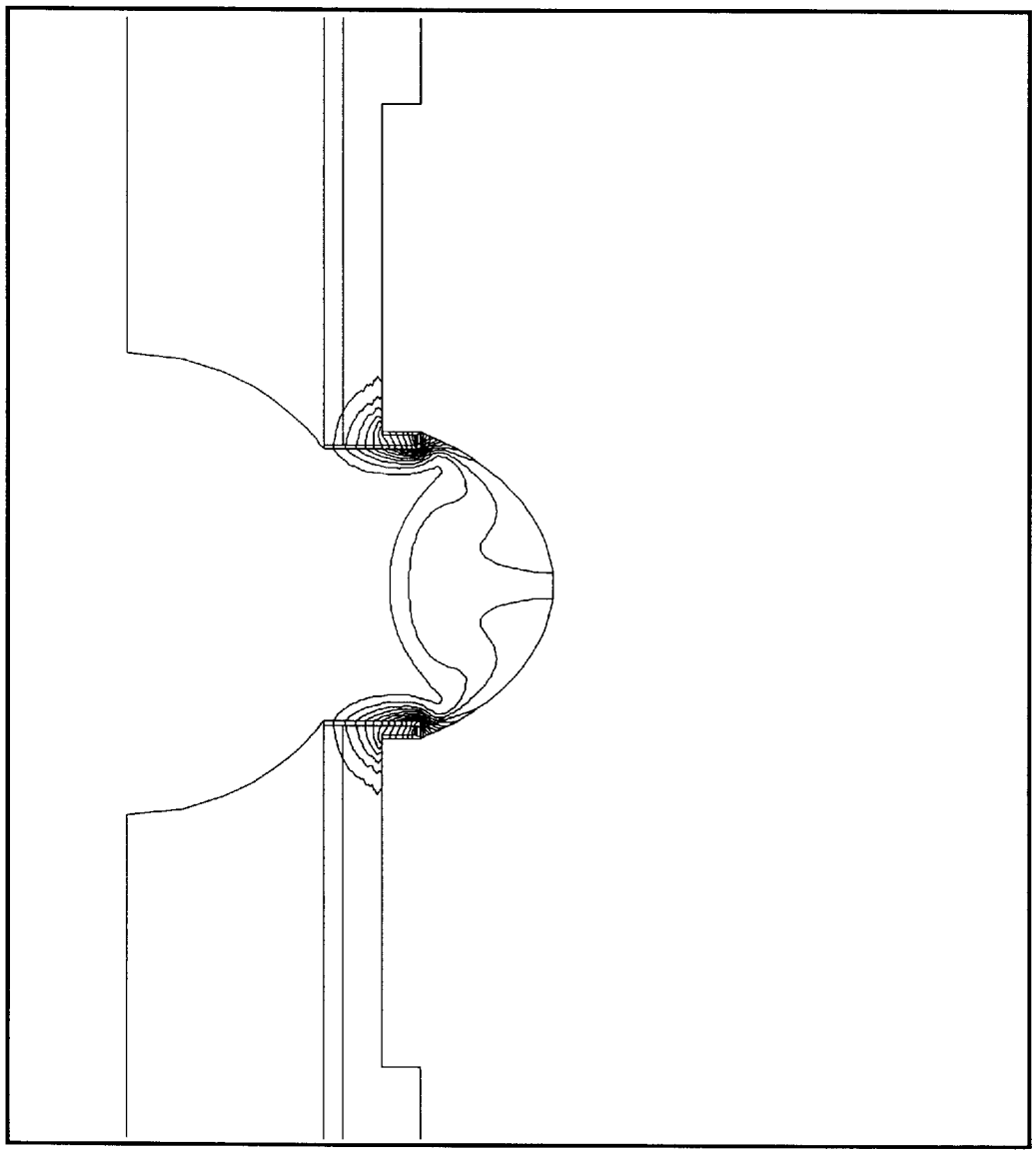
Figure 2D:
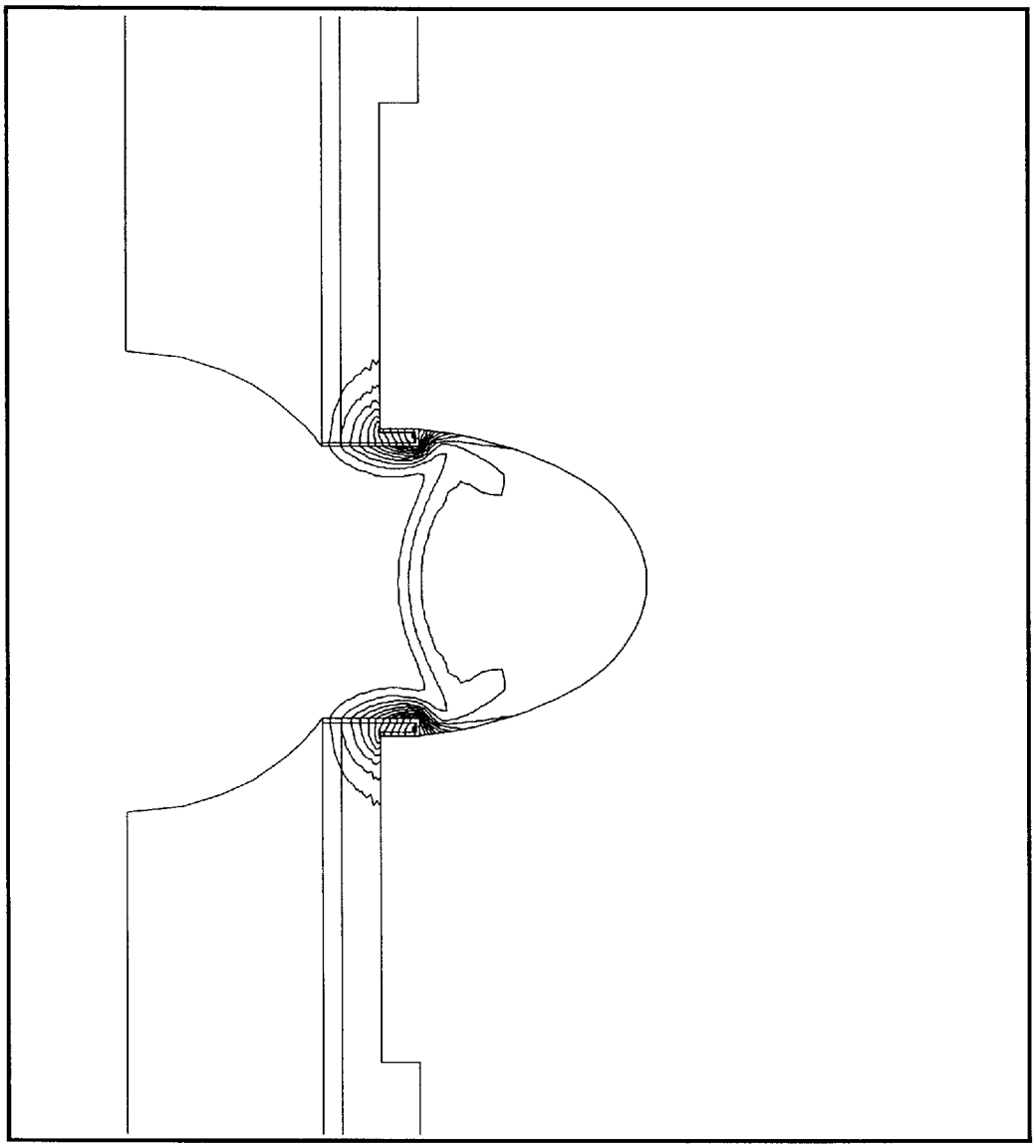
Figure 2E:
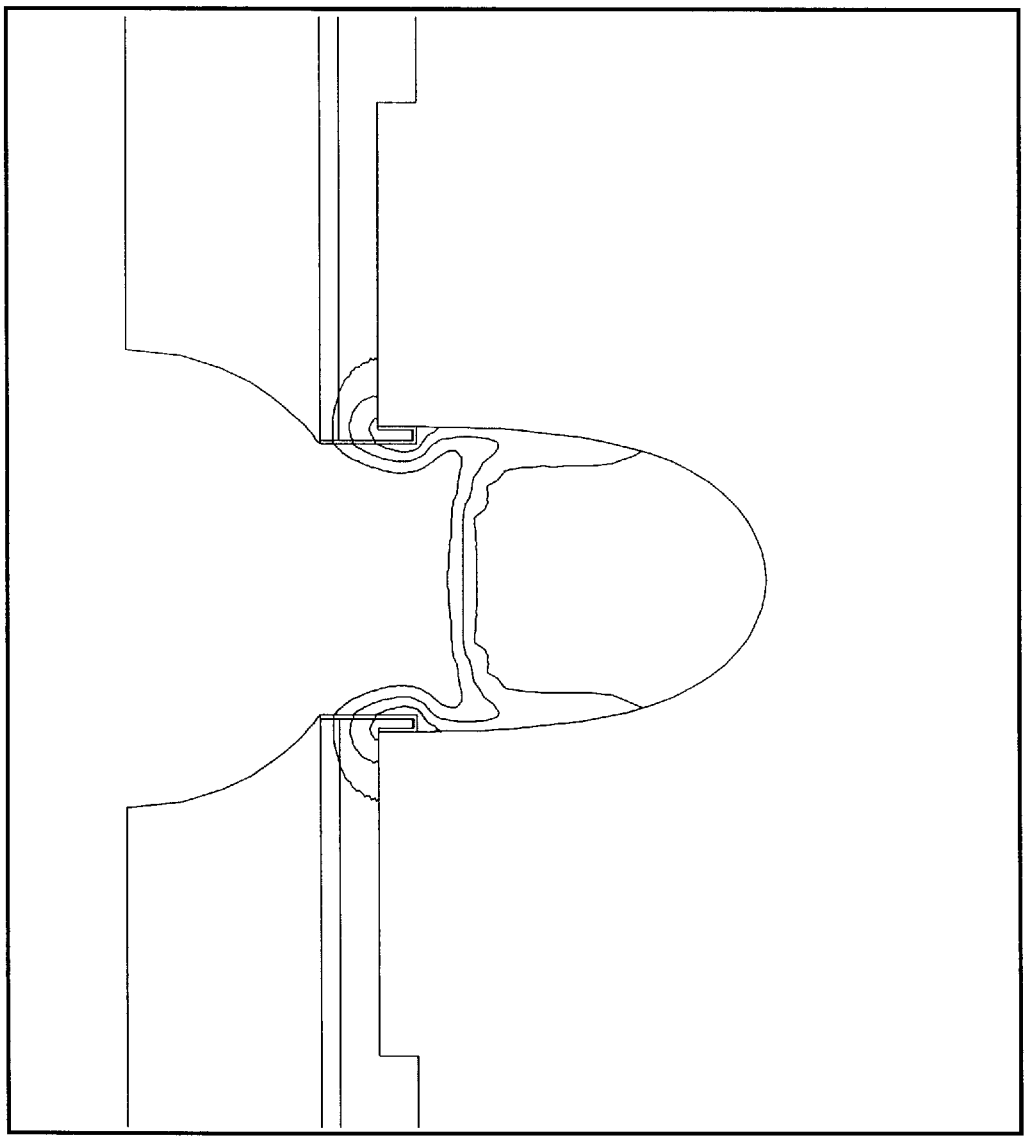
Figure 2F:
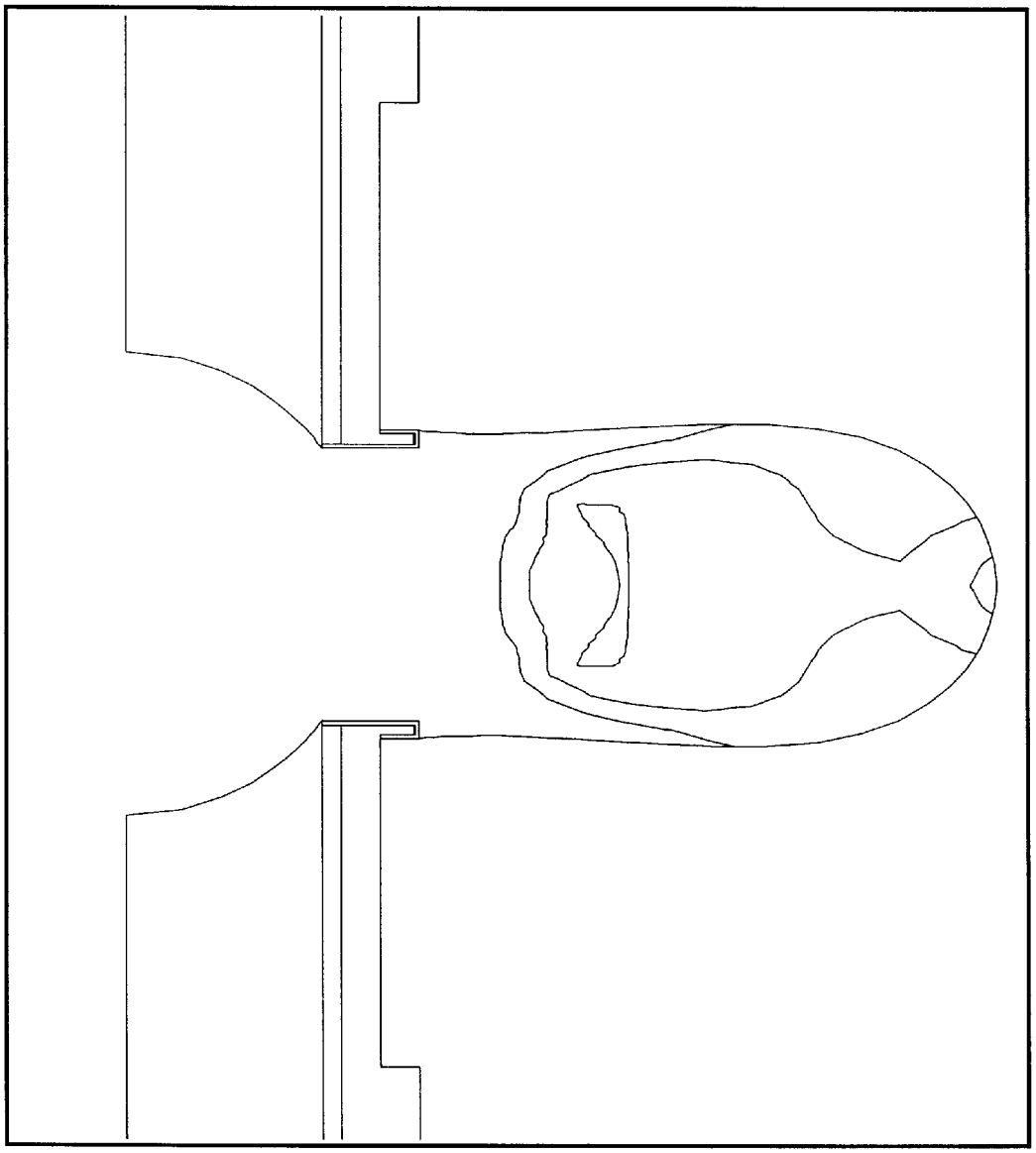

An image source 52 may be raster image data from a scanner or computer, or outline image data in the form of a page description language (PDL), or other forms of digital image representation. This image data is converted to a pixel-mapped page image by the image processing system 53. This may be a raster image processor (RIP) in the case of PDL image data, or may be pixel image manipulation in the case of raster image data. Continuous tone data produced by the image processing unit 53 is halftoned. Halftoning is performed by the Digital Halftoning unit 54. Halftoned bitmap image data is stored in the image memory 72. Depending upon the printer and system configuration, the image memory 72 may be a full page memory, or a band memory. Heater control circuits 71 read data from the image memory 72 and apply time-varying electrical pulses to the nozzle heaters (103 in FIG. 1(b)) that are part of the print head 50. These pulses are applied at an appropriate time, and to the appropriate nozzle, so that selected drops will form spots on the recording medium 51 in the appropriate position designated by the data in the image memory 72.

The recording medium 51 is moved relative to the head 50 by a paper transport system 65, which is electronically controlled by a paper transport control system 66, which in turn is controlled by a microcontroller 315. The paper transport system shown in FIG. 1(a) is schematic only, and many different mechanical configurations are possible. In the case of pagewidth print heads, it is most convenient to move the recording medium 51 past a stationary head 50. However, in the case of scanning print systems, it is usually most convenient to move the head 50 along one axis (the sub-scanning direction) and the recording medium 51 along the orthogonal axis (the main scanning direction), in a relative raster motion. The microcontroller 315 may also control the ink pressure regulator 63 and the heater control circuits 71.

For printing using surface tension reduction, ink is contained in an ink reservoir 64 under pressure. In the quiescent state (with no ink drop ejected), the ink pressure is insufficient to overcome the ink surface tension and eject a drop. A constant ink pressure can be achieved by applying pressure to the ink reservoir 64 under the control of an ink pressure regulator 63. Alternatively, for larger printing systems, the ink pressure can be very accurately generated and controlled by situating the top surface of the ink in the reservoir 64 an appropriate distance above the head 50. This ink level can be regulated by a simple float valve (not shown).

For printing using viscosity reduction, ink is contained in an ink reservoir 64 under pressure, and the ink pressure is caused to oscillate. The means of producing this oscillation may be a piezoelectric actuator mounted in the ink channels (not shown).

When properly arranged with the drop separation means, selected drops proceed to form spots on the recording medium 51, while unselected drops remain part of the body of ink.

The ink is distributed to the back surface of the head 50 by an ink channel device 75. The ink preferably flows through slots and/or holes etched through the silicon substrate of the head 50 to the front surface, where the nozzles and actuators are situated. In the case of thermal selection, the nozzle actuators are electrothermal heaters.

In some types of printers according to the invention, an external field 74 is required to ensure that the selected drop separates from the body of the ink and moves towards the recording medium 51. A convenient external field 74 is a constant electric field, as the ink is easily made to be electrically conductive. In this case, the paper guide or platen 67 can be made of electrically conductive material and used as one electrode generating the electric field. The other electrode can be the head 50 itself. Another embodiment uses proximity of the print medium as a means of discriminating between selected drops and unselected drops.

For small drop sizes gravitational force on the ink drop is very small; approximately $10^{-4}$ of the surface tension forces, so gravity can be ignored in most cases. This allows the print head 50 and recording medium 51 to be oriented in any direction in relation to the local gravitational field. This is an important requirement for portable printers.

FIG. 1(*b*) is a detail enlargement of a cross section of a single microscopic nozzle tip embodiment of the invention, fabricated using a modified CMOS process. The nozzle is etched in a substrate 101, which may be silicon, glass, metal, or any other suitable material. If substrates which are not semiconductor materials are used, a semiconducting material (such as amorphous silicon) may be deposited on the substrate, and integrated drive transistors and data distribution circuitry may be formed in the surface semiconducting layer. Single crystal silicon (SCS) substrates have several advantages, including:

1) High performance drive transistors and other circuitry can be fabricated in SCS;
2) Print heads can be fabricated in existing facilities (fabs) using standard VLSI processing equipment;
3) SCS has high mechanical strength and rigidity; and
4) SCS has a high thermal conductivity.

In this example, the nozzle is of cylindrical form, with the heater 103 forming an annulus. The nozzle tip 104 is formed from silicon dioxide layers 102 deposited during the fabrication of the CMOS drive circuitry. The nozzle tip is passivated with silicon nitride. The protruding nozzle tip controls the contact point of the pressurized ink 100 on the print head surface. The print head surface is also hydrophobized to prevent accidental spread of ink across the front of the print head.

Many other configurations of nozzles are possible, and nozzle embodiments of the invention may vary in shape, dimensions, and materials used. Monolithic nozzles etched from the substrate upon which the heater and drive electronics are formed have the advantage of not requiring an orifice plate. The elimination of the orifice plate has significant cost savings in manufacture and assembly. Recent methods for eliminating orifice plates include the use of 'vortex' actuators such as those described in Domoto et al U.S. Pat. No. 4,580,158, 1986, assigned to Xerox, and Miller et al U.S. Pat. No. 5,371,527, 1994 assigned to Hewlett-Packard. These, however are complex to actuate, and difficult to fabricate. The preferred method for elimination of orifice plates for print heads of the invention is incorporation of the orifice into the actuator substrate.

This type of nozzle may be used for print heads using various techniques for drop separation.

Operation with Electrostatic Drop Separation

As a first example, operation using thermal reduction of surface tension and electrostatic drop separation is shown in FIG. 2.

FIG. 2 shows the results of energy transport and fluid dynamic simulations performed using FIDAP, a commercial fluid dynamic simulation software package available from Fluid Dynamics Inc., of Illinois, USA. This simulation is of a thermal drop selection nozzle embodiment with a diameter of 8 $\mu$m, at an ambient temperature of 30° C. The total energy applied to the heater is 276 nJ, applied as 69 pulses of 4 nJ each. The ink pressure is 10 kPa above ambient air pressure, and the ink viscosity at 30° C. is 1.84 cPs. The ink is water based, and includes a sol of 0.1% palmitic acid to achieve an enhanced decrease in surface tension with increasing temperature. A cross section of the nozzle tip from the central axis of the nozzle to a radial distance of 40 $\mu$m is shown. Heat flow in the various materials of the nozzle, including silicon, silicon nitride, amorphous silicon dioxide, crystalline silicon dioxide, and water based ink are simulated using the respective densities, heat capacities, and thermal conductivities of the materials. The time step of the simulation is 0.1 $\mu$s.

FIG. 2(*a*) shows a quiescent state, just before the heater is actuated. An equilibrium is created whereby no ink escapes the nozzle in the quiescent state by ensuring that the ink pressure plus external electrostatic field is insufficient to overcome the surface tension of the ink at the ambient temperature. In the quiescent state, the meniscus of the ink does not protrude significantly from the print head surface, so the electrostatic field is not significantly concentrated at the meniscus.

FIG. 2(*b*) shows thermal contours at 5° C. intervals 5 $\mu$s after the start of the heater energizing pulse. When the heater is energized, the ink in contact with the nozzle tip is rapidly heated. The reduction in surface tension causes the heated portion of the meniscus to rapidly expand relative to the cool ink meniscus. This drives a convective flow which rapidly transports this heat over part of the free surface of the ink at the nozzle tip. It is necessary for the heat to be distributed over the ink surface, and not just where the ink is in contact with the heater. This is because viscous drag against the solid heater prevents the ink directly in contact with the heater from moving.

FIG. 2(*c*) shows thermal contours at 5° C. intervals 10 $\mu$s after the start of the heater energizing pulse. The increase in temperature causes a decrease in surface tension, disturbing the equilibrium of forces. As the entire meniscus has been heated, the ink begins to flow.

FIG. 2(*d*) shows thermal contours at 5° C. intervals 20 $\mu$s after the start of the heater energizing pulse. The ink pressure has caused the ink to flow to a new meniscus position, which protrudes from the print head. The electrostatic field becomes concentrated by the protruding conductive ink drop.

FIG. 2(*e*) shows thermal contours at 5° C. intervals 30 $\mu$s after the start of the heater energizing pulse, which is also 6 $\mu$s after the end of the heater pulse, as the heater pulse duration is 24 $\mu$s. The nozzle tip has rapidly cooled due to conduction through the oxide layers, and conduction into the flowing ink. The nozzle tip is effectively 'water cooled' by the ink. Electrostatic attraction causes the ink drop to begin to accelerate towards the recording medium. Were the heater pulse significantly shorter (less than 16 $\mu$s in this case) the ink would not accelerate towards the print medium, but would instead return to the nozzle.

FIG. 2(*f*) shows thermal contours at 5° C. intervals 26 $\mu$s after the end of the heater pulse. The temperature at the nozzle tip is now less than 5° C. above ambient temperature. This causes an increase in surface tension around the nozzle tip. When the rate at which the ink is drawn from the nozzle tip exceeds the viscously limited rate of ink flow through the nozzle, the ink in the region of the nozzle tip 'necks', and the selected drop separates from the body of ink. The selected drop then travels to the recording medium under the influence of the external electrostatic field. The meniscus of the ink at the nozzle tip then returns to its quiescent position, ready for the next heat pulse to select the next ink drop. One ink drop is selected, separated and forms a spot on the recording medium for each heat pulse. As the heat pulses are electrically controlled, drop on demand ink jet operation can be achieved.

Figure 3A:
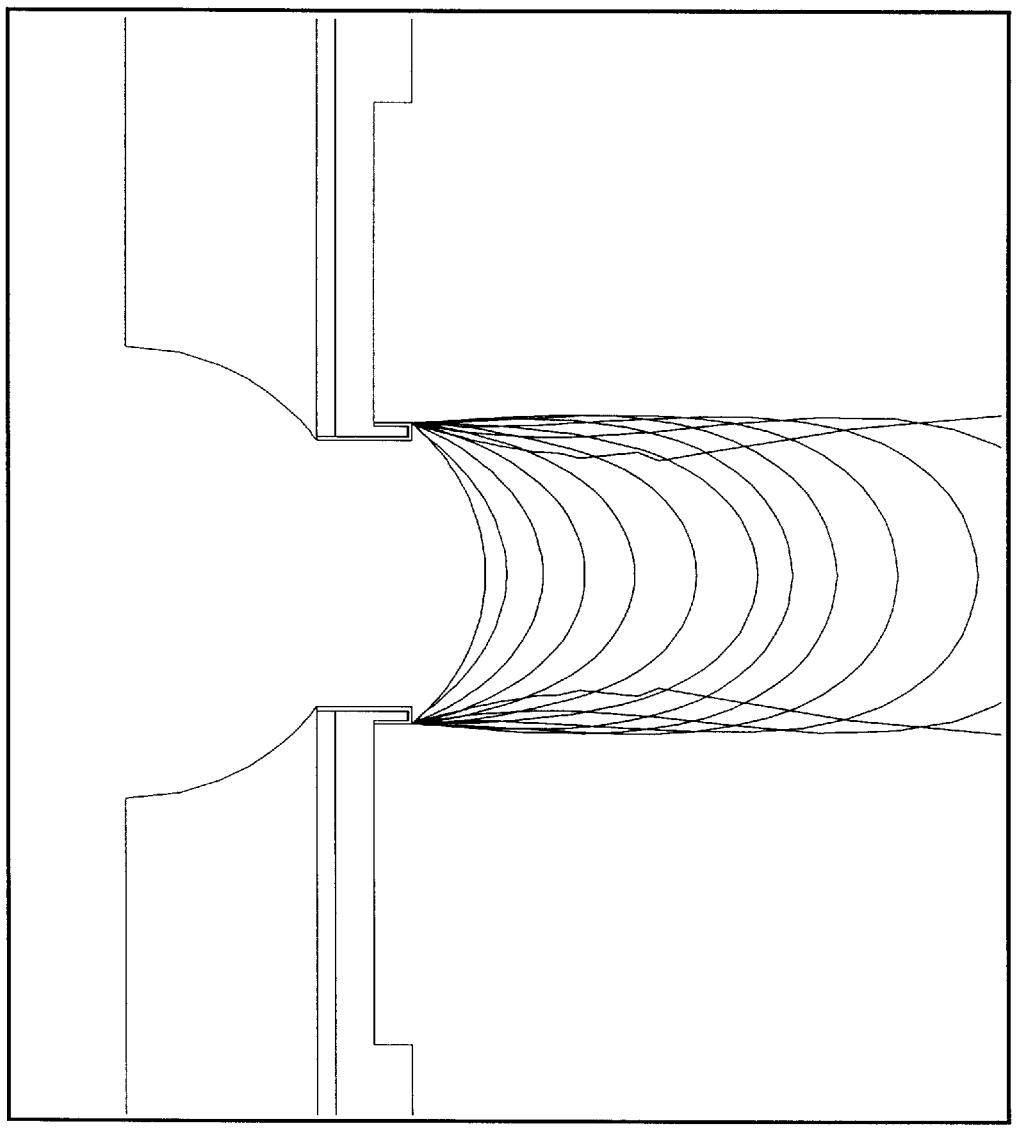
FIG. 3(a) shows a finite element fluid dynamic simulation of a nozzle in operation according to an embodiment of the invention.

FIG. 3(a) shows successive meniscus positions during the drop selection cycle at 5 μs intervals, starting at the beginning of the heater energizing pulse.

Figure 3B:
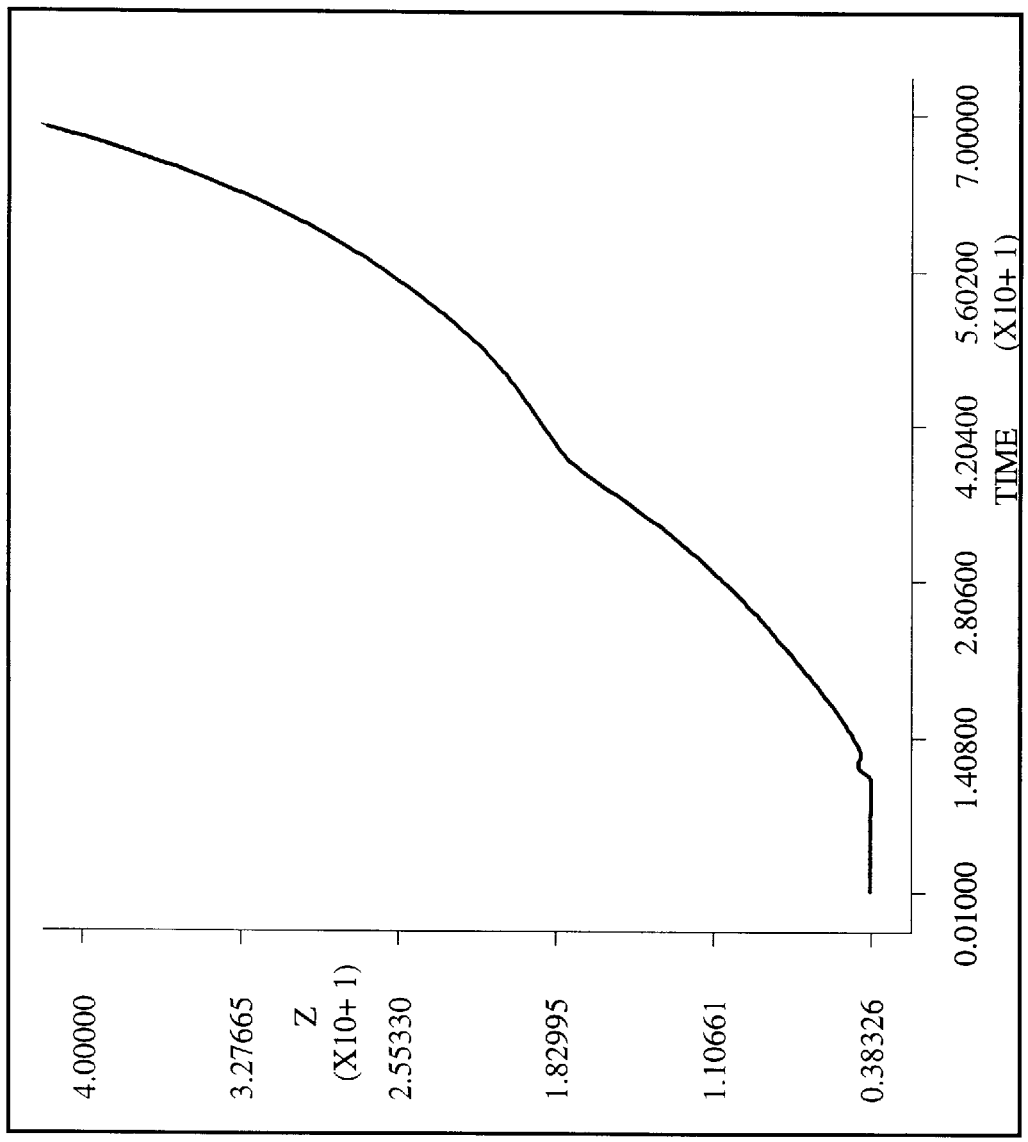
FIG. 3(b) shows successive meniscus positions during drop selection and separation.

FIG. 3(b) is a graph of meniscus position versus time, showing the movement of the point at the centre of the meniscus. The heater pulse starts 10 μs into the simulation.

Figure 3C:
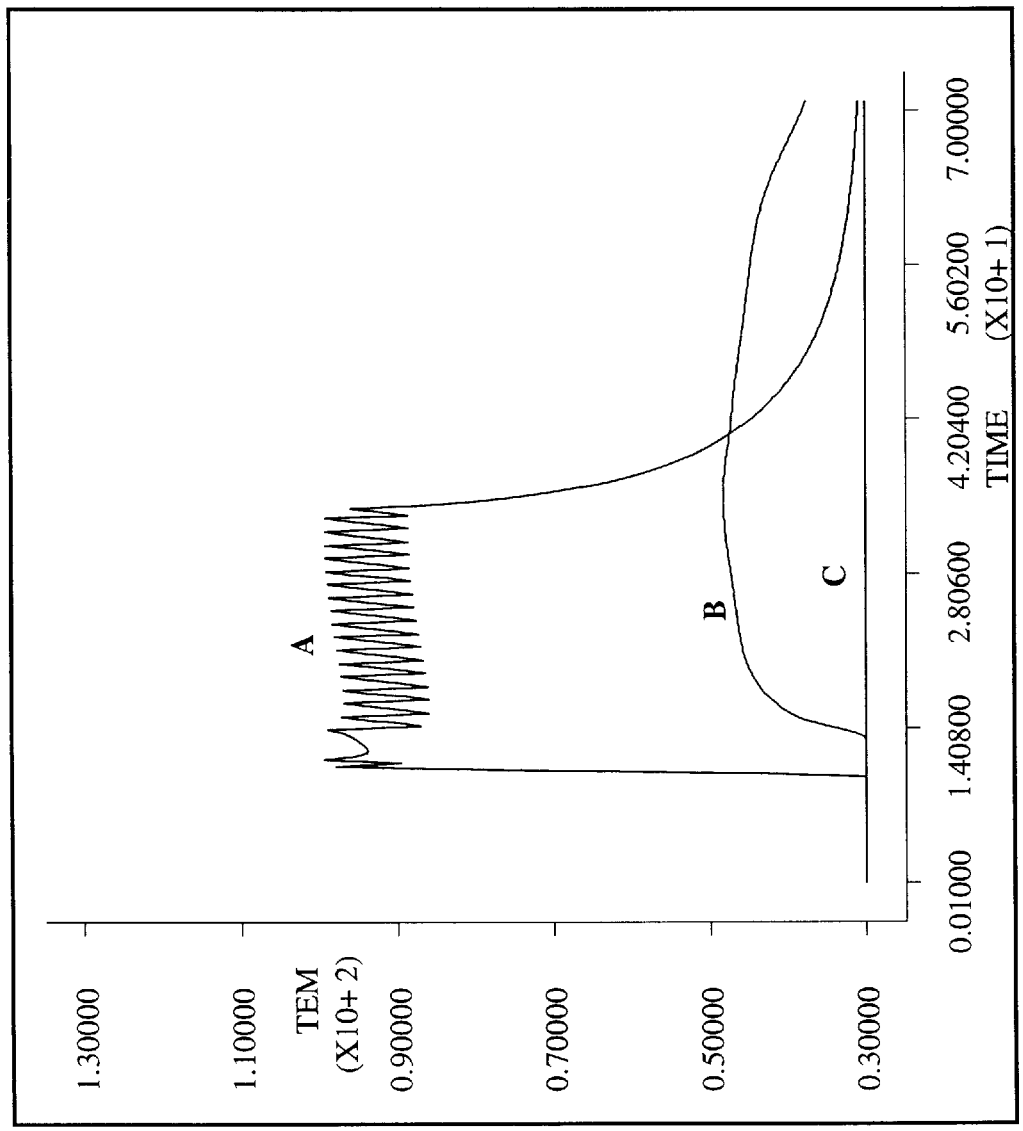
FIG. 3(c) shows the temperatures at various points during a Thermal LIFT drop selection cycle.

FIG. 3(c) shows the resultant curve of temperature with respect to time at various points in the nozzle. The vertical axis of the graph is temperature, in units of 100° C. The horizontal axis of the graph is time, in units of 10 μs. The temperature curve shown in FIG. 3(b) was calculated by FIDAP, using 0.1 μs time steps. The local ambient temperature is 30 degrees C. Temperature histories at three points are shown:

A—Nozzle tip: This shows the temperature history at the circle of contact between the passivation layer, the ink, and air.

B—Meniscus midpoint: This is at a circle on the ink meniscus midway between the nozzle tip and the centre of the meniscus.

C—Chip surface: This is at a point on the print head surface 20 μm from the centre of the nozzle. The temperature only rises a few degrees. This indicates that active circuitry can be located very close to the nozzles without experiencing performance or lifetime degradation due to elevated temperatures.

Figure 3D:
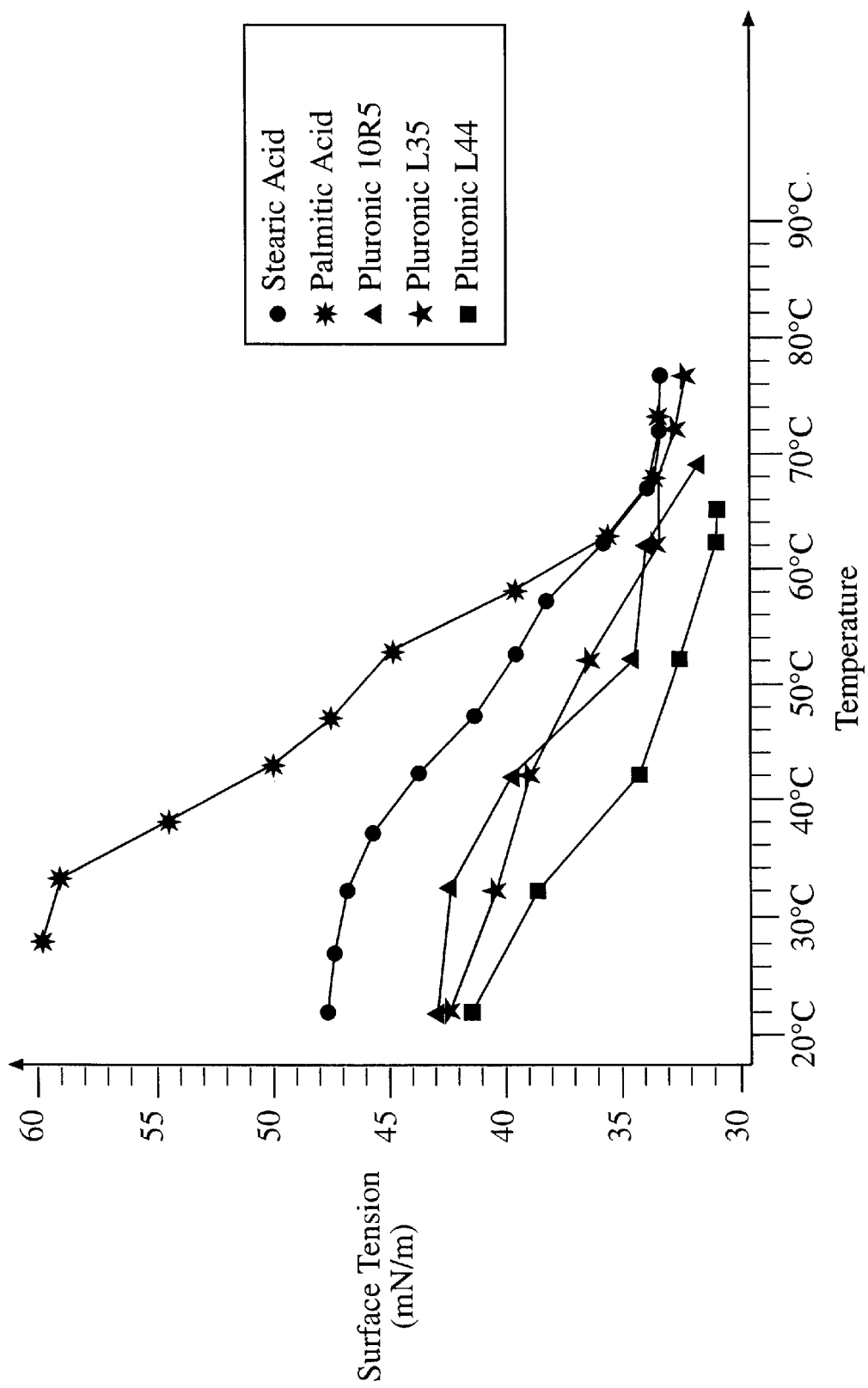
FIG. 3(d) shows measured surface tension versus temperature curves for various ink additives.
Figure 3E:
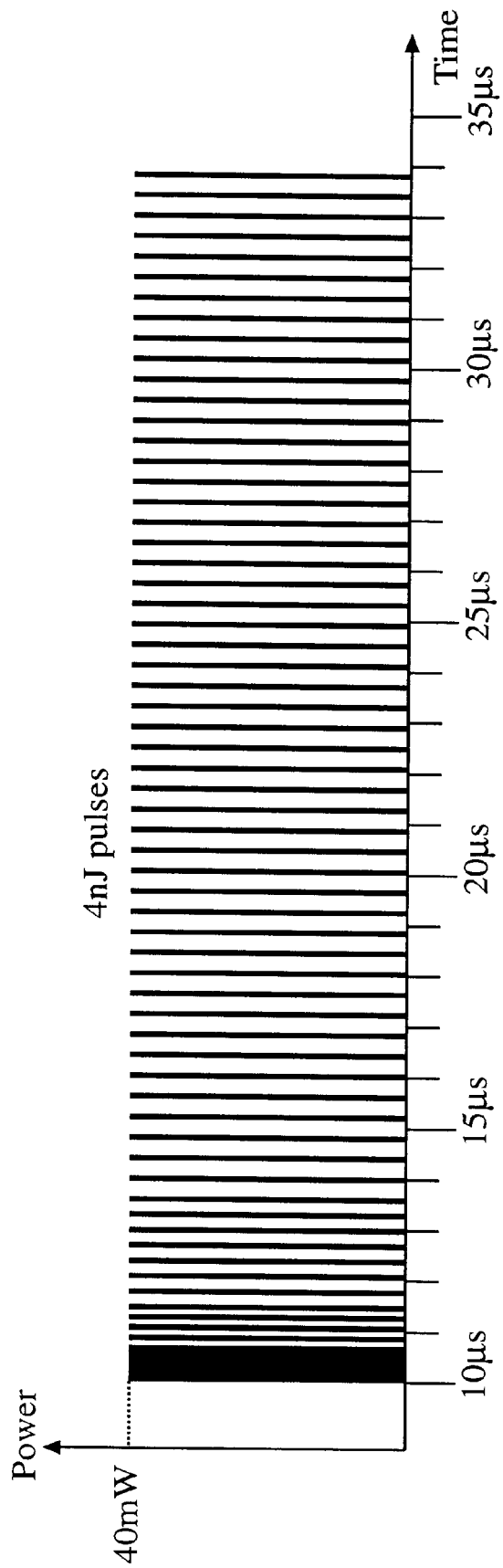
FIG. 3(e) shows the power pulses which are applied to the nozzle heater to generate the temperature curves of FIG. 3(c)

FIG. 3(e) shows the power applied to the heater. Optimum operation requires a sharp rise in temperature at the start of the heater pulse, a maintenance of the temperature a little below the boiling point of the ink for the duration of the pulse, and a rapid fall in temperature at the end of the pulse. To achieve this, the average energy applied to the heater is varied over the duration of the pulse. In this case, the variation is achieved by pulse frequency modulation of 0.1 μs sub-pulses, each with an energy of 4 nJ. The peak power applied to the heater is 40 mW, and the average power over the duration of the heater pulse is 11.5 mW. The sub-pulse frequency in this case is 5 Mhz. This can readily be varied without significantly affecting the operation of the print head. A higher sub-pulse frequency allows finer control over the power applied to the heater. A sub-pulse frequency of 13.5 Mhz is suitable, as this frequency is also suitable for minimizing the effect of radio frequency interference (RFI).

Ink

FIG. 3(d) shows the measured effect of temperature on the surface tension of various aqueous preparations containing the following additives:
1) 0.1% sol of Stearic Acid
2) 0.1% sol of Palmitic acid
3) 0.1% solution of Pluronic 10R5 (trade mark of BASF)
4) 0.1% solution of Pluronic L35 (trade mark of BASF)
5) 0.1% solution of Pluronic L4 (trade mark of BASF)

Operation Using Reduction of Viscosity

As a second example, operation of an embodiment using thermal reduction of viscosity and proximity drop separation, in combination with hot melt ink, is as follows. Prior to operation of the printer, solid ink is melted in the reservoir 64. The reservoir, ink passage to the print head, ink channels 75, and print head 50 are maintained at a temperature at which the ink 100 is liquid, but exhibits a relatively high viscosity (for example, approximately 100 cP). The Ink 100 is retained in the nozzle by the surface tension of the ink. The ink 100 is formulated so that the viscosity of the ink reduces with increasing temperature. The ink pressure oscillates at a frequency which is an integral multiple of the drop ejection frequency from the nozzle. The ink pressure oscillation causes oscillations of the ink meniscus at the nozzle tips, but this oscillation is small due to the high ink viscosity. At the normal operating temperature, these oscillations are of insufficient amplitude to result in drop separation. When the heater 103 is energized, the ink forming the selected drop is heated, causing a reduction in viscosity to a value which is preferably less than 5 cP. The reduced viscosity results in the ink meniscus moving further during the high pressure part of the ink pressure cycle. The recording medium 51 is arranged sufficiently close to the print head 50 so that the selected drops contact the recording medium 51, but sufficiently far away that the unselected drops do not contact the recording medium 51. Upon contact with the recording medium 51, part of the selected drop freezes, and attaches to the recording medium. As the ink pressure falls, ink begins to move back into the nozzle. The body of ink separates from the ink which is frozen onto the recording medium. The meniscus of the ink 100 at the nozzle tip then returns to low amplitude oscillation. The viscosity of the ink increases to its quiescent level as remaining heat is dissipated to the bulk ink and print head. One ink drop is selected, separated and forms a spot on the recording medium 51 for each heat pulse. As the heat pulses are electrically controlled, drop on demand ink jet operation can be achieved.

Image Processing for Print Heads

An objective of printing systems according to the invention is to attain a print quality which is equal to that which people are accustomed to in quality color publications printed using offset printing. This can be achieved using a print resolution of approximately 1,600 dpi. However, 1,600 dpi printing is difficult and expensive to achieve. Similar results can be achieved using 800 dpi printing, with 2 bits per pixel for cyan and magenta, and one bit per pixel for yellow and black. This color model is herein called CC'MM'YK. Where high quality monochrome image printing is also required, two bits per pixel can also be used for black. This color model is herein called CC'MM'YKK'.

Applications Using Print Heads According to this Invention

Printing apparatus and methods of this invention are suitable for a wide range of applications, including (but not limited to) the following: color and monochrome office printing, short run digital printing, high speed digital printing, process color printing, spot color printing, offset press supplemental printing, low cost printers using scanning print heads, high speed printers using pagewidth print heads, portable color and monochrome printers, color and monochrome copiers, color and monochrome facsimile machines, combined printer, facsimile and copying machines, label printing, large format plotters, photographic duplication, printers for digital photographic processing, portable printers incorporated into digital 'instant' cameras, video printing, printing of PhotoCD images, portable printers for 'Personal Digital Assistants', wallpaper printing, indoor sign printing, billboard printing, and fabric printing.

Compensation of Print Heads for Environmental Conditions

It is desirable that drop on demand printing systems have consistent and predictable ink drop size and position. Unwanted variation in ink drop size and position causes variations in the optical density of the resultant print, reducing the perceived print quality. These variations should be kept to a small proportion of the nominal ink drop volume and pixel spacing respectively. Many environmental variables can be compensated to reduce their effect to insignificant levels. Active compensation of some factors can be achieved by varying the power applied to the nozzle heaters.

An optimum temperature profile for one print head embodiment involves an instantaneous raising of the active region of the nozzle tip to the ejection temperature, maintenance of this region at the ejection temperature for the duration of the pulse, and instantaneous cooling of the region to the ambient temperature.

To obtain accurate results, a transient fluid dynamic simulation with free surface modeling is required, as convection in the ink, and ink flow, significantly affect the temperature achieved with a specific power curve.

By the incorporation of appropriate digital circuitry on the print head substrate, it is practical to individually control the power applied to each nozzle. One way to achieve this is by 'broadcasting' a variety of different digital pulse trains across the print head chip, and selecting the appropriate pulse train for each nozzle using multiplexing circuits.

An example of the environmental factors which may be compensated for is listed in the table "Compensation for environmental factors". This table identifies which environmental factors are best compensated globally (for the entire print head), per chip (for each chip in a composite multi-chip print head), and per nozzle.

Compensation for environmental factors

| Factor compensated | Scope | Sensing or user control method | Compensation mechanism |
| --- | --- | --- | --- |
| Ambient Temperature | Global | Temperature sensor mounted on print head | Power supply voltage or global PFM patterns |
| Power supply voltage fluctuation with number of active nozzles | Global | Predictive active nozzle count based on print data | Power supply voltage or global PFM patterns |
| Local heat build-up with successive nozzle actuation | Per nozzle | Predictive active nozzle count based on print data | Selection of appropriate PFM pattern for each printed drop |
| Drop size control for multiple bits per pixel | Per nozzle | Image data | Selection of appropriate PFM pattern for each printed drop |
| Nozzle geometry variations between wafers | Per chip | Factory measurement, datafile supplied with print head | Global PFM patterns per print head chip |
| Heater resistivity variations between wafers | Per chip | Factory measurement, datafile supplied with print head | Global PFM patterns per print head chip |
| User image intensity adjustment | Global | User selection | Power supply voltage, electrostatic acceleration voltage, or ink pressure |
| Ink surface tension reduction method and threshold temperature | Global | Ink cartridge sensor or user selection | Global PFM patterns |
| Ink viscosity | Global | Ink cartridge sensor or user selection | Global PFM patterns and/or clock rate |
| Ink dye or pigment concentration | Global | Ink cartridge sensor or user selection | Global PFM patterns |
| Ink response time | Global | Ink cartridge sensor or user selection | Global PFM patterns |

This optimum is not achievable due to the stored heat capacities and thermal conductivities of the various materials used in the fabrication of the nozzles in accordance with the invention. However, improved performance can be achieved by shaping the power pulse using curves which can be derived by iterative refinement of finite element simulation of the print head. The power applied to the heater can be varied in time by various techniques, including, but not limited to:
1) Varying the voltage applied to the heater
2) Modulating the width of a series of short pulses (PWM)
3) Modulating the frequency of a series of short pulses (PFM)

Most applications will not require compensation for all of these variables. Some variables have a minor effect, and compensation is only necessary where very high image quality is required.

Print head drive circuits

Figure 4:
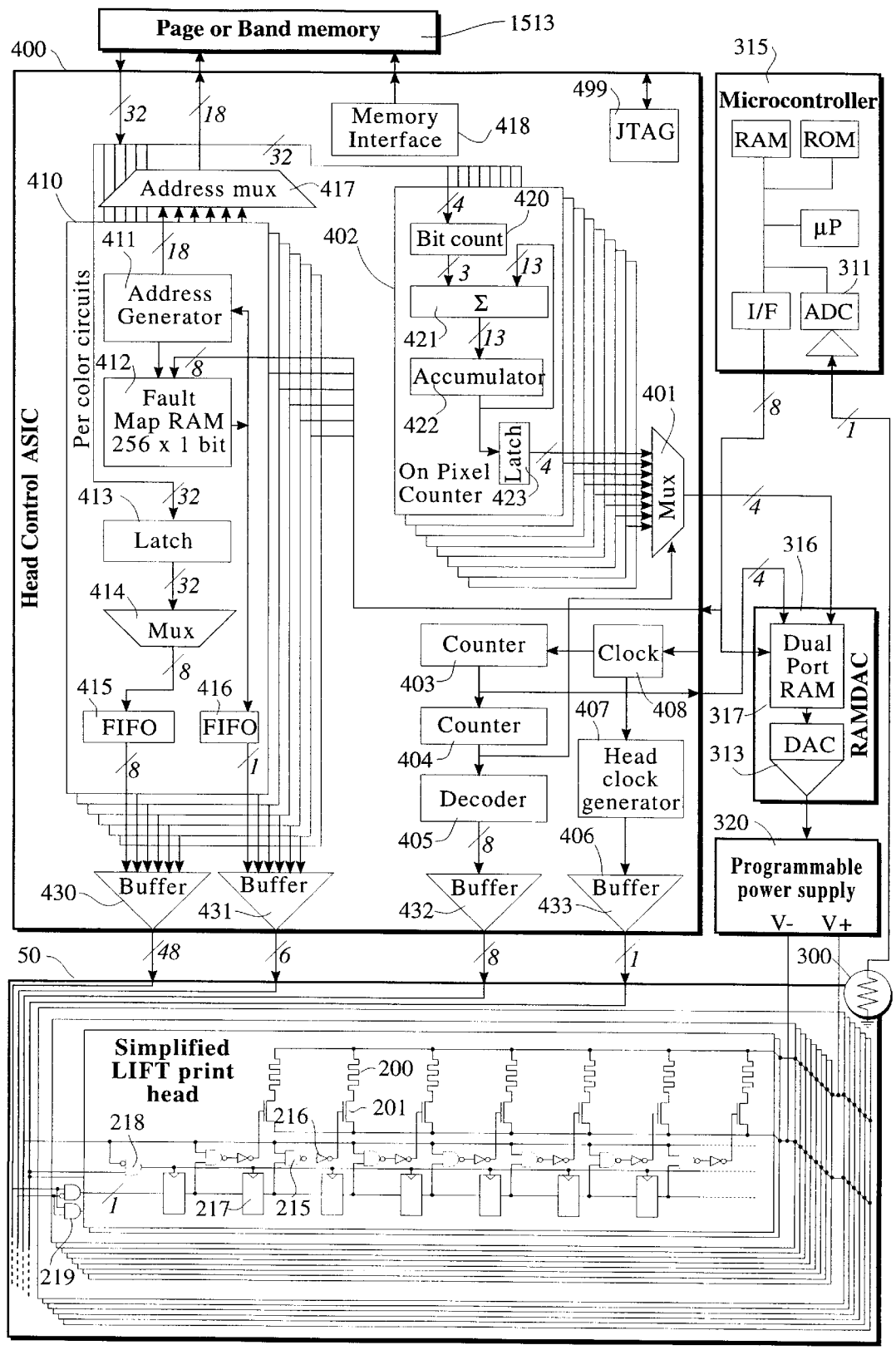
FIG. 4 shows a block schematic diagram of print head drive circuitry for practice of the invention.

FIG. 4 is a block schematic diagram showing electronic operation of an example head driver circuit in accordance with this invention. This control circuit uses analog modulation of the power supply voltage applied to the print head to achieve heater power modulation, and does not have individual control of the power applied to each nozzle. FIG. 4 shows a block diagram for a system using an 800 dpi pagewidth print head which prints process color using the CC'MM'YK color model. The print head 50 has a total of 79,488 nozzles, with 39,744 main nozzles and 39,744 redundant nozzles. The main and redundant nozzles are divided into six colors, and each color is divided into 8 drive phases. Each drive phase has a shift register which converts the serial data from a head control ASIC 400 into parallel data for enabling heater drive circuits. There is a total of 96 shift registers, each providing data for 828 nozzles. Each shift register is composed of 828 shift register stages 217, the outputs of which are logically anded with phase enable signal by a nand gate 215. The output of the nand gate 215 drives an inverting buffer 216, which in turn controls the drive transistor 201. The drive transistor 201 actuates the electrothermal heater 200, which may be a heater 103 as shown in FIG. 1(*b*). To maintain the shifted data valid during the enable pulse, the clock to the shift register is stopped the enable pulse is active by a clock stopper 218, which is shown as a single gate for clarity, but is preferably any of a range of well known glitch free clock control circuits. Stopping the clock of the shift register removes the requirement for a parallel data latch in the print head, but adds some complexity to the control circuits in the Head Control ASIC 400. Data is routed to either the main nozzles or the redundant nozzles by the data router 219 depending on the state of the appropriate signal of the fault status bus.

The print head shown in FIG. 4 is simplified, and does not show various means of improving manufacturing yield, such as block fault tolerance. Drive circuits for different configurations of print head can readily be derived from the apparatus disclosed herein.

Digital information representing patterns of dots to be printed on the recording medium is stored in the Page or Band memory 1513, which may be the same as the Image memory 72 in FIG. 1(*a*). Data in 32 bit words representing dots of one color is read from the Page or Band memory 1513 using addresses selected by the address mux 417 and control signals generated by the Memory Interface 418. These addresses are generated by Address generators 411, which forms part of the 'Per color circuits' 410, for which there is one for each of the six color components. The addresses are generated based on the positions of the nozzles in relation to the print medium. As the relative position of the nozzles may be different for different print heads, the Address generators 411 are preferably made programmable. The Address generators 411 normally generate the address corresponding to the position of the main nozzles. However, when faulty nozzles are present, locations of blocks of nozzles containing faults can be marked in the Fault Map RAM 412. The Fault Map RAM 412 is read as the page is printed. If the memory indicates a fault in the block of nozzles, the address is altered so that the Address generators 411 generate the address corresponding to the position of the redundant nozzles. Data read from the Page or Band memory 1513 is latched by the latch 413 and converted to four sequential bytes by the multiplexer 414. Timing of these bytes is adjusted to match that of data representing other colors by the FIFO 415. This data is then buffered by the buffer 430 to form the 48 bit main data bus to the print head 50. The data is buffered as the print head may be located a relatively long distance from the head control ASIC. Data from the Fault Map RAM 412 also forms the input to the FIFO 416. The timing of this data is matched to the data output of the FIFO 415, and buffered by the buffer 431 to form the fault status bus.

The programmable power supply 320 provides power for the head 50. The voltage of the power supply 320 is controlled by the DAC 313, which is part of a RAM and DAC combination (RAMDAC) 316. The RAMDAC 316 contains a dual port RAM 317. The contents of the dual port RAM 317 are programmed by the Microcontroller 315. Temperature is compensated by changing the contents of the dual port RAM 317. These values are calculated by the microcontroller 315 based on temperature sensed by a thermal sensor 300. The thermal sensor 300 signal connects to the Analog to Digital Converter (ADC) 311. The ADC 311 is preferably incorporated in the Microcontroller 315.

The Head Control ASIC 400 contains control circuits for thermal lag compensation and print density. Thermal lag compensation requires that the power supply voltage to the head 50 is a rapidly time-varying voltage which is synchronized with the enable pulse for the heater. This is achieved by programming the programmable power supply 320 to produce this voltage. An analog time varying programming voltage is produced by the DAC 313 based upon data read from the dual port RAM 317. The data is read according to an address produced by the counter 403. The counter 403 produces one complete cycle of addresses during the period of one enable pulse. This synchronization is ensured, as the counter 403 is clocked by the system clock 408, and the top count of the counter 403 is used to clock the enable counter 404. The count from the enable counter 404 is then decoded by the decoder 405 and buffered by the buffer 432 to produce the enable pulses for the head 50. The counter 403 may include a prescaler if the number of states in the count is less than the number of clock periods in one enable pulse. Sixteen voltage states are adequate to accurately compensate for the heater thermal lag. These sixteen states can be specified by using a four bit connection between the counter 403 and the dual port RAM 317. However, these sixteen states may not be linearly spaced in time. To allow non-linear timing of these states the counter 403 may also include a ROM or other device which causes the counter 403 to count in a non-linear fashion. Alternatively, fewer than sixteen states may be used.

For print density compensation, the printing density is detected by counting the number of pixels to which a drop is to be printed ('on' pixels) in each enable period. The 'on' pixels are counted by the On pixel counters 402. There is one On pixel counter 402 for each of the eight enable phases. The number of enable phases in a print head in accordance with the invention depend upon the specific design. Four, eight, and sixteen are convenient numbers, though there is no requirement that the number of enable phases is a power of two. The On Pixel Counters 402 can be composed of combinatorial logic pixel counters 420 which determine how many bits in a nibble of data are on. This number is then accumulated by the adder 421 and accumulator 422. A latch 423 holds the accumulated value valid for the duration of the enable pulse. The multiplexer 401 selects the output of the latch 423 which corresponds to the current enable phase, as determined by the enable counter 404. The output of the multiplexer 401 forms part of the address of the dual port RAM 317. An exact count of the number of 'on' pixels is not necessary, and the most significant four bits of this count are adequate.

Combining the four bits of thermal lag compensation address and the four bits of print density compensation address means that the dual port RAM 317 has an 8 bit address. This means that the dual port RAM 317 contains 256 numbers, which are in a two dimensional array. These two dimensions are time (for thermal lag compensation) and print density. A third dimension—temperature—can be included. As the ambient temperature of the head varies only slowly, the microcontroller 315 has sufficient time to calculate a matrix of 256 numbers compensating for thermal lag and print density at the current temperature. Periodically (for example, a few times a second), the microcontroller senses the current head temperature and calculates this matrix.

The clock to the print head 50 is generated from the system clock 408 by the Head clock generator 407, and buffered by the buffer 406. To facilitate testing of the Head control ASIC, JTAG test circuits 499 may be included.

Comparison with thermal ink jet technology

The table "Comparison between Thermal ink jet and Present Invention" compares the aspects of printing in accordance with the present invention with thermal ink jet printing technology.

A direct comparison is made between the present invention and thermal ink jet technology because both are drop on demand systems which operate using thermal actuators and liquid ink. Although they may appear similar, the two technologies operate on different principles.

Thermal ink jet printers use the following fundamental operating principle. A thermal impulse caused by electrical resistance heating results in the explosive formation of a bubble in liquid ink. Rapid and consistent bubble formation can be achieved by superheating the ink, so that sufficient heat is transferred to the ink before bubble nucleation is complete. For water based ink, ink temperatures of approximately 280° C. to 400° C. are required. The bubble formation causes a pressure wave which forces a drop of ink from the aperture with high velocity. The bubble then collapses, drawing ink from the ink reservoir to re-fill the nozzle. Thermal ink jet printing has been highly successful commercially due to the high nozzle packing density and the use of well established integrated circuit manufacturing techniques. However, thermal ink jet printing technology faces significant technical problems including multi-part precision fabrication, device yield, image resolution, 'pepper' noise, printing speed, drive transistor power, waste power dissipation, satellite drop formation, thermal stress, differential thermal expansion, kogation, cavitation, rectified diffusion, and difficulties in ink formulation.

Printing in accordance with the present invention has many of the advantages of thermal ink jet printing, and completely or substantially eliminates many of the inherent problems of thermal ink jet technology.

Comparison between Thermal ink jet and Present Invention

| | Thermal Ink-Jet | Present Invention |
|---|---|---|
| Drop selection mechanism | Drop ejected by pressure wave caused by thermally induced bubble | Choice of surface tension or viscosity reduction mechanisms |
| Drop separation mechanism | Same as drop selection mechanism | Choice of proximity, electrostatic, magnetic, and other methods |
| Basic ink carrier | Water | Water, microemulsion, alcohol, glycol, or hot melt |
| Head construction | Precision assembly of nozzle plate, ink channel, and substrate | Monolithic |
| Per copy printing cost | Very high due to limited print head life and expensive inks | Can be low due to permanent print heads and wide range of possible inks |
| Satellite drop formation | Significant problem which degrades image quality | No satellite drop formation |
| Operating ink temperature | 280° C. to 400° C. (high temperature limits dye use and ink formulation) | Approx. 70° C. (depends upon ink formulation) |
| Peak heater temperature | 400° C. to 1,000° C. (high temperature reduces device life) | Approx. 130° C. |
| Cavitation (heater erosion by bubble collapse) | Serious problem limiting head life | None (no bubbles are formed) |
| Kogation (coating of heater by ink ash) | Serious problem limiting head life and ink formulation | None (water based ink temperature does not exceed 100° C.) |
| Rectified diffusion (formation of ink bubbles due to pressure cycles) | Serious problem limiting ink formulation | Does not occur as the ink pressure does not go negative |
| Resonance | Serious problem limiting nozzle design and repetition rate | Very small effect as pressure waves are small |
| Practical resolution | Approx. 800 dpi max. | Approx. 1,600 dpi max. |
| Self-cooling operation | No (high energy required) | Yes: printed ink carries away drop selection energy |
| Drop ejection velocity | High (approx. 10 m/sec) | Low (approx. 1 m/sec) |
| Crosstalk | Serious problem requiring careful acoustic design, which limits nozzle refill rate. | Low velocities and pressures associated with drop ejection make crosstalk very small. |
| Operating thermal stress | Serious problem limiting print-head life. | Low: maximum temperature increase approx. 90° C. at center of heater. |

Comparison between Thermal ink jet and Present Invention

| | Thermal Ink-Jet | Present Invention |
|---|---|---|
| Manufacturing thermal stress | Serious problem limiting print-head size. | Same as standard CMOS manufacturing process. |
| Drop selection energy | Approx. 20 µJ | Approx. 270 nJ |
| Heater pulse period | Approx. 2–3 µs | Approx. 15–30 µs |
| Average heater pulse power | Approx. 8 Watts per heater. | Approx. 12 mW per heater. This is more than 500 times less than Thermal Ink-Jet. |
| Heater pulse voltage | Typically approx. 40 V. | Approx. 5 to 10 V. |
| Heater peak pulse current | Typically approx. 200 mA per heater. This requires bipolar or very large MOS drive transistors. | Approx. 4 mA per heater. This allows the use of small MOS drive transistors. |
| Fault tolerance | Not implemented. Not practical for edge shooter type. | Simple implementation results in better yield and reliability |
| Constraints on ink composition | Many constraints including kogation, nucleation, etc. | Temperature coefficient of surface tension or viscosity must be negative. |
| Ink pressure | Atmospheric pressure or less | Approx. 1.1 atm |
| Integrated drive circuitry | Bipolar circuitry usually required due to high drive current | CMOS, nMOS, or bipolar |
| Differential thermal expansion | Significant problem for large print heads | Monolithic construction reduces problem |
| Pagewidth print heads | Major problems with yield, cost, precision construction, head life, and power dissipation | High yield, low cost and long life due to fault tolerance. Self cooling due to low power dissipation |

Yield and Fault Tolerance

In most cases, monolithic integrated circuits cannot be repaired if they are not completely functional when manufactured. The percentage of operational devices which are produced from a wafer run is known as the yield. Yield has a direct influence on manufacturing cost. A device with a yield of 5% is effectively ten times more expensive to manufacture than an identical device with a yield of 50%.

There are three major yield measurements:
1) Fab yield
2) Wafer sort yield
3) Final test yield For large die, it is typically the wafer sort yield which is the most serious limitation on total yield. Full pagewidth color heads in accordance with this invention are very large in comparison with typical VLSI circuits. Good wafer sort yield is critical to the cost-effective manufacture of such heads.

Figure 5:
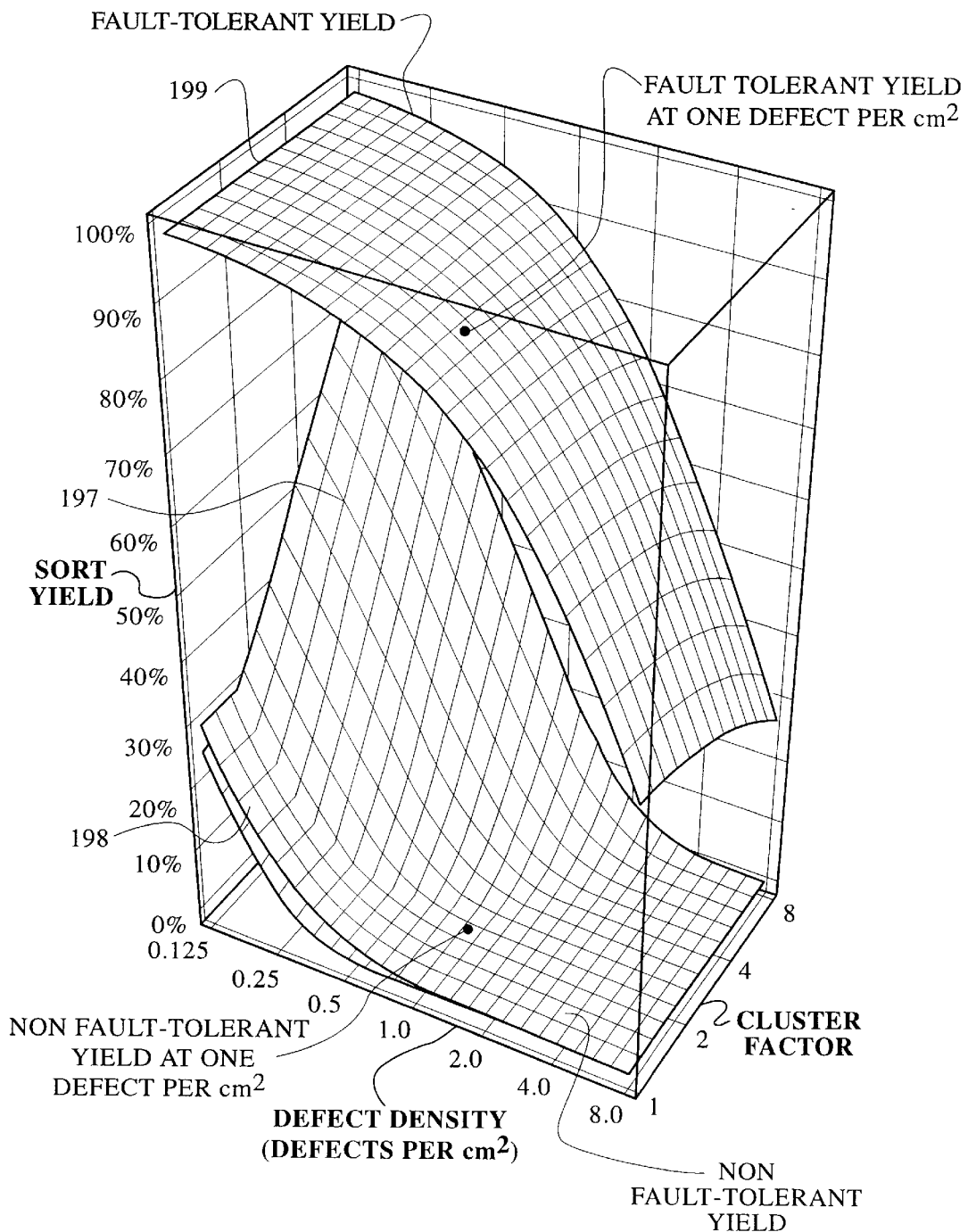
FIG. 5 shows projected manufacturing yields for an A4 page width color print head embodying features of the invention, with and without fault tolerance.

FIG. 5 is a graph of wafer sort yield versus defect density for a monolithic full width color A4 head embodiment of the invention. The head is 215 mm long by 5 mm wide. The non fault tolerant yield 198 is calculated according to Murphy's method, which is a widely used yield prediction method. With a defect density of one defect per square cm, Murphy's method predicts a yield less than 1%. This means that more than 99% of heads fabricated would have to be discarded. This low yield is highly undesirable, as the print head manufacturing cost becomes unacceptably high.

Murphy's method approximates the effect of an uneven distribution of defects. FIG. 5 also includes a graph of non fault tolerant yield 197 which explicitly models the clustering of defects by introducing a defect clustering factor. The defect clustering factor is not a controllable parameter in manufacturing, but is a characteristic of the manufacturing process. The defect clustering factor for manufacturing processes can be expected to be approximately 2, in which case yield projections closely match Murphy's method.

A solution to the problem of low yield is to incorporate fault tolerance by including redundant functional units on the chip which are used to replace faulty functional units.

In memory chips and most Wafer Scale Integration (WSI) devices, the physical location of redundant sub-units on the chip is not important. However, in printing heads the redundant sub-unit may contain one or more printing actuators. These must have a fixed spatial relationship to the page being printed. To be able to print a dot in the same position as a faulty actuator, redundant actuators must not be displaced in the non-scan direction. However, faulty actuators can be replaced with redundant actuators which are displaced in the scan direction. To ensure that the redundant actuator prints the dot in the same position as the faulty actuator, the data timing to the redundant actuator can be altered to compensate for the displacement in the scan direction.

To allow replacement of all nozzles, there must be a complete set of spare nozzles, which results in 100% redundancy. The requirement for 100% redundancy would normally more than double the chip area, dramatically reducing the primary yield before substituting redundant units, and thus eliminating most of the advantages of fault tolerance.

However, with print head embodiments according to this invention, the minimum physical dimensions of the head chip are determined by the width of the page being printed, the fragility of the head chip, and manufacturing constraints on fabrication of ink channels which supply ink to the back surface of the chip. The minimum practical size for a full width, full color head for printing A4 size paper is approximately 215 mm×5 mm. This size allows the inclusion of 100% redundancy without significantly increasing chip area, when using 1.5 µm CMOS fabrication technology.

Therefore, a high level of fault tolerance can be included without significantly decreasing primary yield.

When fault tolerance is included in a device, standard yield equations cannot be used. Instead, the mechanisms and degree of fault tolerance must be specifically analyzed and included in the yield equation. FIG. 5 shows the fault tolerant sort yield 199 for a full width color A4 head which includes various forms of fault tolerance, the modeling of which has been included in the yield equation. This graph shows projected yield as a function of both defect density and defect clustering. The yield projection shown in FIG. 5 indicates that thoroughly implemented fault tolerance can increase wafer sort yield from under 1% to more than 90% under identical manufacturing conditions. This can reduce the manufacturing cost by a factor of 100.

Fault tolerance is highly recommended to improve yield and reliability of print heads containing thousands of printing nozzles, and thereby make pagewidth printing heads practical. However, fault tolerance is not to be taken as an essential part of the present invention.

Printing System Embodiments

Figure 6:
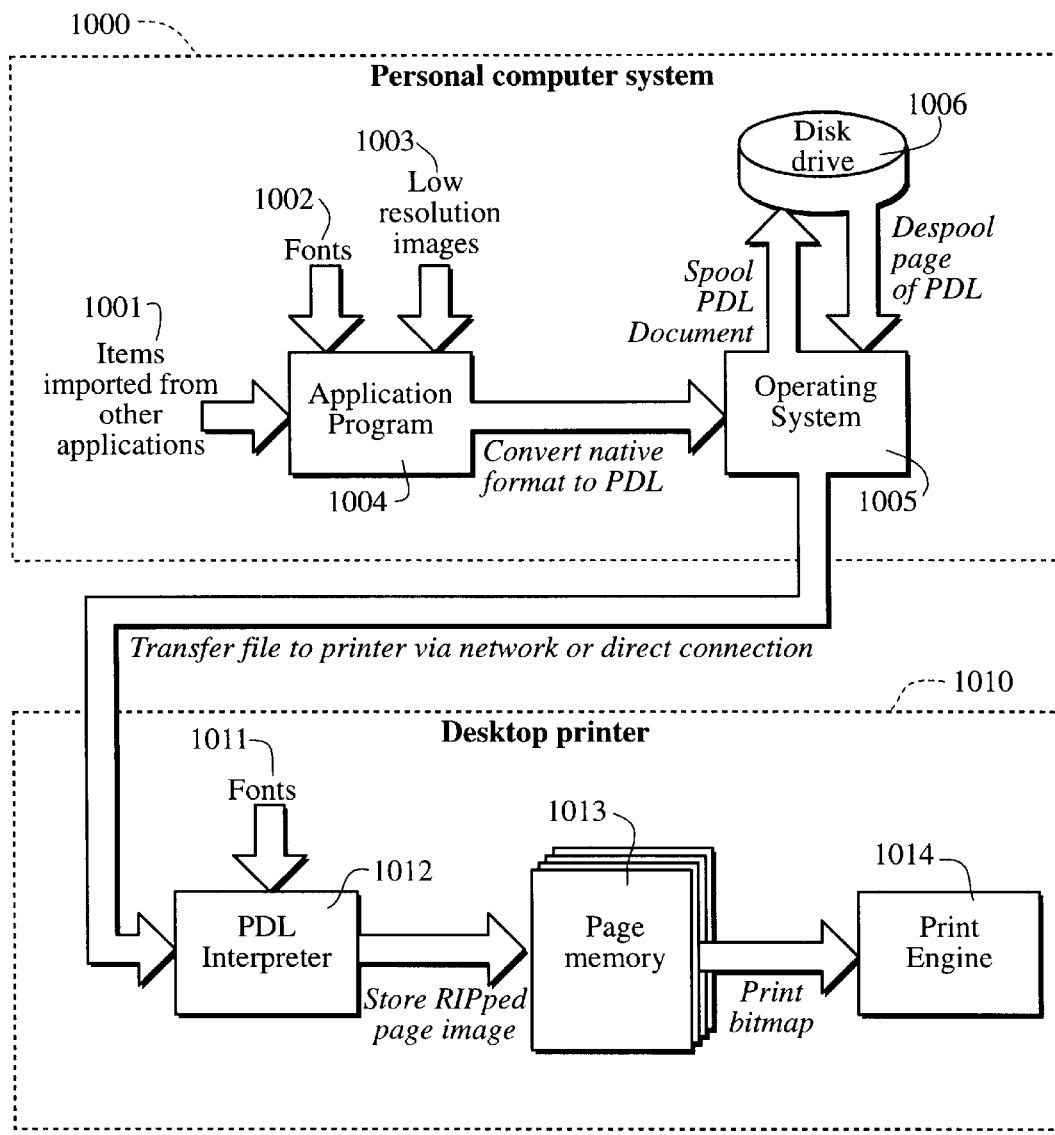
FIG. 6 is a block schematic diagram of a typical current office or home printing system.

A schematic diagram of a digital electronic printing system using a print head of this invention is shown in FIG. 6. This shows a monolithic printing head 50 printing an image 60 composed of a multitude of ink drops onto a recording medium 51. This medium will typically be paper, but can also be overhead transparency film, cloth, or many other substantially flat surfaces which will accept ink drops. The image to be printed is provided by an image source 52, which may be any image type which can be converted into a two dimensional array of pixels. Typical image sources are image scanners, digitally stored images, images encoded in a page description language (PDL) such as Adobe Postscript, Adobe Postscript level 2, or Hewlett-Packard PCL 5, page images generated by a procedure-call based rasterizer, such as Apple QuickDraw, Apple Quickdraw GX, or Microsoft GDI, or text in an electronic form such as ASCII. This image data is then converted by an image processing system 53 into a two dimensional array of pixels suitable for the particular printing system. This may be color or monochrome, and the data will typically have between 1 and 32 bits per pixel, depending upon the image source and the specifications of the printing system. The image processing system may be a raster image processor (RIP) if the source image is a page description, or may be a two dimensional image processing system if the source image is from a scanner.

If continuous tone images are required, then a halftoning system 54 is necessary. Suitable types of halftoning are based on dispersed dot ordered dither or error diffusion. Variations of these, commonly known as stochastic screening or frequency modulation screening are suitable. The halftoning system commonly used for offset printing—clustered dot ordered dither—is not recommended, as effective image resolution is unnecessarily wasted using this technique. The output of the halftoning system is a binary monochrome or color image at the resolution of the printing system according to the present invention.

The binary image is processed by a data phasing circuit 55 (which may be incorporated in a Head Control ASIC 400 as shown in FIG. 4) which provides the pixel data in the correct sequence to the data shift registers 56. Data sequencing is required to compensate for the nozzle arrangement and the movement of the paper. When the data has been loaded into the shift registers 56, it is presented in parallel to the heater driver circuits 57. At the correct time, the driver circuits 57 will electronically connect the corresponding heaters 58 with the voltage pulse generated by the pulse shaper circuit 61 and the voltage regulator 62. The heaters 58 heat the tip of the nozzles 59, affecting the physical characteristics of the ink. Ink drops 60 escape from the nozzles in a pattern which corresponds to the digital impulses which have been applied to the heater driver circuits. The pressure of the ink in the ink reservoir 64 is regulated by the pressure regulator 63. Selected drops of ink drops 60 are separated from the body of ink by the chosen drop separation means, and contact the recording medium 51. During printing, the recording medium 51 is continually moved relative to the print head 50 by the paper transport system 65. If the print head 50 is the full width of the print region of the recording medium 51, it is only necessary to move the recording medium 51 in one direction, and the print head 50 can remain fixed. If a smaller print head 50 is used, it is necessary to implement a raster scan system. This is typically achieved by scanning the print head 50 along the short dimension of the recording medium 51, while moving the recording medium 51 along its long dimension.

Digital high speed color printing systems

There are currently two major and widespread methods of printing on paper. For small quantities (typically less than 100 copies) digital printing using electrophotographic and drop-on-demand printing technologies are dominant in the home and office. For larger quantities of the same document (typically greater than 1,000 copies) commercial printing using offset and gravure printing presses are dominant.

Typical current home and office printing systems

FIG. 6 shows a typical digital office or home printing system in use at the time of writing. The two major components of the system are a personal computer system 1000 and a desktop printer 1010. The information to be printed is usually created by one or more application programs. There are many application programs in common use, which fall into several categories, such as page layout programs, drawing programs, word processing programs, database programs, spreadsheet programs, CAD programs, image processing programs, and so on, most of which have differing internal representations (native formats) of the document to be printed. Most of these programs can use items imported from other applications 1001, and digital typefaces or fonts 1002. Many application programs 1004 on desktop computers can also import photographic images. In practice, the use of photographic images is usually limited to low resolution images 1003 with less than approximately one million pixels. This is because high resolution images (of image quality equal to or greater than 35 mm film) typically require 18 MBytes to 100 MBytes of data to store each image. In most circumstances this data must be stored on the disk drive of the personal computer, and in many applications the full image data must reside at least temporarily in the main memory of the computer. Most desktop computers at the time of writing are not well equipped to efficiently manipulate high resolution photographic images, and so such images are not commonly used in office and home printing. Currently, documents printed in the home and office environments are composed primarily of text, graphics, bitmapped or vector 'clip-art' and low resolution images. Most of the application programs 1004 have the ability to print documents generated in the application. To do this, the internal native format is typically converted to a page description language (PDL) such as Adobe 'Postscript™', Adobe 'Postscript Level 2™', or Hewlett-Packard 'PCL5™'. Alternatively, the internal representation may be converted to a series of procedure calls to a graphics library, such as Microsoft 'GDI™' or Apple Computer 'Quickdraw™' or 'Quickdraw GX™'. (Product names market with the ' symbol are trademarks of the corresponding companies preceding the product name.) The document description is provided to the operating system 1005 of the personal computer 1000, which may spool the document to the disk drive 1006. When the desktop printer 1010 is ready to print a page, the operating system 1005 despools the description of the next page from the disk drive. The page information is then transferred to the desktop printer 1010 via a direct serial or parallel connection, or a local area network. The desktop printer 1010 may contain a PDL interpreter 1012, which converts the page description to a bitmap page representation using digital fonts 1011. The bitmap page representation is stored in a page memory 1013 and printed by the print engine 1014. The page memory 1013 is typically only large enough to store one page image, though in some desktop printers the page memory can store two page images to allow one page to be printed while a subsequent page is being calculated. In most cases, documents are not stored on the printer, so both the personal computer 1000 and the desktop printer 1010 are required to calculate and print any document, even if there has been no change to the document since the last time it was printed.

Typical current commercial printing systems

Figure 7:
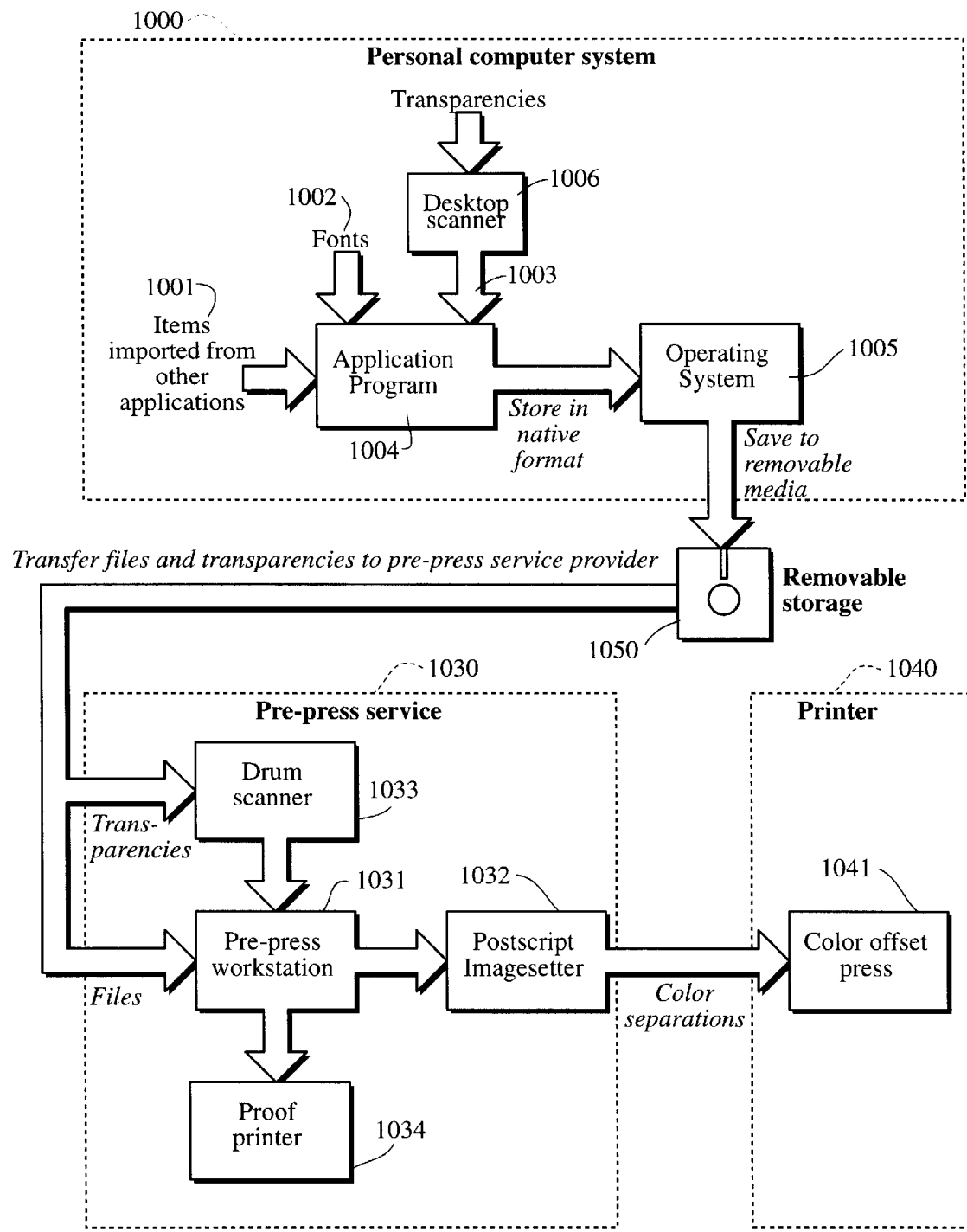
FIG. 7 is a block schematic diagram of a typical current commercial printing system.

FIG. 7 shows a typical commercial printing system in use at the time of writing. Three major components are used, typically at three separate sites. These are the personal computer systems 1000 used for desktop publishing, a prepress service 1030, which converts the electronic page descriptions produced using the personal computer systems 1000 into color separations, and the printer 1040, which makes printing plates using the color separations, and prints the documents typically using an offset press, a color offset press 1041, or, for very high volume printing, a gravure press. FIG. 7 specifically shows the systems typically used for color document printing when between 2,000 and 100,000 copies of each document are required. There are many variations in the specific use of equipment, and FIG. 7 is intended as an approximate guide only.

The information to be printed is usually created by one or more application programs. There are many application programs which may be used to create parts of the final document, such as drawing programs, word processing programs, database programs, spreadsheet programs, CAD programs, image processing programs, and so on. However, the final document is usually composed using a page layout application program 1004, such as Quark 'Express™' or Aldus 'Pagemaker™'. Page layout programs can use items imported from other applications 1001, digital typefaces or fonts 1002, and color images. Due to the memory, disk space and processing power constraints in desktop computers, high resolution photographic images are typically not used directly in the application programs 1004. Instead, low resolution images are used to mark the position that high resolution images are to take in the final document. These low resolution images 1003 may be imported into the application program 1004 using various means, including desktop scanners 1006 used to digitize film transparencies. The document description is normally stored in the native format for the application via the operating system 1005 to a removable storage medium. The removable medium is typically a removable hard disk, an optical disk, or magnetic tape. The document description is usually stored in the native format for the application instead of a page description language to make it easier to make minor changes (such as correcting typographical errors) before the document is printed. The removable media, plus the original transparencies, are then physically taken to the pre-press service company 1030. At the pre-press service company the transparencies are re-scanned at high resolution, typically using a drum scanner 1033. The native document description files are converted to Adobe 'Postscript' page description language, and combined with the high resolution scans to produce the final page layout. This page layout may be printed by a digital proof printer 1034 to obtain customer approval to proceed with the print run. When finalized, the page layout in Postscript format is sent to a Postscript imagesetter 1032, which produces a set of color separation films. Normally four color separation films are produced, defining the regions where cyan, magenta, yellow, and black ink are to be printed. The color separation films are usually produced at a resolution between 1,800 dpi and 3,600 dpi (inclusive) and usually use clustered dot ordered dithering as the method of halftoning. The high resolution of the color separations is necessary to prevent color banding when using simple clustered dot ordered dithering. Recently, other halftoning techniques such as variations of error diffusion and dispersed dot ordered dithering have been used to decrease the resolution required of the imagesetter, and eliminate such screening problems as rosettes, Moiré, and detail loss in the highlights. Once the color separations are made, a proof sheet is usually made. Once the proof is checked, the color separations are sent to the printer 1040. The printer uses the color separations to make a set of plates for a color offset press 1041. The plates are loaded on the press, and the document is printed. At present, most high volume full color printing is performed by web fed and sheet fed offset color presses. These machines print color pages using four etched printing plates, one for each of the four color components used in process printing; cyan, magenta, yellow, and black (CMYK). While these machines are highly efficient in printing large volumes of color pages, it is difficult, time consuming, and expensive to change the image being printed. When a new image is to be printed, color separations of the image must be created. Then proof sheets are created, to verify the quality and color of the printed image. These are usually created by a photographic process using the color separations created for the printing press. When the proof sheets are approved, four printing plates must be etched with the color separation images. Offset presses are also large and expensive and required extensive technical knowledge to operate effectively. Many technical parameters, such as dot gain, registration, and screen angles must be carefully controlled to obtain acceptable results. If the print run is greater than 10,000 copies, the set-up costs of the press can be effectively amortized over the volume printed. However, the cost and time required to set up a color press mean that only rarely is fewer than 1,000 copies of a page printed. If fewer than one hundred copies of a page are to be printed, then digital color copiers are generally used.

Digital color printers for commercial and office use

There is increasing recognition in the industry of the need for digital color printing systems which are capable of printing high quality color pages directly from computer data, without requiring photographic and platemaking processes. Desirable characteristics of a full color high speed digital printer for commercial and office use are:

1) >60 ppm for office printing, >240 ppm for commercial printing
2) at least 800 dpi print resolution using stochastic screening or error diffusion
3) reduced image noise, for example using CC'MM'YK printing 4) electronic collation and local page storage of at least 1,000 pages
5) automatically prints both sides of the paper (duplex)
6) uses standard PDLs such as Adobe 'Postscript'' and Hewlett-Packard 'PCL5''
7) ability to customize print runs at the full print speed
8) low capital cost for office printing, low price per page for commercial printing
9) high reliability
10) low maintenance Currently, the cost, size, and maintenance requirements of systems approaching these specifications prohibits their use in the typical office environment. However, a low maintenance digital color printing system using LIFT printing technology, and with specifications similar to those above may achieve considerable commercial success. However, while system cost is not a particularly important consideration for commercial printing, where large offset printing systems can cost as much as $25 million, throughput is important. High throughput, flexible operation, incremental investment, and high system reliability and uptime can be achieved by using multiple machines of moderate throughput. While parallel operation of multiple machines can increase throughput to any desired level, capital costs also scale with the number of machines used. For this reason, it is desirable that the capital cost of a single digital printer is relatively low compared to that of offset printers. To achieve widespread use in the commercial market, the price of a single printer unit as disclosed herein is preferably less than US $100,000. Cost, on the other hand, is very important in the office market. To achieve widespread use in the office market, the cost of the printer system is preferably less than US $20,000, with a price of approximately US $10,000 being a highly desirable target.

One of the significant problems in achieving cost targets such as these is the cost of electronic collation. Electronic collation requires the digital storage images of all of the pages in the document. The page images can be stored in a variety of formats, such as full bitmaps, compressed bitmaps, or in a page description language (PDL). Storage of the pages in PDL format has the significant disadvantage that each page must be rasterized each time it is printed. For many pages (especially those containing images or complex graphics) rasterization takes much longer than the one second or so required to print the page. Therefore, storing page images in PDL format for electronic collation will typically make the printer operate at much less than full speed. Storing the page images as uncompressed bitmaps creates problems with storage capacities and data rates. For example, an A4 page at 800 dpi with six bits per pixel (using the CC'MM'YK color model) requires approximately 46 MBytes per page. To print one duplex page per second requires a data rate of approximately 92 MBytes per second. Electronic storage of 1,000 pages requires 46 GBytes of data storage. While both the storage requirements and the data rate are technically achievable, the cost of such equipment using currently available semiconductor memories and disk drives is well in excess of the targeted US $10,000 retail price of the entire printer system.

Electronic collation using compressed, pre rasterized bitmaps can provide a solution to this problem. Desirable characteristics of such a system for commercial printing use are:
1) 10,000 or more pages stored in a high reliability RAID 10 GByte disk array
2) Fast compression (comparable to, or less than, the raster image processing time)
3) Sustained data rate required from disk of less than 4 MBytes per second to allow the use of low cost disk drive arrays
4) Real-time expansion of the compressed page images
5) Expansion can operate approximately synchronously to the print engine, so that a full page memory is not required
6) Negligible image quality loss Desirable characteristics of an office system are:
1) More than 1,000 pages stored in a low cost 1 GByte disk drive
2) Fast compression (comparable to, or less than, the raster image processing time)
3) Compression can operate on a band-by-band basis, so that a full page memory is not required
4) Sustained data rate required from disk of less than 1 MByte per second to allow the use of a single low cost disk drive
5) Real-time expansion of the compressed page images
6) Expansion can operate approximately synchronously to the print engine, so that a full page memory is not required
7) Negligible image quality loss.

To achieve these specifications, a compression rate of approximately 80:1 must be achieved with negligible image quality loss.

Figure 8A:
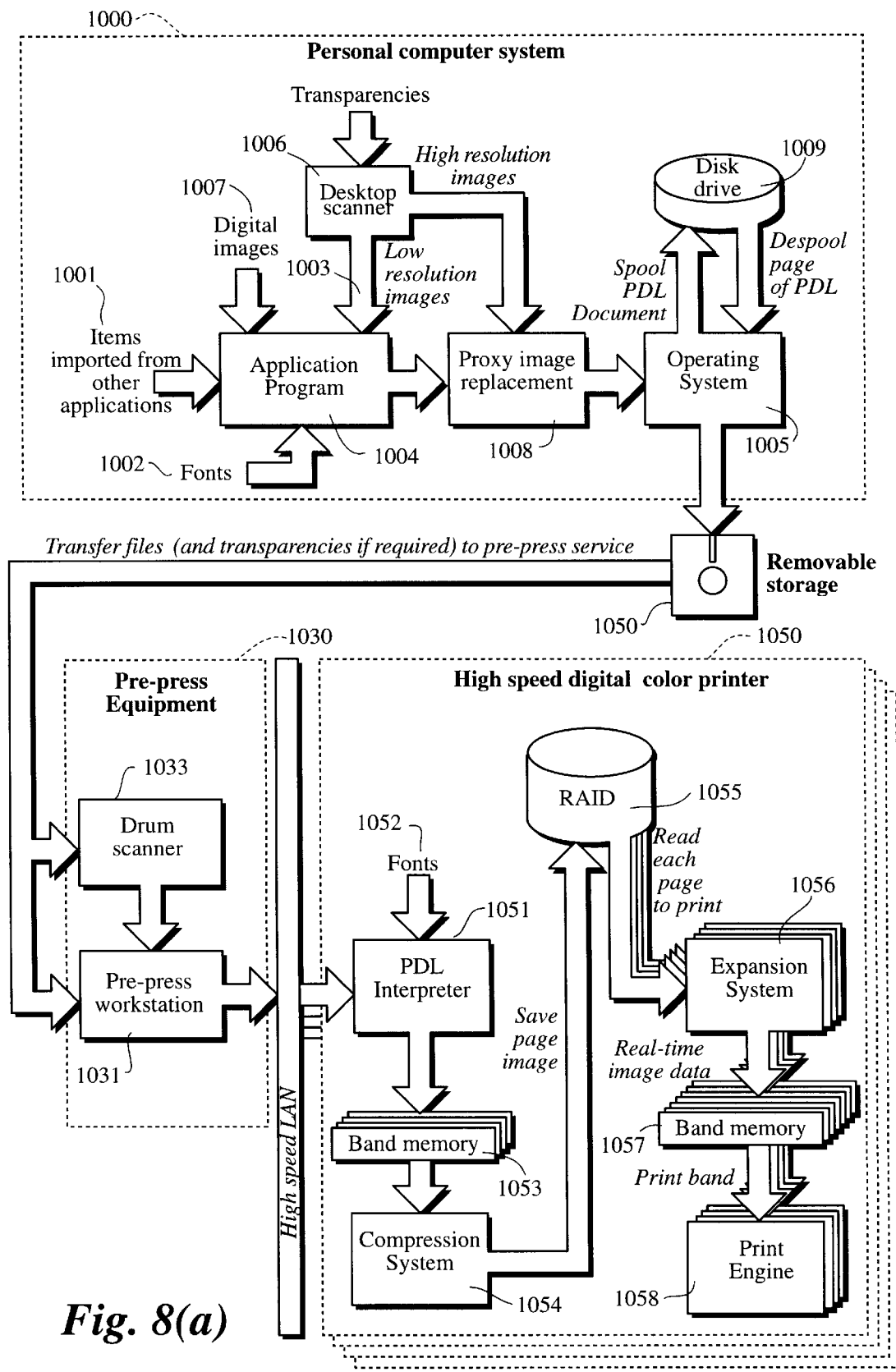
FIGS. 8(a) and 8(b) are block schematic diagrams of typical commercial and office printing systems, respectively, using page image compression for electronic collation and print on demand digital page storage.
Figure 8B:
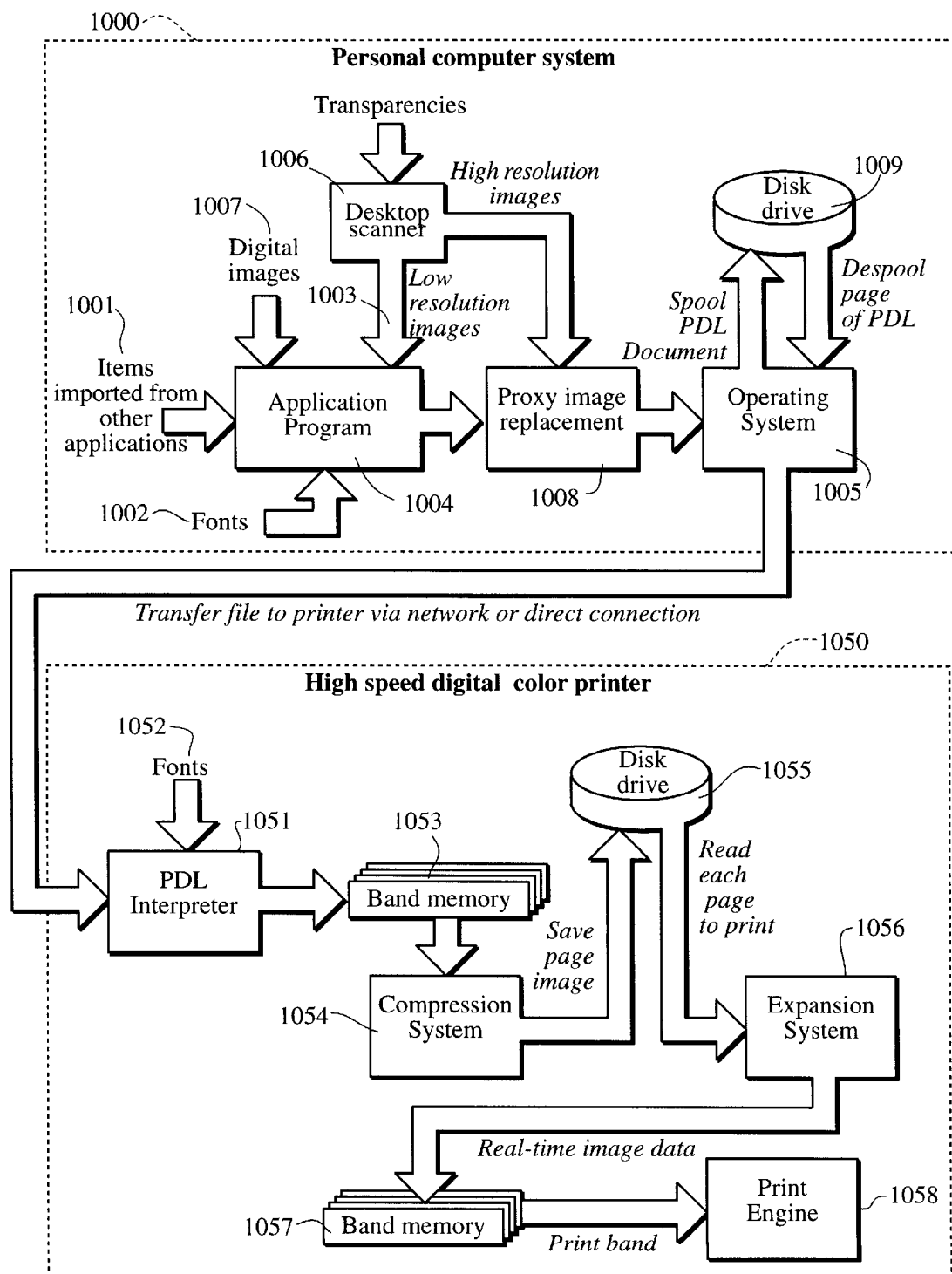

FIGS. 8(a) and 8(b) are schematic block diagrams of commercial and office digital printing systems. FIG. 8(b) shows workflow from the source images and text compiled using a desktop publishing system, through to the print engines used to print the material. The three major systems involved are the personal computer system 1000 of the publisher, pre-press equipment 1030 of a pre-press service provider (who may also be the printing service provider) and one or more high speed digital color printers 1050. In FIG. 8(a), the digital office color printer uses a personal computer system 1000. The document to be printed is created using application programs 1004, which may incorporate fonts 1002, digital images 1007 from various sources, items imported from other applications 1001, and low resolution images 1003 from a desktop scanner 1006. Application programs are becoming available which can manipulate low resolution images, and then automatically apply the same manipulations to a high resolution version of the same image. The low resolution images are often called proxy images. This type of application is well suited to producing high quality color documents within the limitations of currently available personal computer systems. When the document is to be printed, the page description containing proxy images is combined with the high resolution images in a process of proxy image replacement 1008. The document description may be in the form of a Page Description Language (PDL), which may be saved by the operating system 1005 onto a disk drive 1009.

Referring to FIG. 8(b), the document description may be stored in the native format for the application via the operating system 1005 to a removable storage medium 1050. The removable medium may be a removable hard disk, an optical disk, or magnetic tape. High speed network connections directly from the publisher to the pre-press service may be available in some cases. The document description is usually stored in the native format for the application instead of a page description language to make it easier to make minor changes (such as correcting typographical errors) before the document is printed. The removable media, plus the original transparencies if higher quality scans are required, are then physically taken to the pre-press service 1030. At the pre-press service the transparencies may be re-scanned at high resolution, typically using a drum scanner 1033. The native document description files are converted to Adobe 'Postscript' page description language, and combined with the high resolution scans to produce the final page layout. The completed document including high resolution images may be transferred to the printer via a high speed local area network (LAN).

Still with respect to FIG. 8(*b*), high speed color digital printers 1050 may be connected to the high speed LAN. The number of printers used for any particular print job can be varied depending upon the number of pages to be printed. Print jobs with less than 10,000 total pages are preferably sent to a single printer, as the print job can be completed in a little over one hour. Print jobs with more than 100,000 pages (such as color magazines or catalogues) are preferably distributed over a number of printers. A print job of 100,000 pages distributed over 4 printers could be complete within 3 hours.

Referring now to FIG. 8(*a*), as printer 1050 becomes ready to accept each page representation, it is despooled from the disk drive 1009, and transferred to the printer in a network or direct connection.

A PDL interpreter 1051 in the printer 1050 rasterizes the page descriptions using fonts 1052. If the PDL has a band rendering capability, then a band memory 1053 can be used instead of a page memory. The use of a band memory has a significant advantage in saving cost, as a full page memory for A4 CC'MM'YK printing at 800 dpi requires 46 MBytes of page memory. For rendering efficiency this would need to be implemented in semiconductor memory. The use of a band rendering PDL, such as some versions of Postscript', or Canon 'OpenPage'', can reduce the memory requirement significantly. A 48 line band of an A4 CC'MM'YK page at 800 dpi requires only 240 KBytes of memory. This is a reduction of nearly 200 times the amount of memory required. This amount of semiconductor memory is presently expensive relative to the target price of the office printer of FIG. 8(*a*).

It is not necessary for the band rendering operation to proceed in real time, as compressed page images which can be expanded in real time are generated. Therefore, it is practical to use software implementations of the PDL interpreter/RIP process without requiring specific hardware acceleration. However, it is preferable in the commercial system of FIG. 8(*b*) that a high speed processor be used to RIP the pages, to prevent RIP speed becoming a major 'bottleneck' for small print runs.

After each band is rendered by the PDL interpreter, it is compressed by the compression system 1054 and saved to the redundant array of inexpensive disks (RAID) of FIG. 8(*b*) or the disk drive of FIG. 8(*a*). After all of the bands in the page have been rendered, the RAID or disk drive contains a complete compressed page image. The page may be printed at this time, but it will often be preferable to rasterize and compress the entire document before printing any pages. This allows full electronic collation, and also ensures that the compressed page image for the reverse side of the page is also ready when printing the front of the page.

When a page is to be printed the compressed page image is read from the disk drive 1055 and expanded in real time by the expansion system 1056. Expanded page image data is stored in a band memory 1057 and printed on the print engine 1058.

Uses of electronic collation and storage

There are two major uses of a high capacity digital page storage facility in a commercial or office printing system. These are electronic collation, and document printing on demand without involving the computer which created the document.

Electronic collation is the printing of pages in an order which is convenient for the user, rather than simple for the computer and printing system. When using electronic collation, each entire document is printed in the correct page order, eliminating the requirement for manual collation. The use of electronic collation can eliminate the requirement for large mechanical collation machines, and the large amount of paper storage space required for uncollated sheets.

Print on demand for rarely changing documents is another significant application of a high capacity digital page storage system located in a printer. With print on demand facilities, a customer can order as many copies of a document (for example, a brochure or catalogue) as are required on a daily or weekly basis. The copies can then printed without incurring any setup costs, RIP time, or storage costs. There are major advantages of this system over storing pre-printed documents, including:

1) The elimination of waste resulting from disposal of out of date documents

2) Only those documents which are required are printed

3) A reduction in storage space required

4) Documents can be kept much more up-to-date, and can be changed simply and frequently.

Documents which may typically be stored on the disk drive of FIG. 8(*a*) and printed on demand include those shown in the table "Potential use of page storage":

| Potential use of page storage | | | |
| --- | --- | --- | --- |
| Number of documents | Description | Pages each | Total |
| 50 | Product brochures | 8 | 200 |
| 5 | Company and division brochures | 16 | 80 |
| 1 | Corporate newsletter | 16 | 16 |
| 2 | Product catalogues | 50 | 100 |
| 1 | Annual report | 50 | 50 |
| 1 | In-house magazine | 64 | 64 |
| 50 | Various paper forms | 1 | 50 |
| 50 | Miscellaneous staff notices and posters | 1 | 50 |
| 1 | Collation buffer for current document | 200 | 200 |
| | Total | | 810 |

However, easy and instant access to color documents in office situations, combined with a significant cost reduction resulting from the ability to print single copies on demand, is likely to cause a significant proliferation in the types and quantity of color documents published by companies. Because the printing system is fast, longer documents such as user manuals and service manuals for the company's products may also be stored on the disk drive in the printer and printed on demand. It is easy to imagine the requirement for tens of thousands of pages to be stored on the printer. Fortunately, this is easy to achieve by adding disk drive capacity. It is also cost effective, as approximately 1,000 A4 color pages can be stored per GByte of disk storage.

Documents which may typically be stored on the disk drive of FIG. 8(*b*) and printed on demand include those shown in the table "Potential use of page storage for commercial printing":

Potential use of page storage for commercial printing

| Number of documents | Description | Pages each | Total |
|---|---|---|---|
| 400 | Average of 8 brochures for each of 50 customers | 8 | 3,200 |
| 50 | Average of 1 letterhead for each of 50 customers | 1 | 50 |
| 40 | Average of 2 product catalogues for each of 20 customers | 50 | 2,000 |
| 50 | 1 Annual report for each of 50 customers | 50 | 2,500 |
| 250 | Average of 5 forms for each of 50 customers | 1 | 250 |
| 500 | Average of 10 miscellaneous documents for each of 50 customers | 1 | 500 |
| 1 | Collation buffer for current document | 1,000 | 1,000 |
| | Total | | 9,500 |

While the commercial system of FIG. 8(b) provides a page storage capacity of approximately 10,000 pages, this number is determined primarily by the disk drive capacity. It is simple to vary the disk capacity significantly, to obtain much greater page storage capacities. Lower cost systems with lower page storage capacities can also be readily achieved. Approximately 1,000 A4 color pages can be stored per GByte of disk storage. This means that the current retail cost of storage is approximately US $0.50 per page. This cost is decreasing rapidly as the cost of disk drive capacity continues to fall.

Compression system for electronic collation and page storage

The compression scheme described herein is a specific example of page compression, based on certain constants. These constants can easily be parameterized to generalize the compression to be applicable to a wide range of circumstances. The specific constants assumed herein are:

1) Page size is 210 mm×293 mm (A4). This can be parameterized to accommodate different page sizes.
2) Print area: same as page size. This allows full bleed printing, but with no tolerance for paper misalignment. The print area can be parameterized to accommodate non-printing margins, and/or alignment error for full bleed printing.
3) The resolution is 800 dpi in both axes. This can be parameterized to match the printing resolution of the printer. The resolution in the scan direction need not be the same as the resolution in the non-scan direction.
4) The color space used is CMYK. The use of other color spaces such as RGB or device independent color spaces can be accommodated with obvious modifications to the compression scheme.
5) The contone color resolution supported is 266.6 dpi (800 dpi divided by three). This is the maximum color resolution supported by offset printing using a 133 line screen, and is generally considered to be 'magazine quality'. Greater or less color resolution can be supported, though it is convenient if the printer resolution is an integral multiple (in this case, 3) of the contone resolution.

The compression scheme is described in relation to these specific parameters to simplify description and to allow easy comparison with 800 dpi A4 color printing which does not use compression.

Figure 9:
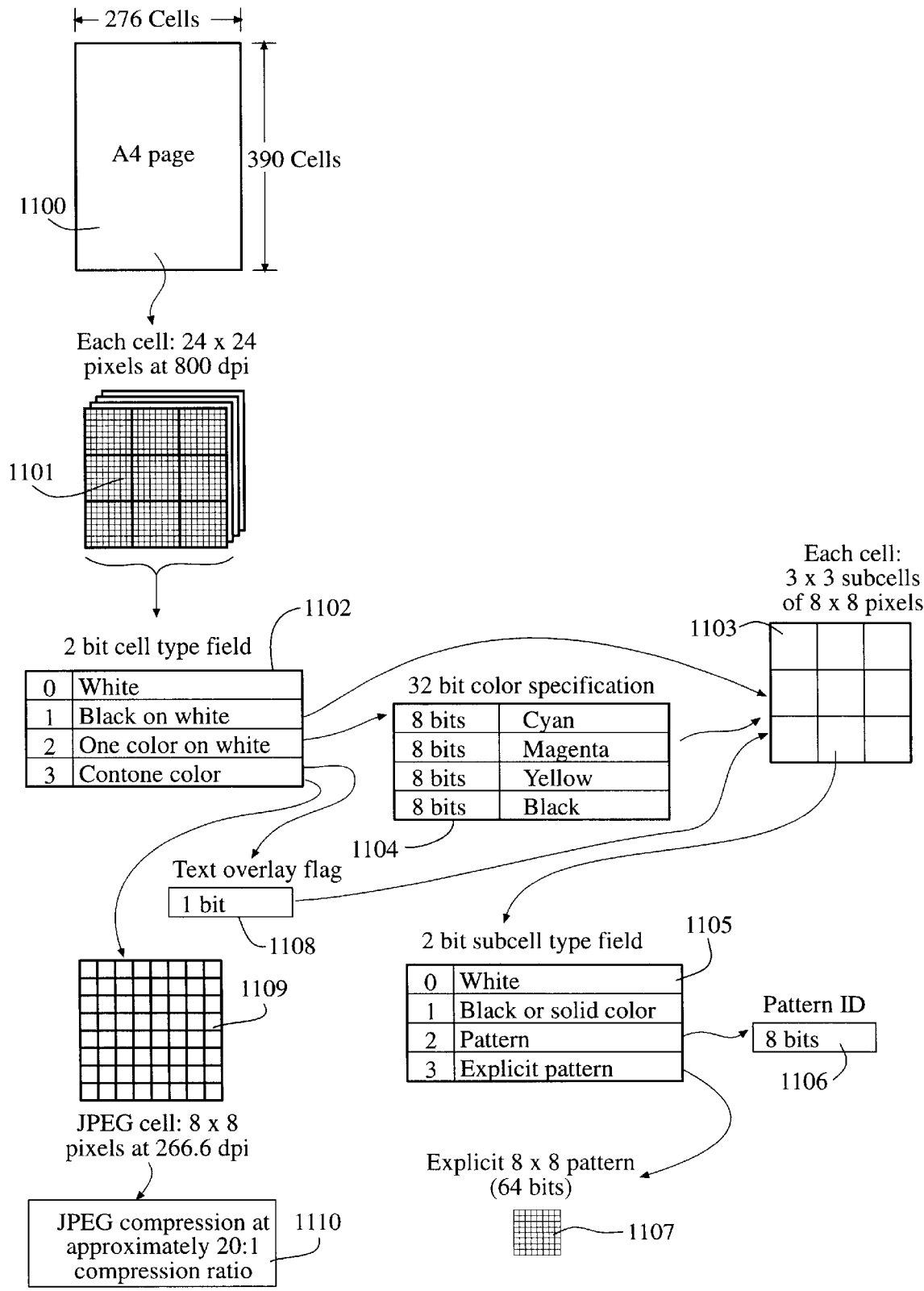
FIG. 9 is a diagram representing the data encoding scheme of the page image compression system.

FIG. 9 shows a data representation of the compression scheme. The A4 page 1100 is divided into a rectangular matrix of 276 cells by 390 cells 1101. Each cell 1101 is an array of 24×24 pixels (576 pixels) at the printer resolution (800 dpi). The size of each cell when printing at 800 dpi is 0.76 mm (0.03"). When fully expanded to a halftoned image, each cell 1101 requires 288 bytes if halftoned to CMYK, or 432 bytes if halftoned to CC'MM'YK Each cell 1101 has a two bit cell type field 1102 associated with it. The two bits of a cell type field 1102 define four states of a cell 1101:

1) White: all pixels in the cell 1101 are white. No further information is required. All white cells will occur frequently in borders, whitespace, space between lines, etc. Whitespace is compressed by 1728:1 when using the CC'MM'YK color model.
2) Black on white: all pixels in the cell 1101 are either black or white. The pattern of black and white pixels is defined by further information. This occurs frequently in text.
3) One color on white: all pixels in the cell 1101 are either white or a single other color. The color and pattern of colored pixels is defined by further information. This occurs mainly in colored text, charts, and outline graphics.
4) Contone color: all other conditions of the cell 1101 are considered to be continuous tone (contone) color. Contone color cells are subsampled and JPEG (Joint Photographic Experts Group) compressed. To prevent degradation of the edges of black text over contone images, black pixels are extracted before subsampling and JPEG compression, and are processed in a similar way to black on white cells. When the page image is expanded, the expanded black image is superimposed on the expanded JPEG contone image. The contone images are JPEG compressed at a compression ratio of approximately 20:1. When 266 dpi contone images are expanded after JPEG compression at a 20:1 compression ratio, image degradation is usually not noticeable.

The cell type field 1102 can be a rectangular array of two bit values, which may be packed into bytes or words. A simple array data structure simplifies the design of hardware which may be required in some applications to achieve real-time expansion of the compressed page images.

Cells 1101 in which the cell type field 1102 is 'black and white' are divided into a 3×3 array of 8 pixel×8 pixel subcells 1103. Each subcell 1103 has a two bit subcell type field 1105. The two bits of a subcell type field 1105 define four states of a subcell 1103:

1) White: all pixels in the subcell 1103 are white. No further information is required. All white cells will occur frequently in borders, whitespace, space between lines, etc. The lossless compression ratio for this data type is 173:1 for the CC'MM'YK color model.
2) Black or solid color: all pixels in the subcell 1103 are black. No further information is required. This occurs frequently inside the strokes of text characters. The width of the strokes of even body text (typically 10 point) is usually large enough to contain subcells which are all black. The lossless compression ratio for this data type is 173:1 for the CC'MM'YK color model.
3) Pattern: this occurs if the pattern of black pixels in a subcell is one of the common patterns shown in FIG. 10. The pattern is identified by an 8 bit pattern ID 1106, allowing up to 256 common patterns. The lossless compression ratio for this data type is 37.5:1 for the CC'MM'YK color model.
4) Explicit pattern: this is the degenerate case which occurs if the pixel pattern is not one of the common cases. The pattern of selected drops in the subcell is directly specified by an 8×8 bitmap 1107, requiring 64 bits. The lossless compression ratio for this data type is 5.8:1 for the CC'MM'YK color model.

Cells 1101 in which the cell type field 1102 is 'one color on white' have a color specification 1104 of the one color (the selected color) associated with them. The color specification 1104 is preferably in the same color space as the remainder of the image, as may be expressed using 8 bits per color component, for a total of 32 bits if the color space is CMYK, or 24 bits if the color space is RGB. The cells are also divided into a 3×3 array of 8 pixel×8 pixel subcells 1103. Each subcell 1103 has a two bit subcell type field 1105. The two bits of a subcell type field 1105 define four states of a subcell 1103:

1) White: all pixels in the subcell 1103 are white. No further information is required. These subcells will principally occur around and within colored text. The lossless compression ratio for this data type is 66.5:1 for the CC'MM'YK color model.
2) Black or solid color: all pixels in the subcell 1103 are the selected color. No further information is required. This occurs frequently inside the strokes of colored text characters. The lossless compression ratio for this data type is 66.5:1 for the CC'MM'YK color model.
3) Pattern: this occurs if the pattern of selected color in a subcell is one of the common patterns shown in FIG. 10. The pattern is identified by an 8 bit pattern ID 1106, allowing up to 256 common patterns. The lossless compression ratio for this data type is 27.9:1 for the CC'MM'YK color model.
4) Explicit pattern: this is the degenerate case which occurs if the pixel pattern is not one of the common cases. The pattern of selected drops in the subcell is directly specified by an 8×8 bitmap 1107, requiring 64 bits. The lossless compression ratio for this data type is 5.5:1 for the CC'MM'YK color model.

Cells 1101 in which the cell type field 1102 is 'contone color' are further divided into two categories: those cells 1101 which contain black and those cells 1101 which do not contain black. The black component is compressed losslessly, and the color component is reduced to a lower resolution and JPEG compressed. The reason for this is to preserve the readability of black text on colored or photographic backgrounds. Only black text is treated in this manner, as the use of colored text on colored background is rarely used, and when it is used, the text is usually in large point sizes. This aspect of the compression scheme matches expectations which derive from viewing color offset printed material, which reproduces black text on colored backgrounds well. Small point size colored text is typically not used in offset printing because it will usually be screened, and become difficult to read due to screening artifacts.

All pixels in the cell 1101 which are black are marked in a 24×24 bitmap. This bitmap is then compressed in the same manner as cells 1101 where the cell type field is 'black on white'. The black pixels in the cell 1101 are then replaced with a color which is representative of the color which that pixel would be if it were not covered with black text. The method of determining this color is not especially important. For example, it may be the average color of all non-black pixels in the cell, or it may be the color of the nearest non-black pixel found when following a search pattern, or it may be the average of the colors of neighboring non-black pixels, weighted by the inverse of the distance between the black pixel and the particular non-black pixel. The reason for replacing black pixels with a color which is closer to non-black colors in the cell is to reduce 'mosquito noise' that occurs when JPEG compressing high frequency patterns with a high luminance or chrominance difference. This mosquito noise affects the colors of other pixels in the cell. The exact choice of color is not important, as it is replaced with black when the cell is expanded. After black pixels have been replaced, the cell 1101 is reduced to a resolution of 266.6 dpi. This can be achieved decimating the cell by a factor of 3 (selecting every third pixel in every third row). However, a simple decimation can lead to aliasing artifacts. It is preferable to make the color of each pixel of the 8×8 JPEG cell 1109 equal to the average color of each corresponding 3×3 square of pixels in the 24×24 pixel cell 1101. For slightly higher image quality, the cell 1101 can be low-pass filtered before decimation. However, the very small improvement in image quality afforded by low pass filtering over simple averaging is unlikely to warrant the significant additional computational expense. JPEG (Joint Photographic Experts Group) encoding of the JPEG cell 1109 is chosen over other contone image compression methods such as fractal or wavelet compression due to its good image quality at moderate compression ratios, international standardization, symmetry in encoding and decoding, well defined operation on separate square blocks, and availability of high speed JPEG compression and expansion chips, which are useful in ensuring that expansion of page images can occur in real-time for high speed printing systems. JPEG compression of 20:1 at 266.6 dpi results in a lossy compression ratio of 42:1 over a CC'MM'YK bitmap, and a compression ratio of 225:1 over a contone image at 800 dpi. This is achieved with an image degradation which is usually not visible to the naked eye as the image quality benefits considerably from the removal of black text before compression.

Figure 10A:
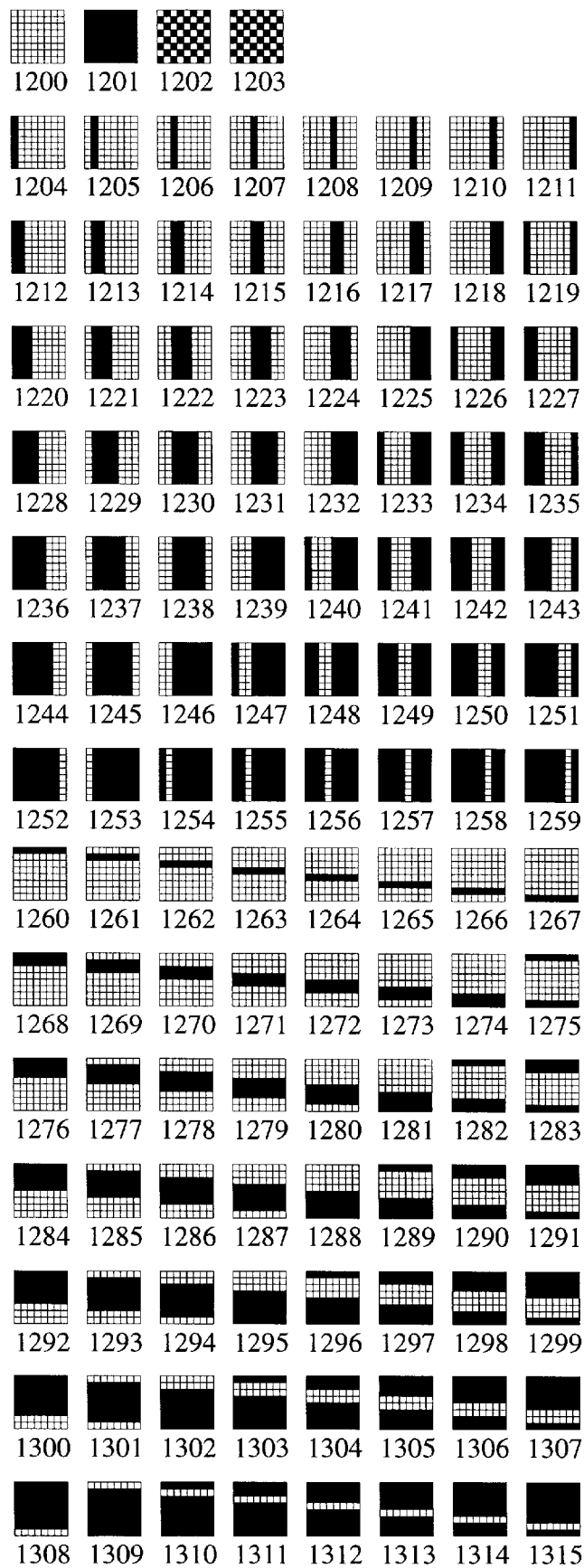
FIGS. 10(a) and 10(b) are an example set of patterns to which subcells may be matched for encoding.
Figure 10B:
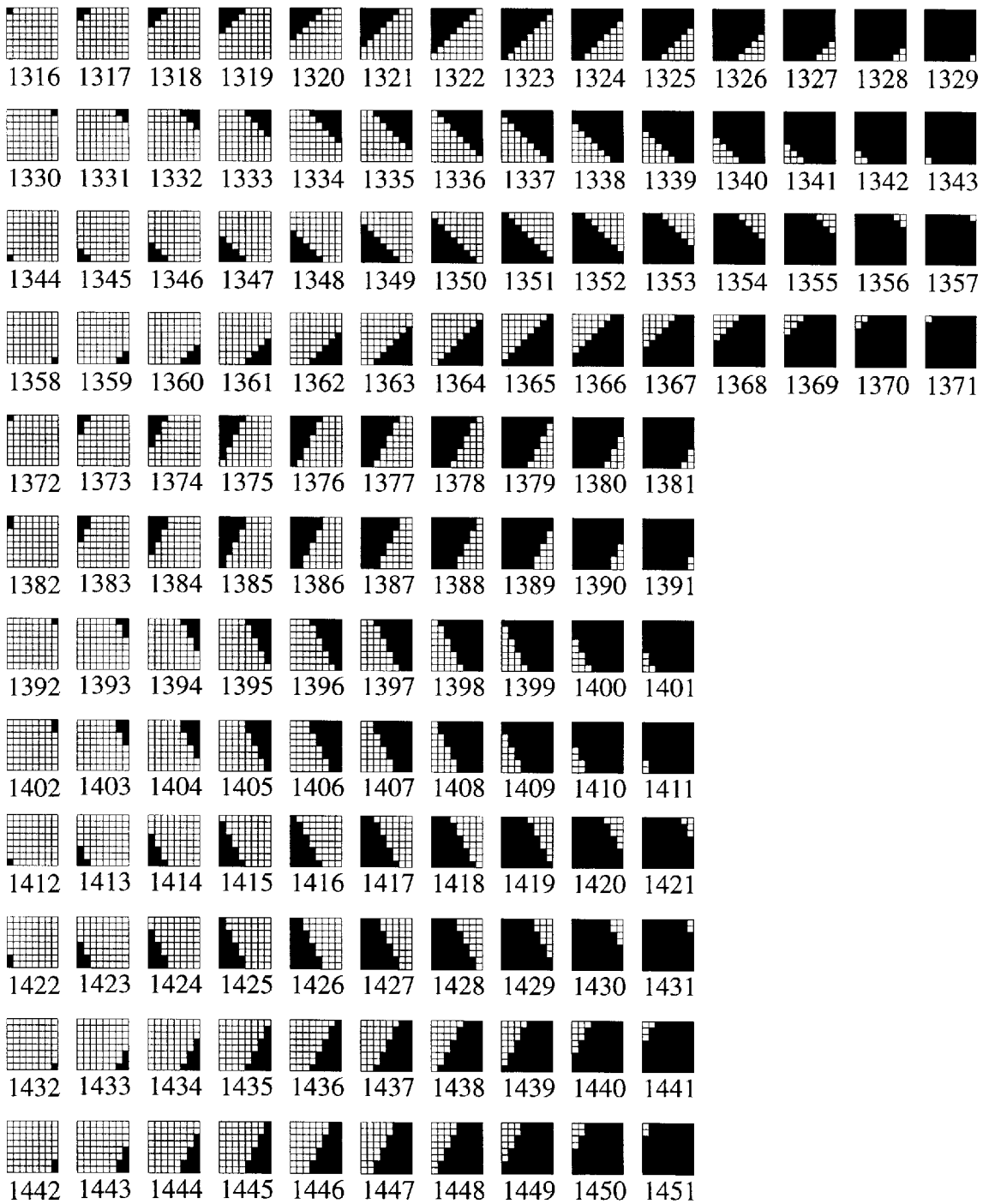

FIGS. 10(*a*) and 10(*b*) show a set of common patterns that may be encoded by the pattern ID 1106. An 8×8 pattern of bi-level pixels has $2^{64}=1.84 \times 10^{19}$ possible states. The use of pure frequency encoding is impractical, as the table would need to contain all of these states. In this scheme, pure black or white patterns encode to two bits, a set of up to 256 common patterns encodes to 10 bits, and all other patterns encode to 66 bits. In preference to the using the theoretical maximum compression which can be obtained using frequency encoding, an easily implemented system where the encoding can be defined by simple algorithms without requiring time consuming table comparisons and large tables is chosen.

At 800 dpi, each 8×8 pattern of pixels represents an area of only a quarter of a millimeter squared (0.01"×0.01"). Each character of text in 10 point Times font at normal line spacing covers an average area equal to approximately 100 of these patterns.

Pattern 1200 is white, and is encoded in two bits as the white state of the subcell field type. Pattern 1201 occurs when each pixel is the selected color or black.

Patterns 1202 and 1203 are two patterns which may occur when a 50% density is represented. Some programs produce this representation instead of specifying a 50% tone. Patterns 1204 to 1259 are all of the patterns produced by a vertical stripe of any width in either the selected color or white. The main occurrence of these patterns is on the vertical edges of text characters. Patterns 1260 to 1315 are all of the patterns produced by a horizontal stripe of any width in either the selected color or white. The main occurrence of these patterns is on the horizontal edges of text characters. Patterns 1316 to 1371 are patterns resulting from a diagonal division between the selected color and white. Patterns 1372 to 1451 are patterns resulting from a division between the selected color and white which occurs at a slope of 2. High compression ratios for text can be achieved by allowing small variations from the patterns shown in FIG. 10 to be encoded to those patterns. This reduces the incidence of the 'Explicit Pattern' subcell type, which has a low compression ratio. Variations of a few pixels on the black to white edges of the patterns will normally not be detected with the naked eye when printed at 800 dpi.

There are fourteen different combinations of cell types 1102, subcell types 1105 and text overlay flags 1108 which result in different 'encoding types'.

'Typical' compression ratios

The table "Compression ratio for a 'typical' page by encoding type" shows compression ratios for the different encoding types supported by this compression scheme. Also shown is the average portion of a page which may be expected to be compressed to each encoding type. The average portion of a page for each encoding type will vary based upon the type of documents that are printed. The portions shown in the 'Average portion of page' column of the table are derived from measurements of a number of fill color monthly magazines, where each page is printed using a four color process. In these magazines, there is no additional cost in the inclusion of more color area on a page. It is assumed that when there is no penalty (in either printing cost or time) for printing in color that the amount of color used in office publications will eventually approach the use of color in full color magazines.

Compression ratio for a 'typical' page by encoding type

| Cell Type | Subcell Type | Average portion of page | Bytes per page | Compression ratio versus CC'MM'YK bitmap | Compression ratio versus CMYK contone |
|---|---|---|---|---|---|
| White | — | 40% | 10,764 | 1,728 | 9,216 |
| Black on white | White | 18% | 48,438 | 172.8 | 921.6 |
| Black on white | Black | 9% | 24,219 | 172.8 | 921.6 |
| Black on white | Pattern | 2.4% | 29,709 | 37.6 | 200.3 |
| Black on white | Explicit | 0.6% | 48,115 | 5.8 | 30.9 |
| Color on white | White | 1.2% | 8,396 | 66.5 | 354.5 |
| Color on white | Black | 0.6% | 4,198 | 66.5 | 354.5 |
| Color on white | Pattern | 0.16% | 2,669 | 27.9 | 148.6 |
| Color on white | Explicit | 0.04% | 3,380 | 5.5 | 29.4 |
| Contone | — | 25% | 275,828 | 42.1 | 224.8 |
| Contone & Text | White | 1.8% | 24,219 | 34.6 | 184.3 |
| Contone & Text | Black | 0.9% | 12,110 | 34.6 | 184.3 |
| Contone & Text | Pattern | 0.24% | 5,554 | 20.1 | 107.2 |
| Contone & Text | Explicit | 0.06% | 5,457 | 5.1 | 27.3 |
| Total | | 100% | 503,056 | 92.4 | 493 |

The average compression ratio for a 'typical' page is 92.4:1 compared to a CC'MM'YK full bleed 800 dpi bitmap, and 493:1 compared to a CMYK full bleed 800 dpi contone image. This allows the typical page to be stored in approximately 500 KBytes, allowing storage of well over 1,000 pages on a low cost 1 GByte disk drive. The sustained data rate required from disk is approximately 1 MByte/second for a print speed of 120 ppm (one two sided A4 page per second). This can be achieved using low cost SCSI disk drives. The maximum commonly encountered data rate will be for full page contone images. These will compress to approximately 1.1 MBytes each. To maintain 120 ppm print speed when full bleed color pages are encountered, the disk drive would preferably be able to sustain a data rate in excess of 2.2 MBytes per second. This is especially relevant for web fed printers. For sheet fed printers, a pause of one second or so when full color pages are encountered will often be acceptable.

Compression encoding algorithm

It is preferable that the image to be compressed is in the form of a 32 bit per pixel CMYK contone image. Other forms are possible, such as an RGB contone image, images in different color spaces, and images with different color resolution. It is also preferable that the page to be printed be created in bands that are 24 lines wide so that an entire contone page memory is not required. An A4 full bleed 800 dpi 32 bit per pixel contone page memory would require 247 MBytes of memory. A 24 line band of such an image requires 635 KBytes of memory. If the compression process can proceed simultaneously (or as a separate thread) then it is preferable to double-buffer the bands, so that two band buffers are required, for a total of 1.27 MBytes.

The following is an algorithm in pseudocode for encoding to the compression scheme disclosed herein:

```
Define Band_width = 276
Define Page_length = 390
Define Cell = 24 x 24 array of 32 bit CMYK colors
Define Bitmap_cell = 24 x 24 array of Booleans
Define JPEG_Cell = 8 x 8 array of CMYK colors
    Define Other_color = 32 bit CMYK color specification
    Define white_cell = 2 bit binary 00
    Define Black_and_white_cell = 2 bit binary 01
    Define Color_and_white_cell = 2 bit binary 10
    Define Contone_cell = 2 bit binary 11
    Define False = 1 bit binary 0
    Define True = 1 bit binary 1
    Clear Compressed_data
    Clear JPEG_compressed_data
    Append Band_width to Compressed_data
    Append Page_length to Compressed_data
    For Band = 0 to Page_length - 1
        Calculate Band
    (The calculation of the Band is performed by the prior art PDL
    interpreter or other raster image processor system)
        For Cell_in_band = 0 to Band_width - 1
            Set Other_color = color of first non white pixel in cell
            Case
                All pixels in Cell are white
                    Append White_cell to Compressed_data
                All pixels in Cell are either white or black
```

```
            Append Black_and_white_cell to Compressed_data
            For (x,y) = (0,0) to (23,23)
                If Cell(x,y) = black
                    Set Bitmap_cell(x,y) = true
                Else
                    Set Bitmap_cell(x,y) = false
                Endif
            Next (x,y)
            Call subroutine Bitmap_encode[Bitmap_cell, Compressed_data]
        All pixels in Cell are either white or Other_color
            Append Color_and_white_cell to Compressed_data
            Append Other_color to Compressed_data
            For (x,y) = (0,0) to (23,23)
                If Cell(x,y) = Other_color
                    Set Bitmap_cell(x,y) = true
                Else
                    Set Bitmap_cell(x,y) = false
                Endif
            Next (x,y)
            Call subroutine Bitmap_encode[Bitmap_cell, Compressed_data]
        Else
            Append Contone_cell to Compressed_data
            If any pixels in Cell are black
                Append True to Compressed_data
                For (x,y) = (0,0) to (23,23)
                    If Cell(x,y) = black
                        Set Bitmap_cell(x,y) = True
                        Set Cell(x,y) = first non-black color found when
                        searching a path spiraling outwards from Cell(x,y)
                    Else
                        Set Bitmap_cell(x,y) = False
                    Endif
                Next (x,y)
                Call subroutine Bitmap_encode[Bitmap_cell,
                    Compressed_data]
            Else
                Append False to Compressed_data
            Endif
            For (n,m) = (0,0) to (7,7)
                Set JPEG_cell (n,m) =
                    Average color of Cell(3n,3m) to Cell(3n + 2,3m + 2)
            Next (n,m)
            JPEG encode[JPEG_cell, JPEG_encoded_output]
```

(JPEG encoding subroutines are prior art and available in the public domain and are therefore omitted from this specification. The 8×8 block of CMYK pixels can be JPEG compressed in CMYK format or can be converted to an 8×8 block of RGB or CMY pixels. Such conversion is assumed in the calculation of compression ratios. The JPEG encoded data is placed in a separate compressed data stream.)

```
            Append JPEG_encoded_output to JPEG_compressed_data
        End Case
    Next Cell_in_band
Next Band
End
Subroutine Bitmap_encode[Bitmap_cell, Compressed_data]
Define Number_of_patterns = 250
Define White_subcell = 2 bit binary 00
Define Black_subcell = 2 bit binary 01
Define Pattern_subcell = 2 bit binary 10
Define Explicit_subcell = 2 bit binary 11
Define Subcell_pattern = an set of 8 × 8 bitmap patterns
```

(an example set of patterns is shown in FIG. 10)

```
Define Pattern_number as a byte
For (n,m) = (0,0) to (2,2)
    For (x,y) = (0,0) to (7,7)
        Set Subcell(x,y) = Bitmap_Cell(n*8 + x,m*8 + y)
    Next (x,y)
```

```
        Case
            All elements in Subcell are false
                Append white_subcell to Compressed_data
            All elements in Subcell are true
                Append Black_subcell to Compressed_data
            Subcell matches Subcell_pattern(Pattern_number), a specific member
                of the set of Subcell patterns
```

(There are many efficient methods of coding this comparison which rely upon coherence in the set of patterns which are obvious to skilled programmers. A direct comparison of all patterns is very inefficient and is not recommended. The pattern match preferably allows a tolerance of mismatched elements, such as a maximum of three pixel 'errors' which must be contiguous to elements of the same sense in the reference pattern. The use of a tolerance on the match allows more matches and therefore greater compression ratios.)

```
                Append Pattern_subcell to Compressed_data
                Append Pattern_number to Compressed_data
            Else
                Append Explicit_subcell to Compressed_data
                Append Subcell to Compressed_data
        End Case
```

```
Next (n,m)
Return
```

The output of the algorithm is two sets of compressed data: Compressed_data and JPEG_compressed_data. The two data sets are separate to allow the use of existing JPEG hardware codecs.

The compression algorithm does not need to operate in real-time (that is, synchronously to page printing). In most systems it will be preferable to implement the compression algorithm in software. Details of the software implementation will depend upon the computer language chosen. The structure of the algorithm can be changed for efficient operation in the chosen computer language.

Where tests for a specific color occur (such as black, white, or any specific other color) it is preferable to allow a small range (for example ±3 least significant bits) around the color value to be interpreted as exactly the required color. This is required so that rounding errors in the raster image processor, PDL interpreter, or image creation software do not result in a reduced page compression ratio.

Other features can be added to this compression scheme, such as error detection and correction capabilities, line synchronization codes, and so forth without departing from the scope of the invention.

Expansion algorithm

The following is an algorithm in pseudocode for decoding the compression scheme disclosed herein:

```
Define Cell_type = 2 bit binary number
Define Text_overlay_flag = 1 bit Boolean
```

(other definitions as per compression algorithm)

```
Input Band_width from Compressed_data
Input Page_length from Compressed_data
For Band = 0 to Page_length - 1
    For Cell_in_band = 0 to Band_width - 1
        Input Cell_type from Compressed_data
        Case
            Cell_type = White_cell
                Set all pixels in Cell to White
            Cell_type = Black_and_white_cell
                Call subroutine Bitmap_decode[Compressed_data, Bitmap_cell]
                For (x,y) = (0,0) to (23,23)
                    If Bitmap_cell(x,y) = True
                        Set Cell(x,y) = black
                    Else
                        Set Cell(x,y) = white
                    Endif
                Next (x,y)
            Cell_type = Color_and_white_cell
                Input Other_color from Compressed_data
                Call subroutine Bitmap_decode[Compressed_data, Bitmap_cell]
                For (x,y) = (0,0) to (23,23)
                    If Bitmap_cell(x,y) = True
                        Set Cell(x,y) = Other_color
                    Else
                        Set Cell(x,y) = white
                    Endif
                Next (x,y)
            Else
                Input JPEG_encoded_data from JPEG_compressed_data
```

(If a JPEG decoding chip is used, the data will typically be input from the JPEG_compressed_data stream by the JPEG chip)

```
JPEG decode [JPEG_encoded_data, JPEG_cell]
```

(JPEG decoding subroutines are prior art and available in the public domain and are therefore omitted from this specification. JPEG expansion hardware devices such as C-Cube CL550 and other chips may be used for high performance systems)

```
For (n,m) = (0,0) to (7,7)
    For (i,j) = (0,0) to (2,2)
        Set Cell(3n + i,3m + j) = JPEG_cell (n,m)
    Next (i,j)
Next (n,m)
Input Text_overlay_flag from Compressed_data
If Text_overlay_flag = True
    Call subroutine Bitmap_decode[Compressed_data,
        Bitmap_cell]
    For (x,y) = (0,0) to (23,23)
        If Bitmap_cell(x,y) = True
            Set Cell(x,y) = black
        Endif
    Next (x,y)
Endif
End Case
Halftone the Cell
```

(The halftoning of the Band is preferably performed using a dispersed dot ordered dither without perceptible repeating patterns and with good distribution of the cell 'energy' to high frequencies. A halftone cell size of 64×64 is adequate for most purposes. The cyan, magenta, yellow and black components of the image can be halftoned using the same halftoning cell. The halftone cell can be generated using stochastic algorithms such as Hewlett-Packard's 'Void and Cluster' algorithm, or via simulated annealing as disclosed in A method for calculating high quality dither matrices using simulated annealing is disclosed in a patent application: Silverbrook and Naylor PCT AU/94 00515. In high performance systems, the halftoning function will typically be performed by hardware)

```
Next Cell_in_band
Print the halftoned band
```

(In high speed printing systems and other systems where the print engine cannot be stopped part way through a page the halftoned band is printed by hardware at the same time that the next band is being calculated.)

```
Next Band
End
Subroutine Bitmap_decode[Compressed_data, Bitmap_cell]
Define Subcell_type = 2 bit binary number
Define Text_overlay_flag = 1 bit Boolean
```

(other definitions as per compression algorithm)

```
For (n,m) = (0,0) to (2,2)
    Input Subcell_type from Compressed_data
    Case
        Subcell_type = White_subcell
            Set all elements of Subcell to False
        Subcell_type = Black_subcell
            Set all elements of Subcell to True
        Subcell_type = Pattern_subcell
            Input Pattern_number from Compressed_data
            Set Subcell = Subcell_pattern(Pattern_number)
        Else
            Input Subcell from Compressed_data
    End Case
    For (x,y) = (0,0) to (7,7)
        Set Bitmap_Cell(n*8 + x,m*8 + y) = Subcell(x,y)
    Next (x,y)
Next (n,m)
Return
```

Real-time expansion system for high speed color printing

In high speed printing systems, it will often be desirable to ensure that the expansion algorithm operates in real-time. For a printer able to print 120 A4 800 dpi CC'MM'YK ppm, a processing capability of at least 8,000 RISC MIPs is required to ensure real-time expansion. This level of performance is beyond that available in any currently available processor chip. Parallel arrays of high speed processors can be used, as the most compute intensive parts of the expansion algorithm can be parallelized. For example, a multi-processor system incorporating four Texas Instruments TMS320C80 Multimedia Video Processors (MVPs) may have adequate processing power to perform the expansion and halftoning in real time, if the software is efficiently coded and the algorithm is modified to suit the architecture of the MVP. The UltraSparc processor from Sun Microsystems may also be sufficient when used in a multiprocessor cluster of four processors. The disadvantage of a multiprocessing system using arrays of general purpose processors is high cost. At present, it is not economically viable to produce a 120 ppm real-time expansion system using general purpose processors if the printer is to have a retail price of under $10,000.

Real-time expansion (low cost in the case of an office system) can be achieved with the combination of a general purpose processor, a special purpose processor such as a JPEG expansion chip, and an application specific integrated circuit (ASIC) for compressed bitmap expansion, contone pixel replication, bitmap and contone pixel combining, and halftoning.

To minimize design costs, the ASICs required should be able to be fabricated using commonly available gate array or standard cell processes, and preferably operate with a clock speed lower than 70 MHz.

Figure 11A:
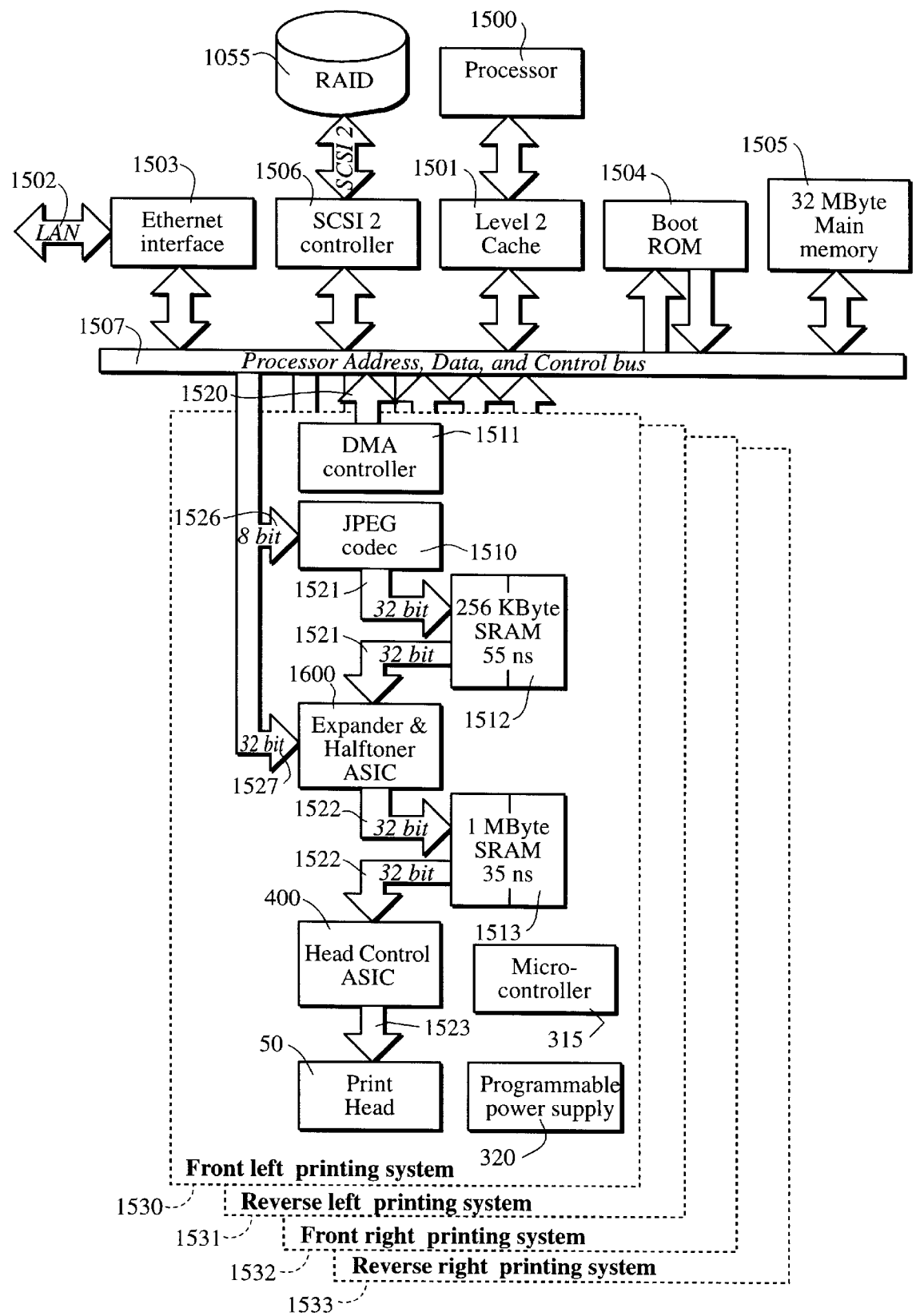
FIGS. 11(a) and 11(b) are block schematic diagrams of a real-time page image expansion system for high speed color printing.
Figure 11B:
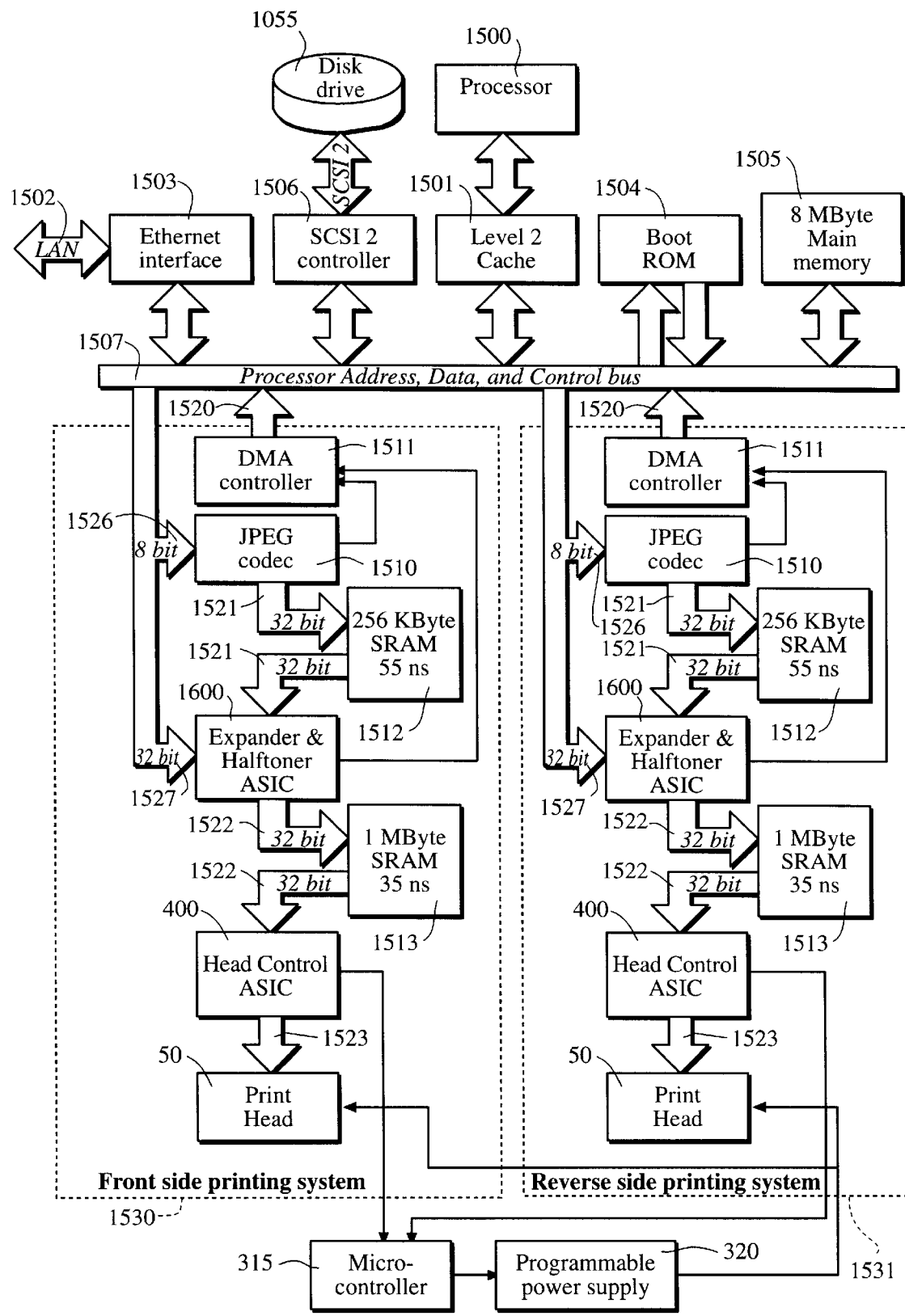

FIGS. 11(a) and 11(b) are block schematic diagrams for controller systems for a low-cost office color printer with a compressed document store, which can simultaneously expand two compressed page images for real time duplex printing. The processor 1500 is preferably a 32 bit or 64 bit processor with a performance in excess of 100 RISC MIPS. Many choices of such processors are currently available, including IBM and Motorola PowerPC™ devices, MIPS R4000™ series devices, DEC Alpha™ series devices, Intel Pentium™, Hewlett-Packard PA-RISC™ devices, and Sun Microsystems Sparc™ devices. The processor is not required to perform the expansion algorithm, as this requires high speed real-time operations. However, the processor performs most of the compression algorithm, PDL interpreting, raster image processing (RIPping), operating system functions, and miscellaneous control functions. Although these operations are generally not required to occur in real-time, they should occur quickly. The processor 1500 is connected to the processor address, data, and control buses 1507 via an optional second level cache 1501. When the processor is initialized, it obtains its instructions from a boot ROM 1504. For flexibility, the main programs are preferably stored on the disk drive or RAID. Also stored on the disk drive or RAID are the compressed page images for printing, and data used by the PDL, such as outline fonts. To be able to supply more than 1,000 compressed page images for real-time printing, the disk drive should preferably have a capacity of 1 GByte or more, and a sustained data access rate of 2 MBytes per second. To supply more than 10,000 page images, the RAID should have a capacity of 10 GBytes or more, and a sustained data access rate of 4 MBytes per second. Adequate data rate connections to the processor bus 1507 can be provided using SCSI 2 interface standard, with a SCSI 2 controller 1506. Other disk drive interfaces such as IPI can also be used. The printer system may be connected to an Ethernet network 1502 via an Ethernet interface 1503. Other interfaces, such as serial, parallel, other LAN formats, ATM, FDDI, HIPPI, or external SCSI interfaces may be provided. The printer system has a main memory 1505. The main memory 1505 stores the programs for the processor 1500, fonts cache, compressed data cache from disk, JPEG compressed data, page descriptions in the PDL, rendering bands, and other data. The amount of memory required depends upon the choice of PDL, size of disk and font caches, operating system, processor, and other factors. Eight MBytes of DRAM for FIG. 11(b) or 32 MBytes for FIG. 11(a) will be adequate for the main memory 1505 in many circumstances.

Two sets of expansion hardware are provided. This is the front side printing system 1530 and the reverse side printing system 1531. For the system of FIG. 11(b), a single system with twice the processing capability and twice the memory capacity could be provided instead of a separate system for the front and back sides of a sheet. Four times the processing and memory capacity could be provided for the system of FIG. 11(a). However, there is little cost advantage in providing a single system, and it has the disadvantage of increased design costs and reduced flexibility. It is desirable that the compressed pages can be printed in any order. To facilitate this, the compressed page data should be separate for each page. Having a separate printing system for each page that is to be printed simultaneously avoids problems with switching the context of the JPEG data stream for each band of the two page set from the JPEG compressed image of one page to that of the other page.

In each set of expansion hardware a JPEG codec 1510 (such as the C-Cube CL550 or other devices manufactured by LSI Logic and other companies) is provided with a JPEG compressed data stream on bus connection 1526. The maximum average data rate on this connection is 1.5 MBytes per second, so an eight bit bus multiplexed from the processor data bus 1507 is adequate. The address for the JPEG compressed data is generated by DMA controller 1511, and placed on the processor bus 1507 via address bus 1520. Contone pixel data generated by the JPEG Codec 1510 is buffered in a contone buffer memory 1512, which contains up to two bands (16 lines) of CMYK pixel data at 266.6 dpi. The memory 1512 may be composed of two 64 K×16 SRAMs such as Hitachi HM621664. The maximum data rate writing to the contone buffer memory 1512 on the bus 1521 is 27 MBytes per second. Data must also be read out of the contone buffer memory 1512 at 27 MBytes per second to provide contone pixel information for the expander and halftoner ASIC 1600. Thus the total data rate on the bus 1521 is 54 MBytes per second. An interleaved 32 bit bus operating at 74 ns (or less) cycle times which alternates access cycles between the JPEG codec 1510 and the expander and halftoner ASIC 1600 is suitable. The expander and halftoner ASIC 1600 replicates each 266.6 dpi pixel from the JPEG codec 1510 to form a 3×3 array of 800 dpi pixels. The compressed data stream is acquired via the bus 1527 and expanded to form bitmaps of cells 1101 by circuitry within the expander and halftoner ASIC 1600. The bitmaps of cells 1101 are combined with the pixel replicated contone image data to form reconstructed 800 dpi image data. The reconstructed 800 dpi image data is then halftoned, also within the expander and halftoner ASIC 1600. The halftoned data is stored to the halftone band memory 1513 as CC'MM'YK bi-level data. Other color models such as CMYK or CMY may be used, though CC'MM'YK gives superior image quality. The amount of memory required for the halftone band memory 1513 depends upon the distance between the first row of each color and last row of the last color of nozzles on the print head. Storage for an extra two bands (48 rows) of pixels is also required to provide double buffering for the expander and halftoner ASIC 1600 output. To print full bleed A4 pages at 800 dpi using the CC'MM'YK color model with a print head in which the colors are separated by 1143 µm (36 rows of pixels), the halftone band memory 1513 should preferably be at least 6.9 MBits (844 KBytes). The total data rate into and out of this memory is 91.6 MBytes per second. The memory 1513 may be composed of two 256 K×16 SRAMs with a maximum 35 ns cycle time. An interleaved 32 bit bus 1522 operating at 43 ns (or less) cycle times which alternates access cycles between the expander and halftoner ASIC 1600 and the head control ASIC 400 is suitable. Halftoned data is read from the memory 1513 by the head control ASIC 400 and provided to the print head 50 via a bus 1523. The print head 50 may be a monolithic pagewidth print head. Power to the print head 50 is provided by a programmable power supply which is controlled by a microcontroller 315. Print density data is provided to the microcontroller 315 by the head control ASIC 400.

Real-time expansion system for high speed color printing

Real-time expansion of compressed page images can be achieved with the combination of a general purpose processor, a special purpose processor such as a JPEG expansion chip, and an application specific integrated circuit (ASIC) for compressed bitmap expansion, contone pixel replication, bitmap and contone pixel combining, and halftoning.

To minimize design costs, the ASICs required should be able to be fabricated using commonly available gate array or standard cell processes, and preferably operate with a clock speed less than 70 MHz.

FIG. 11(a) is a block schematic diagram for a controller system for a high speed color printer with a compressed document store, which can simultaneously expand four compressed page images for real time duplex printing. The processor 1500 is preferably a 32 bit or 64 bit processor with a performance in excess of 100 RISC MIPS. Many choices of such processors are currently available, including IBM and Motorola PowerPC™ devices, MIPS R4000™ series devices, DEC Alpha™ series devices, Intel Pentium™, Hewlett-Packard PA-RISC™ devices, and Sun Microsystems Sparc™ devices. The processor is not required to perform the expansion algorithm, as this requires high speed real-time operations. However, the processor performs most of the compression algorithm, PDL interpreting, raster image processing (RIPping), operating system functions, and miscellaneous control functions. Although these operations are generally not required to occur in real-time, it is important that they occur quickly, so that very small print runs are practical. The processor 1500 is connected to the processor address, data, and control buses 1507 via an optional second level cache 1501. When the processor is initialized, it obtains its instructions from a boot ROM 1504. For flexibility, the main programs are preferably stored on the RAID 1055. Also stored on the RAID 1055 are the compressed page images for printing, and data used by the PDL, such as outline fonts. To be able to supply more than 10,000 compressed page images for real-time printing, the RAID 1055 should preferably have a capacity of 10 GBytes or more, and a sustained data access rate of 4 MBytes per second. Adequate data rate connections to the processor bus 1507 can be provided using SCSI 2 interface standard, with a SCSI 2 controller 1506. Other disk drive interfaces such as IPI can also be used. The printer system may be connected to an Ethernet network 1502 via an Ethernet interface 1503. Other interfaces, such as serial, parallel, ATM, FDDI, HIPPI, or external SCSI interfaces may be provided. The printer system has a main memory 1505. The main memory 1505 stores the programs for the processor 1500, fonts cache, compressed data cache from disk, JPEG compressed data, page descriptions in the PDL, rendering bands, and other data. The amount of memory required depends upon the choice of PDL, size of disk and font caches, operating system, processor, and other factors. 32 MBytes of DRAM will be adequate for the main memory 1505 in many circumstances, as Postscript' files and compressed image files will rarely exceed this size.

Four sets of expansion hardware are provided. This is the front side printing system 1530 and the reverse side printing system 1531. A single system with four the processing capability and four the memory capacity could be provided instead of a separate system for the front and back sides of a sheet. However, there is little cost advantage in providing a single system, and it has the disadvantage of increased design costs and reduced flexibility. It is desirable that the compressed pages can be printed in any order. To facilitate this, the compressed page data should be separate for each page. Having a separate printing system for each page that is to be printed simultaneously avoids problems with switching the context of the JPEG data stream for each band of the two page set from the JPEG compressed image of one page to that of the other page.

In each set of expansion hardware a JPEG codec 1510 (such as the C-Cube CL550 or other devices manufactured by LSI Logic and other companies) is provided with a JPEG compressed data stream on bus connection 1526. The maximum average data rate on this connection is 1.5 MBytes per second, so an eight bit bus multiplexed from the processor data bus 1507 is adequate. The address for the JPEG compressed data is generated by DMA controller 1511, and placed on the processor bus 1507 via address bus 1520. Contone pixel data generated by the JPEG Codec 1510 is buffered in a contone buffer memory 1512, which contains up to two bands (16 lines) of CMYK pixel data at 266.6 dpi. The memory 1512 may be composed of two 64 K×16 SRAMs such as Hitachi HM621664. The maximum data rate writing to the contone buffer memory 1512 on the bus 1521 is 27 MBytes per second. Data must also be read out of the contone buffer memory 1512 at 27 MBytes per second to provide contone pixel information for the expander and halftoner ASIC 1600. Thus the total data rate on the bus 1521 is 54 MBytes per second. An interleaved 32 bit bus operating at 74 ns (or less) cycle times which alternates access cycles between the JPEG codec 1510 and the expander and halftoner ASIC 1600 is suitable. The expander and halftoner ASIC 1600 replicates each 266.6 dpi pixel from the JPEG codec 1510 to form a 3×3 array of 800 dpi pixels. The compressed data stream is acquired via the bus 1527 and expanded to form bitmaps of cells 1101 by circuitry within the expander and halftoner ASIC 1600. The bitmaps of cells 1101 are combined with the pixel replicated contone image data to form reconstructed 800 dpi image data. The reconstructed 800 dpi image data is then halftoned, also within the expander and halftoner ASIC 1600. The halftoned data is stored to the halftone band memory 1513 as CC'MM'YK bi-level data. Other color models such as CMYK may be used, though CC'MM'YK gives superior image quality. The amount of memory required for the halftone band memory 1513 depends upon the distance between the first and last rows of nozzles on the print head. Storage for an extra 48 lines of pixels is also required to provide double buffering for the expander and halftoner ASIC 1600 output. To print full bleed A4 pages at 800 dpi using the CC'MM'YK color model with a print head which is 7.2 mm from first to last row, the halftone band memory 1513 should preferably be at least 1,363 KBytes. The total data rate into and out of this memory is 91.6 MBytes per second. The memory 1513 may be composed of three 256 K×16 SRAMs with a maximum 55 ns cycle time. An interleaved 48 bit bus 1522 operating at 65 ns (or less) cycle times which alternates access cycles between the expander and halftoner ASIC 1600 and the head control ASIC 400 is suitable. Halftoned data is read from the memory 1513 by the head control ASIC 400 and provided to the print head 50 via a bus 1523. The print head 50 may be a monolithic pagewidth print head. Power to the print head 50 is provided by a programmable power supply which is controlled by a microcontroller 315. Print density data is provided to the microcontroller 315 by the head control ASIC 400.

High speed color office printer using drop selection and separation printing

The table "Example product specifications" shows the specifications of one possible configuration of a high speed color office printer using drop selection and separation printing technology and a digital page image store for electronic collation and local digital document storage.

Example product specifications

| Configuration | Desktop |
| --- | --- |
| Printer type | 2 drop selection and separation full width printing heads for duplex |
| Number of nozzles | 79,488 active nozzles, 79,488 spare nozzles |
| Paper size | A4, US letter |
| Printing speed | 74 ppm duplex (37 sheets per minute) |
| Local document storage | 1,000+ pages |
| Electronic collation | up to 1,000 page documents |
| Disk capacity | 1 GByte |
| Printer resolution | 800 dpi |
| Paper volume | 3,000 sheet motorized feeder |
| Weight | Approx. 20 kg |
| Dimensions (W × D × H) | 800 × 250 × 350 mm |
| Page description language | Adobe Postscript* level 2, PCL5* |
| Connectivity | Ethernet, LocalTalk*, Centronics*, SCSI |

* 'Postscript' is a registered trademark of Adobe Systems Incorporated, 'PCL5' is a trademark of Hewlett-Packard Corporation, 'LocalTalk' is a trademark of Apple Computer Inc., 'Centronics' is a trademark of Centronics Inc.

The table "LIFT head type A4-6-800" is a summary of some characteristics of an example full color monolithic drop selection and separation printing head suitable for use in the color printer disclosed herein.

This printer system has many advantages over prior-art systems. Some of these advantages are high speed, high image quality, local page storage, electronic collation, low cost, and relatively small size.

High speed on-demand printer using drop selection and separation printing

The table "Example product specifications" shows the specifications of one possible configuration of a high speed on-demand printer using drop selection and separation printing technology and a digital page image store for electronic collation and local digital document storage.

Example product specifications

| Configuration | Floor standing, web fed |
| --- | --- |
| Web width | 420 mm |
| Printer type | 4 × LIFT A4 page width printing heads |
| Number of nozzles | 158,976 active nozzles, 158,976 spare nozzles |
| Printing speed | 128 A4 ppm duplex (37 A3 sheets per minute) |
| Local document storage | 10,000+ pages |
| Electronic collation | up to 10,000 page documents |
| Disk capacity | 10 GBytes |
| Printer resolution | 800 dpi |
| Dimensions (W × D × H) | 1,500 × 700 × 1,800 mm |
| Page description language | Adobe Postscript* level 2 |
| Connectivity | 100 BaseT Ethernet |

Physical configuration

There are many possible physical configurations of the invention.

Because the printing speed is high, and the high speed office printer system is intended to be used to print multiple copies of multiple page documents without human intervention, it is desirable to provide a relatively large paper supply. A paper supply of at least 6 reams (3,000 sheets) of paper is desirable. At full printing speed, this paper supply would last less than one hour. Motorized sheet feeders with a capacity of 3,000 or more sheets of paper are well known in the industry, and are commonly used for photocopiers with a copy speed of more than 20 cpm. The print head, ink supply system, and printer electronics can be manufactured with a total volume less than the volume of 3,000 A4 sheets, so the size and configuration of a desktop printer using this system is likely to be dominated by paper storage and handling mechanisms.

FIG. 12 shows a perspective view of the layout of major components for one possible configuration of such a printer.

The printer includes: ink reservoirs 920; an enclosure 930 containing power supplies, power electronics, and a hard disk drive; a circuit board 900 containing the control electronics and electronic collation system; two page-width print heads 50; ink channels 75; platens 67; a paper pick-up roller 912; paper transport rollers 65; a control panel 901; a motorized paper input tray 910; and a motorized paper output tray 911. FIG. 12 is intended to be representative only, and does not show all of the required components of the system. Items not shown include: connections to a computer or power source; electrical wiring between subsystems of the printer; ink pressurizing systems; ink transport systems; ink heating systems if hot melt ink is used; paper guides; drive motors gears, belts, or chains for the paper transport mechanisms; covers for the printer, and so forth. These are well known in the art, and depend upon the configuration of the printer.

In this example printer configuration, there are six ink reservoirs 920. These are for the colors ⅔ density cyan, ⅓ density cyan, ⅔ density magenta, ⅓ density magenta, yellow and black that are used in the CC'MM'YK color model. If other color models are used, a different number of ink reservoirs 920 may be required.

When printing, the motorized paper input tray 910 keeps the top of the stack of blank paper level with the paper pick-up roller 912. This can be achieved using well known optical or mechanical sensors, which control a motor which raises or lowers the paper input tray. Sheets of paper 51 are grabbed by the paper pick-up roller 912 and passed to the paper transport rollers 65. One side of the page is printed by a first page-width drop selection and separation print head 50, and the other side of the page is printed by a second page-width drop selection and separation print head 50. Data for the print heads 50 is provides by real-time expansion circuitry located on the circuit board 900. When printed, the paper is ejected into the output paper tray 911, which also has a capacity of 3,000 sheets. The output tray may be motorized to keep the top of the stack of output paper just below the level of the paper transport rollers 65. This is so that printed sheets do not have room to tumble over as they fall onto the stack of output paper. Alternative designs which prevent the paper from tumbling over or otherwise misstacking without using a motorized system may be used. A motorized output tray is also not necessary if the output capacity required is less than approximately 500 pages. However, the printer cannot operate unattended for longer print runs than the output capacity, so provision of an output capacity commensurate with the input paper capacity is desirable.

The paper path shown in FIG. 12 is very short and straight. This has several advantages:
1) the printer can be made more compact;
2) paper curl is reduced; and
3) the potential for paper jams is considerably reduced.

However, a short paper path as shown in FIG. 12 is preferably only used with very fast drying inks, or with hot melt inks. If the ink drying time is longer than one second, there is a possibility of ink on newly printed sheets bleeding through to previously printed sheets in the output paper tray 911. At present, hot melt inks provide the best option for very fast drying. The paper transport rollers 65 can be used to cold press the hot melt ink. If hot melt ink bonding to the paper is insufficient, the platens 67 can be heated to increase wicking of the hot melt ink into the paper before the ink freezes. Heating the paper during printing will generally also increase the spot size, which may or may not be desirable, depending upon the particular characteristics of the ink, print head, and paper.

The control panel 901 can include devices such as buttons and a display. While operation as a network printer can be remotely controlled from the computer from which the print job originates, a control panel is desirable for local operations. The control panel preferably provides the ability to locally select a stored document to be printed, as well as the number of copies of the document that are to be printed. The control panel can also provide setup and diagnostic features.

FIG. 12 is a simplified view of one possible configuration of a printer. Many other configurations are possible. The detailed design of paper transport mechanisms is well known in the industry, and can be accomplished by engineers skilled in the art.

Figure 13:
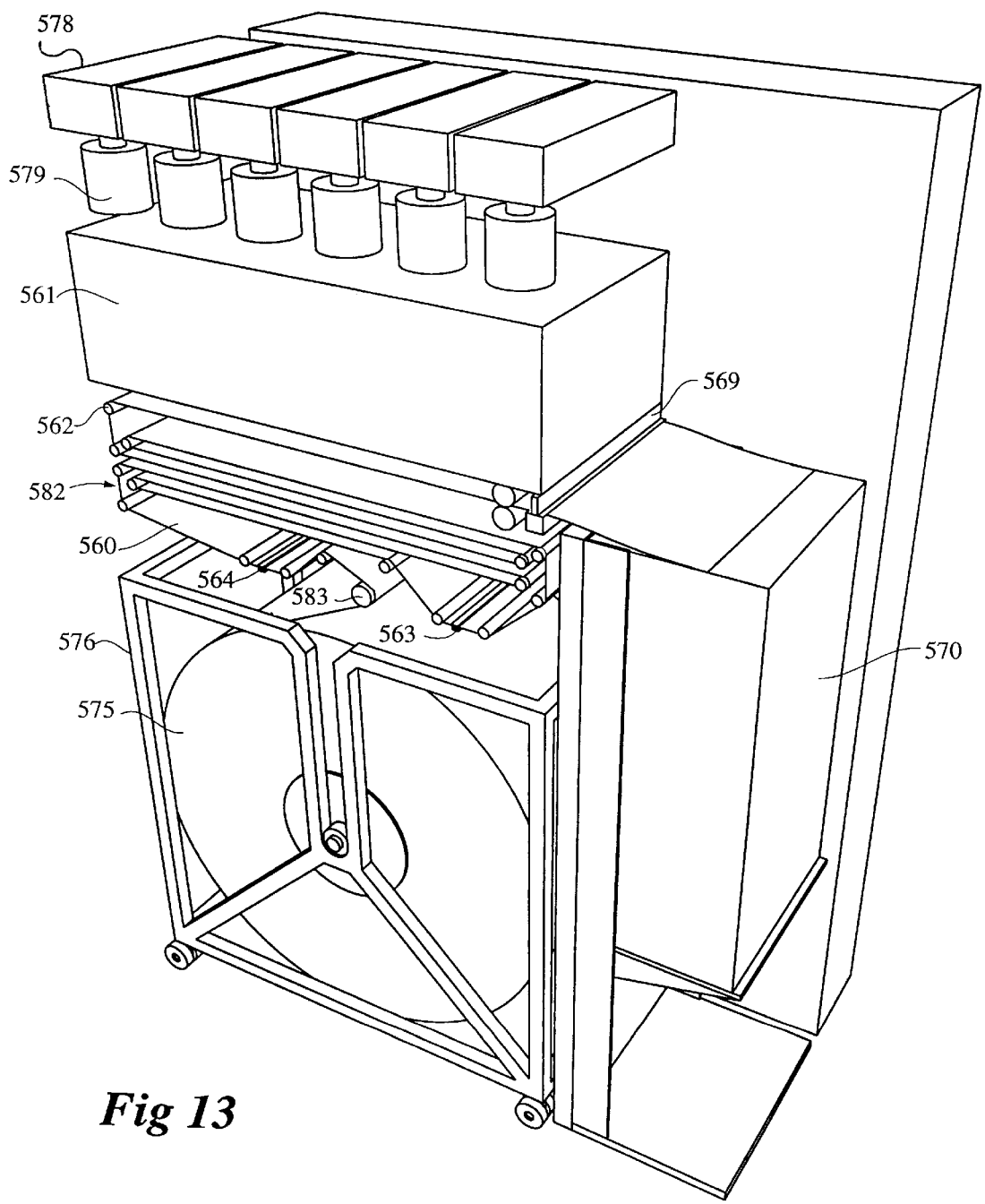
FIG. 13 is a perspective diagram of a high speed commercial color printer which incorporates a drop selection and separation printing mechanism, electronic collation and local page storage.

FIG. 13 shows a perspective view of the major components for one possible configuration of the commercial printing system. The printer system is approximately 1.8 meters tall. In this example printer configuration, there are six ink reservoirs 578. These are for the colors ⅔ density cyan, ⅓ density cyan, ⅔ density magenta, ⅓ density magenta, yellow and black that are used in the CC'MM'YK color model. If other color models are used, a different number of ink reservoirs 578 may be required. Each ink reservoir 578 supplies ink to an ink pressure regulator 579. If the ink pressure regulators are positioned an appropriate height above the print heads, then the ink pressure can be regulated with high accuracy and stability using a simple float valve. In this case, the ink pressure is provided by the weight of ink in the column above the heads.

Paper (or some other recording medium) is supplied on a roll 575 in a removable frame 576. When printing, the paper roll 575 rotates, supplying paper to the web 560. The paper web is tensioned by a tensioning system 583. One side of the web is printed by the print head assembly 564. The paper then passes through the drying section 582, which passes heated forced air over the paper web. The paper preferably makes at least two passes through the drying section 582 before encountering rollers 562 which contact the newly printed side of the paper. The temperature, airflow, and size of the drying section depends upon the characteristics of the ink used, especially the drying characteristics of the ink carrier. After passing through the drying section 582, the other side of the paper web is printed by the print head assembly 563. The paper web then passes through the drying section 582 again. Again, it is preferable that the paper web makes at least two passes through the drying section 582 before encountering rollers 562 which contact the newly printed surface of the web.

Sheets of paper are cut from the paper web by the cutter 569. Each sheet contains four A4 pages. The sheets may be printed in collated order, ready for binding and trimming. The paper sheets are shown forming a stack in a motorized paper output tray 570. Alternatively, the printed paper sheets may be supplied directly to an automated saddle stitching and trimming machine, or other bindery equipment.

An electronics subsystem 561 contains the control electronics and electronic collation system, power supplies, power electronics, and a hard disk drive.

FIG. 13 is intended to be representative only, and does not show all of the required components of the system. Items not shown include: connections to a computer or power source; electrical wiring between subsystems of the printer; ink transport systems; ink heating systems if hot melt ink is used; paper guides; drive motors gears, belts, or chains for the paper transport mechanisms; covers for the printer, and so forth. These are well known in the art, and depend upon the configuration of the printer.

Figure 14:
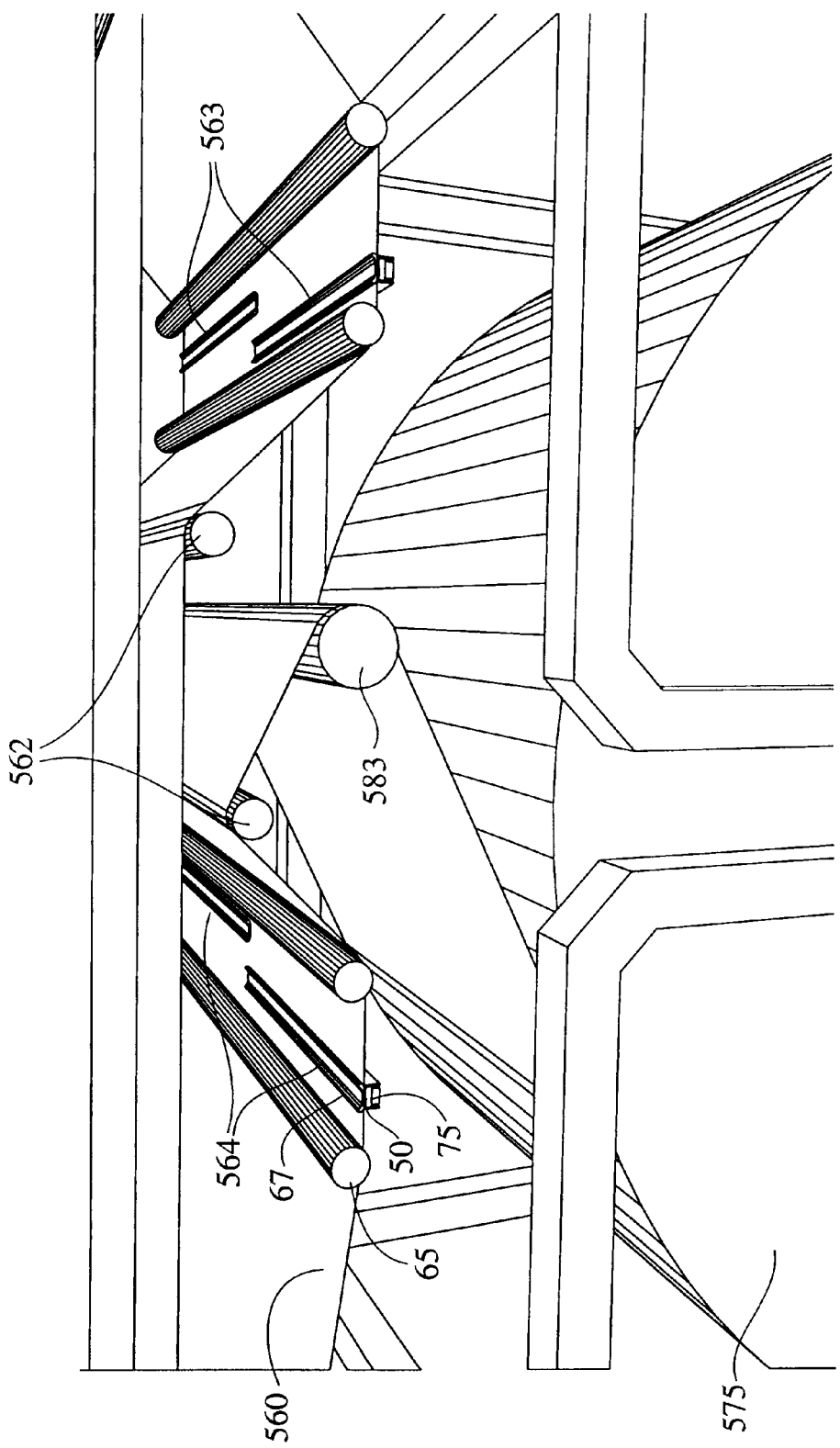
FIG. 14 is a detail perspective diagram of the print head region of the printer shown in FIG. 13.

FIG. 14 shows a perspective detail diagram of the region of the print head assemblies 563 and 564. Each head assembly 563 and 564 is made from two monolithic print heads 50, each of which prints half of the web width on one side of the web 560. The four print heads 50 are all at the same height, allowing gravity feed from common ink reservoirs to provide the same ink pressure. Ink is provided from the ink pressure regulators (579 in FIG. 13) to the heads 50 via ink supply tubing (not shown) and ink channels 75. Power and data are supplied to the heads 50 from the electronics subsystem (561 in FIG. 13) via electrical wiring (not shown). The platens 67 hold the paper web 560 at the correct distance from the print head 50. The platens 67 preferably extend the full width of the web to prevent buckling of the web in the centre. They are shown extending half the width of the web to show the positions of the print heads, which are on the underside of the web 560, directly below the platens 67. The platens 67 are preferably mounted on a frame which is raised by a few centimeters whenever a new roll of paper is to be threaded through the printing system. When printing, the platens are lowered onto the web. In the case of electrostatic drop separation printing, the platens 67 may form one electrode of the electrode pair generating the electrostatic field, and the head 50 may form the other electrode. In the case of proximity drop separation printing, the gap between the platens 67 and the heads 50 is very small, and must be accurately controlled. When the mechanical frame containing the platens is lowered after threading the web through the printer, it is unlikely to return the platens 67 to a distance from the heads 50 which is sufficiently accurate to ensure good print quality. The platens 67 may be mounted on piezoelectric positioners, which are then mounted on the frame. When the printer is started after threading the web, a calibration sequence may be initiated. This calibration sequence is preferably automated, using sensors which detect the print density (not shown). Alternatively, the calibration sequence may be manual, requiring an operator to adjust the platen position based on print density of sample images. The paper transport rollers 65 position the web to be in slight tension against the platens 67.

Figure 15:
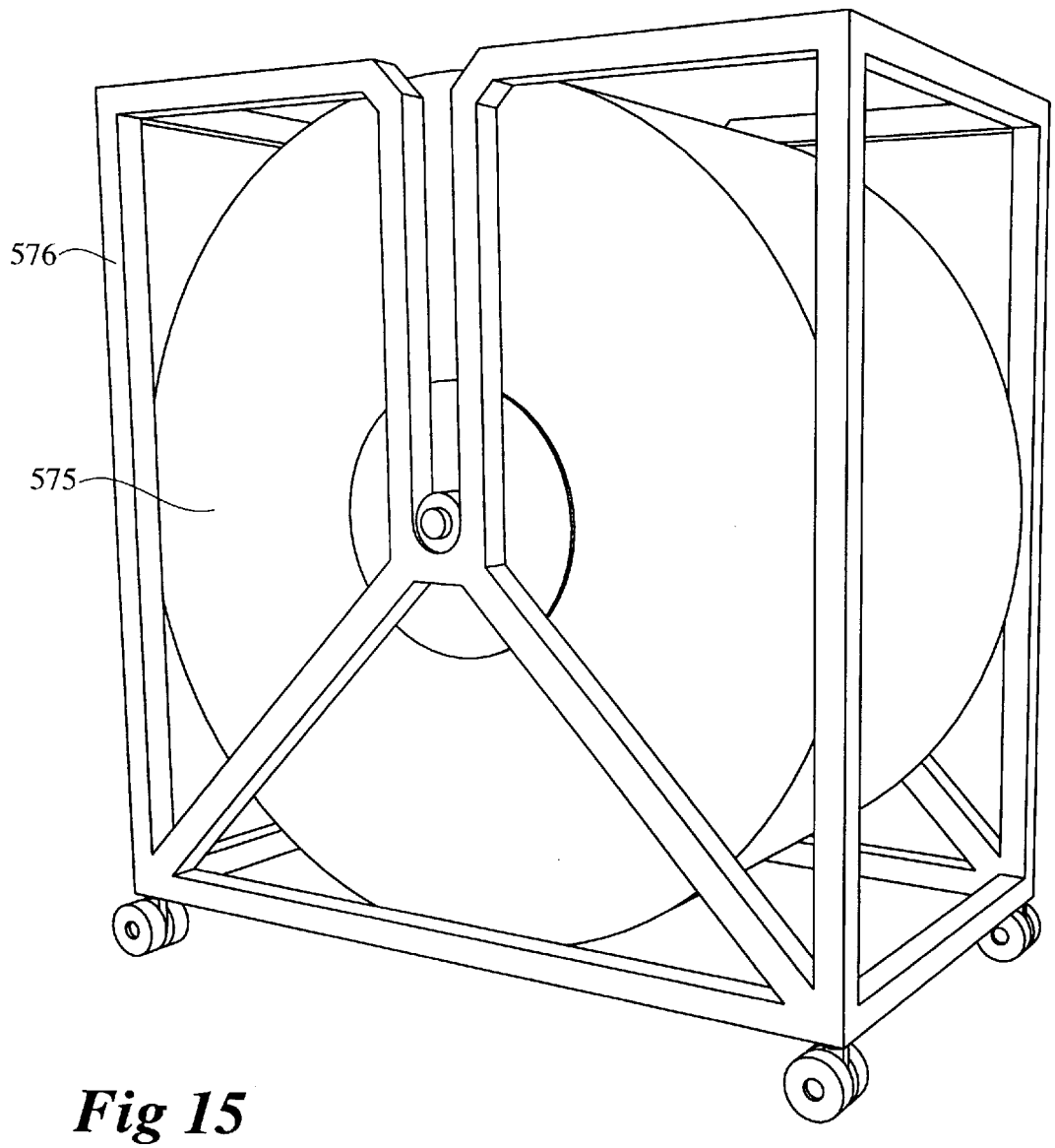
FIG. 15 is a perspective diagram of a paper roll and frame for use in the printer shown in FIG. 13.

FIG. 15 shows a roll of input paper in a mobile frame. A single roll of paper 575 with a diameter of 800 mm and a width of 420 mm would contain approximately 100,000 A4 pages, take approximately 11 hours to print at full print speed, and weigh approximately 140 kg. The roll of paper can be mounted in a frame with castors 576, to allow installation and removal without lifting equipment Rotation of the roll should be motorized, under control of the computer system. A feedback system which controls roll rotation speed in response to the radius of paper remaining on the roll should be incorporated into the printing system. The high angular inertia of the roll of paper 575 makes fast starting and stopping of roll rotation difficult. A system for maintaining paper tension should be incorporated into the printer system.

The foregoing describes various general and preferred embodiments of the present invention. Modifications, obvious to those skilled in the art, can be made without departing from the scope of the invention.

I claim:

1. A printing apparatus using cut sheet recording media which incorporates a high capacity compressed document image storage apparatus, said printing apparatus including:
   an image creation system which can operate on a band by band basis;
   an input memory which receives and stores at least one band of an uncompressed page image, but less than 50% of an uncompressed page image from the image creation system;
   a page image compression system operable on images stored in said input memory on a band by band basis;
   a mass storage device adapted to receive and store a plurality of compressed page images from the compression system;
   a page image expansion system which expands compressed page image data from the mass storage device to form an expanded page image at a rate which is within 20% of a page printing rate when measured over the duration of a page printing time;
   an output memory which receives and stores at least one band of said expanded page image from the expansion system, but less than 50% of said expanded page image; and
   an apparatus which provides page image data from said output memory to a printing device wherein time taken to provide a band of image data to the printing device does not vary by more than ±50% of mean time to provide a band of image data to the printing device, said printing device having a print head comprising:
      (a) a plurality of drop-emitter nozzles;
      (b) a body of ink associated with said nozzles;
      (c) a pressurizing device adapted to subject ink in said body of ink to a pressure of at least 2% above ambient pressure, at least during drop selection and separation to form a meniscus with an air/ink interface;
      (d) drop selection apparatus operable upon the air/ink interface to select predetermined nozzles and to generate a difference in meniscus position between ink in selected and non-selected nozzles; and
      (e) drop separation apparatus adapted to cause ink from selected nozzles to separate as drops from the body of ink, while allowing ink to be retained in non-selected nozzles.

2. A printing apparatus using cut sheet recording media which incorporates a high capacity compressed document image storage apparatus, said printing apparatus including:
   an image creation system which can operate on a band by band basis;
   an input memory which receives and stores at least one band of an uncompressed page image, but less than 50% of an uncompressed page image from the image creation system;
   a page image compression system operable on images stored in said input memory on a band by band basis;
   a mass storage device adapted to receive and store a plurality of compressed page images from the compression system;
   a page image expansion system which expands compressed page image data from the mass storage device to form an expanded page image at a rate which is within 20% of a page printing rate when measured over the duration of a page printing time;
   an output memory which receives and stores at least one band of said expanded page image from the expansion system, but less than 50% of said expanded page image; and
   an apparatus which provides page image data from said output memory to a printing device wherein time taken to provide a band of image data to the printing device does not vary by more than ±50% of mean time to provide a band of image data to the printing device, said printing device having a print head comprising:

(a) a plurality of drop-emitter nozzles;

(b) a body of ink associated with said nozzles, said body of ink forming a meniscus with an air/ink interface at each nozzle;

(c) drop selection apparatus operable upon the air/ink interface to select predetermined nozzles and to generate a difference in meniscus position between ink in selected and non-selected nozzles; and (d) drop separation apparatus adapted to cause ink from selected nozzles to separate as drops from the body of ink, while allowing ink to be retained in non-selected nozzles, said drop selection apparatus being capable of producing said difference in meniscus position in the absence of said drop separation apparatus.

3. A printing apparatus using cut sheet recording media which incorporates a high capacity compressed document image storage apparatus, said printing apparatus including:

an image creation system which can operate on a band by band basis;

an input memory which receives and stores at least one band of an uncompressed page image, but less than 50% of an uncompressed page image from the image creation system;

a page image compression system operable on images stored in said input memory on a band by band basis;

a mass storage device adapted to receive and store a plurality of compressed page images from the compression system;

a page image expansion system which expands compressed page image data from the mass storage device to form an expanded page image at a rate which is within 20% of a page printing rate when measured over the duration of a page printing time;

an output memory which receives and stores at least one band of said expanded page image from the expansion system, but less than 50% of said expanded page image; and an apparatus which provides page image data from said output memory to a printing device wherein time taken to provide a band of image data to the printing device does not vary by more than ±50% of mean time to provide a band of image data to the printing device, said printing device having a print head comprising:

(a) a plurality of drop-emitter nozzles;

(b) a body of ink associated with said nozzles, said body of ink forming a meniscus with an air/ink interface at each nozzle and said ink exhibiting a surface tension decrease of at least 10 mN/m over a 30° C. temperature range;

(c) drop selection apparatus operable upon the air/ink interface to select predetermined nozzles and to generate a difference in meniscus position between ink in selected and non-selected nozzles; and (d) drop separation apparatus adapted to cause ink from selected nozzles to separate as drops from the body of ink, while allowing ink to be retained in non-selected nozzles.

* * * * *